United States Patent
Butler et al.

(10) Patent No.: US 11,729,440 B2
(45) Date of Patent: Aug. 15, 2023

(54) AUTOMATED RESOURCE MANAGEMENT FOR DISTRIBUTED COMPUTING

(71) Applicant: Intel Corporation, Santa Clara, CA (US)

(72) Inventors: Joseph Butler, Stamullen (IE); Keith A. Ellis, Carlow (IE); Thijs Metsch, Bruehl (DE); Radhika Loomba, Maynooth (IE); Perumal Kappuudaiyar, Adamstown (IE)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 17/439,262

(22) PCT Filed: Mar. 26, 2020

(86) PCT No.: PCT/US2020/025060
§ 371 (c)(1),
(2) Date: Sep. 14, 2021

(87) PCT Pub. No.: WO2020/263374
PCT Pub. Date: Dec. 30, 2020

(65) Prior Publication Data
US 2022/0197773 A1 Jun. 23, 2022

Related U.S. Application Data

(60) Provisional application No. 62/867,837, filed on Jun. 27, 2019.

(51) Int. Cl.
*H04N 21/2343* (2011.01)
*H04N 21/234* (2011.01)
(Continued)

(52) U.S. Cl.
CPC ..... *H04N 21/234345* (2013.01); *G06F 9/505* (2013.01); *G06F 9/5038* (2013.01);
(Continued)

(58) Field of Classification Search
CPC ............ H04L 43/0852; H04L 41/5009; G06F 9/5027
See application file for complete search history.

(56) References Cited

U.S. PATENT DOCUMENTS

2008/0016541 A1 1/2008 Murakami et al.
2008/0320482 A1* 12/2008 Dawson .............. H04L 41/5009
718/104

(Continued)

OTHER PUBLICATIONS

PCT International Preliminary Report on Patentability issued in PCT/US2020/025060, dated Jan. 6, 2022; 11 pages.
(Continued)

*Primary Examiner* — Barbara B Anyan
(74) *Attorney, Agent, or Firm* — Alliance IP, LLC

(57) ABSTRACT

In some embodiments, infrastructure data and service data is received for a computing infrastructure. The infrastructure data indicates resources in the computing infrastructure, and the service data indicates services to be orchestrated across the computing infrastructure. An infrastructure capacity model is generated, which indicates a capacity of the computing infrastructure over a particular time window. Service-to-resource placement options are also identified, which indicate possible placements of the services across the resources over the particular time window. Resource inventory data is obtained, which indicates an inventory of resources that are available to add to the computing infrastructure during the particular time window. An infrastructure capacity plan is then generated, which indicates resource capacity allocation options over the time slots of the particular time window. Resource capacities for the services are then allocated in the computing infrastructure.

25 Claims, 42 Drawing Sheets

(51) Int. Cl.
  *H04N 21/426* (2011.01)
  *H04N 21/63* (2011.01)
  *H04L 65/61* (2022.01)
  *H04L 65/75* (2022.01)
  *G06F 9/50* (2006.01)
  *G06F 11/34* (2006.01)

(52) U.S. Cl.
  CPC ...... *G06F 11/3442* (2013.01); *G06F 11/3495* (2013.01); *H04L 65/61* (2022.05); *H04L 65/765* (2022.05); *H04N 21/23406* (2013.01); *H04N 21/42692* (2013.01); *H04N 21/632* (2013.01)

(56) References Cited

U.S. PATENT DOCUMENTS

| | | |
|---|---|---|
| 2011/0202925 A1 | 8/2011 | Banerjee et al. |
| 2011/0289333 A1 | 11/2011 | Hoyer et al. |
| 2016/0269239 A1 | 9/2016 | Ashby, Jr. et al. |
| 2018/0152390 A1 | 5/2018 | Loomba et al. |
| 2019/0158422 A1 | 5/2019 | Greenwood et al. |
| 2020/0218571 A1* | 7/2020 | Chen ................ G06F 9/5027 |
| 2020/0366559 A1* | 11/2020 | Parvataneni ........ H04L 43/0852 |

OTHER PUBLICATIONS

International Search Report and Written Opinion for International Application No. PCT/US2020/025060, dated Jul. 15, 2020, 14 pgs.

* cited by examiner

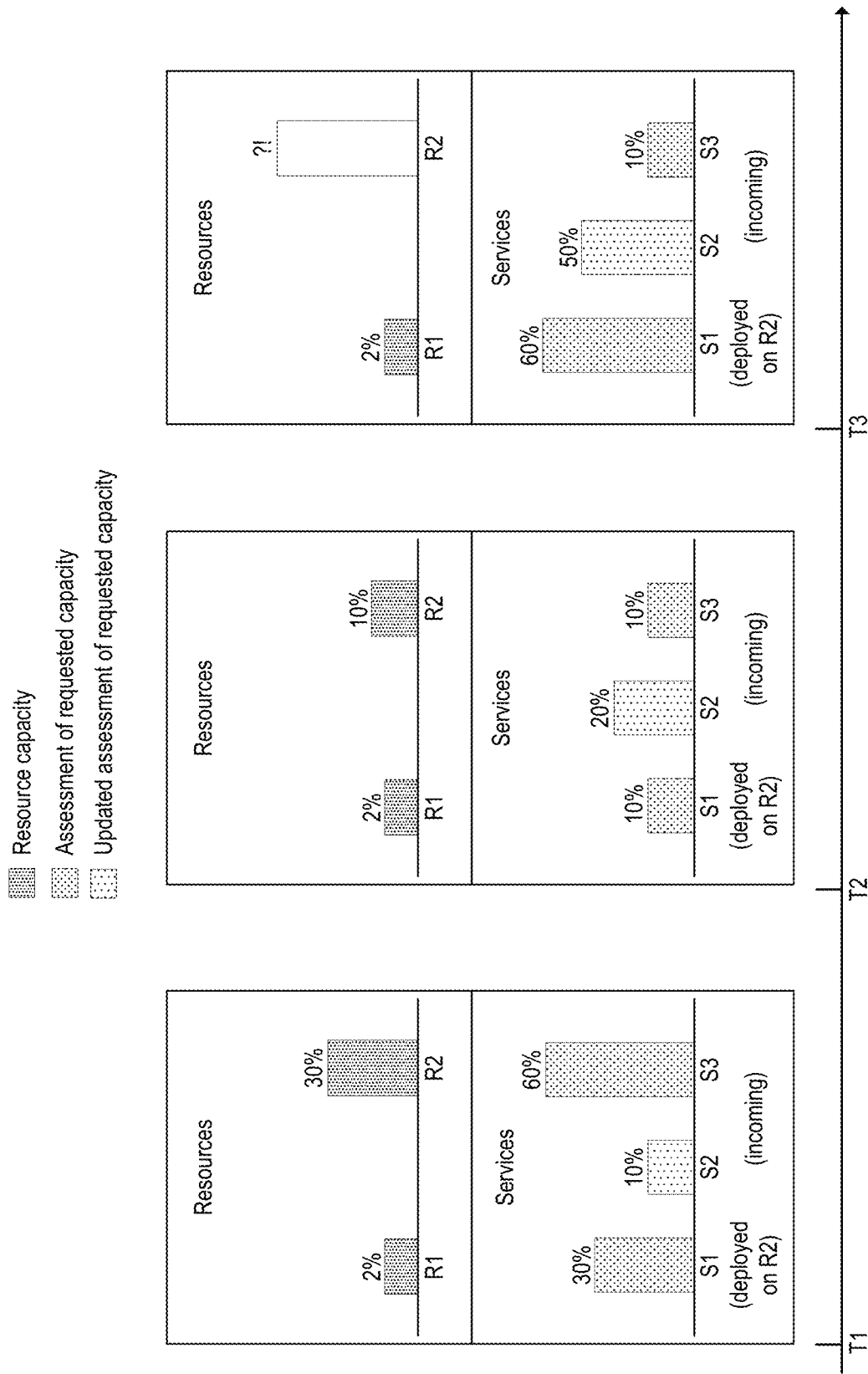

AUTOMATED RESOURCE MANAGEMENT FOR DISTRIBUTED COMPUTING

CROSS-REFERENCE TO RELATED APPLICATIONS

This Application is a national stage application under 35 U.S.C. § 371 of PCT International Application Serial No. PCT/US2020/025060, filed on Mar. 26, 2020 and entitled AUTOMATED RESOURCE MANAGEMENT FOR DISTRIBUTED COMPUTING, which application claims the benefit of the filing date of U.S. Provisional Patent Application Ser. No. 62/867,837, filed on Jun. 27, 2019, and entitled "VISUAL FOG ORCHESTRATION". The disclosures of the prior applications are considered part of and are hereby incorporated by reference in their entirety in the disclosure of this application.

FIELD OF THE SPECIFICATION

This disclosure relates in general to the field of distributed computing, and more particularly, though not exclusively, to automated resource management for distributed computing infrastructure.

BACKGROUND

Large-scale computing applications are often deployed across a combination of resources in a distributed computing system. Provisioning resources and orchestrating application workloads across these resources in an efficient manner can be extremely challenging, however, particularly in view of the growing complexity and continuously evolving nature of these resource deployments, along with the diversity of workloads that are being deployed across them.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 9A-B illustrate updated capacity charts for a consolidated infrastructure model.

EMBODIMENTS OF THE DISCLOSURE

Figure 1:
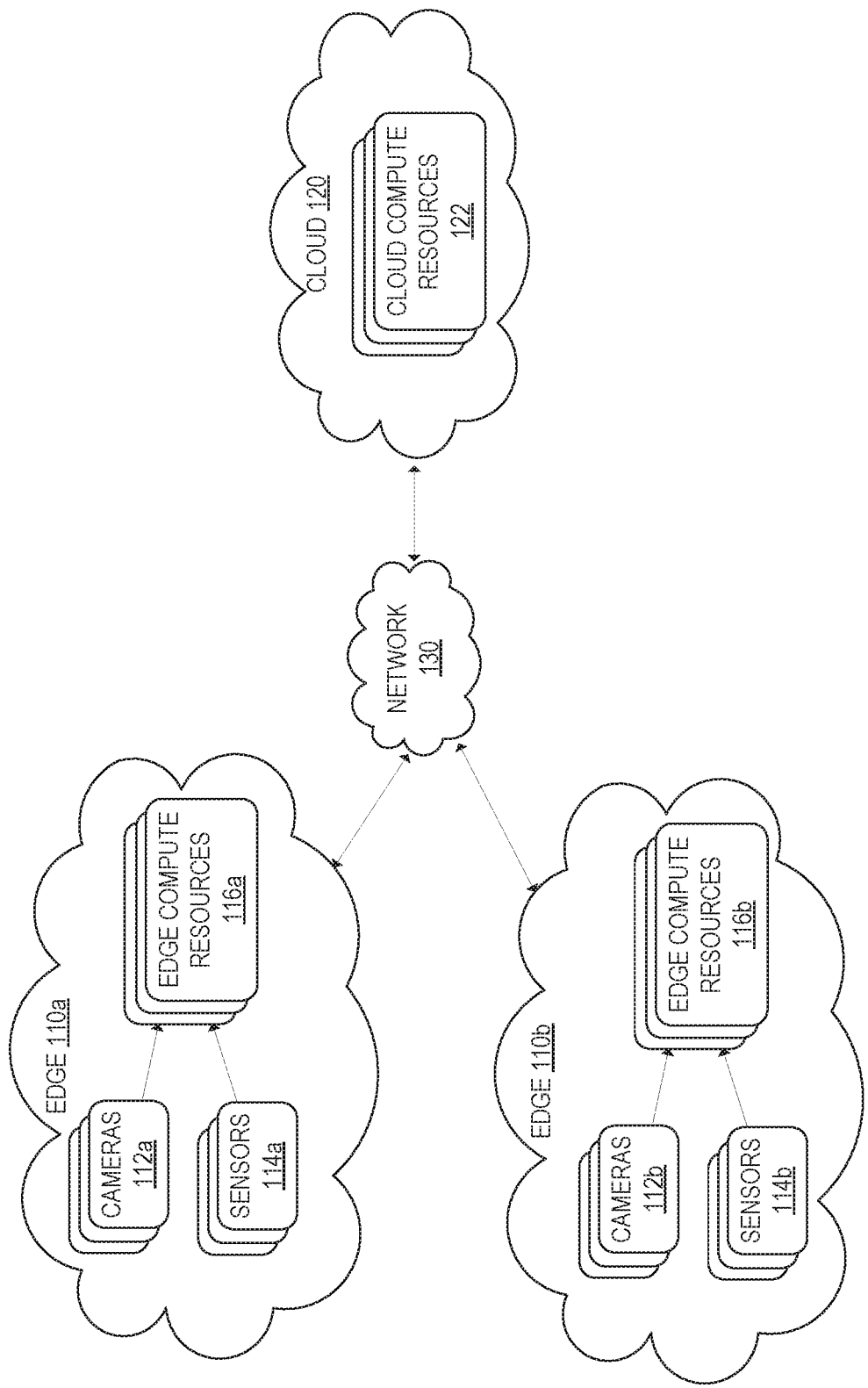
FIG. 1 illustrates an example of a fog computing system in accordance with certain embodiments.

This patent application claims the benefit of the filing date of U.S. Provisional Patent Application Ser. No. 62/867,837, filed on Jun. 27, 2019, and entitled "VISUAL FOG ORCHESTRATION," the contents of which are hereby expressly incorporated by reference.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

FIG. 1 illustrates an example of a fog computing system 100 in accordance with certain embodiments. In the illustrated embodiment, for example, fog computing system 100 is a distributed computing system capable of executing large-scale computing applications using resources distributed throughout the entire edge-to-cloud network topology, which may also be referred to as the "fog."

For example, fog computing system 100 includes various collections of cameras 112a-b, sensors 114a-b, and edge compute resources 116a-b deployed throughout different portions of the network edge 110a,b, along with various cloud computing resources 122 hosted in the cloud 120, which are communicatively coupled via one or more communication networks 130. Moreover, one or more large-scale computing applications may be deployed across the various resources of fog computing system 100, such as a distributed computing application that leverages a variety of compute resources to process data captured by the cameras 112a-b and/or sensors 114a-b.

For example, various workloads associated with the distributed computing application may be orchestrated across any combination of resources deployed throughout the end-to-end (E2E) network topology, including at the edge, in the cloud, and/or anywhere in between in the "fog." Orchestrating workloads across these resources in an efficient manner can be extremely challenging, however, particularly in view of the growing complexity and continuously evolving nature of these resource deployments, the diversity of their underlying computing hardware (e.g., processors, memory, hardware accelerators), and the diversity of workloads that are being deployed across them.

Accordingly, this disclosure presents various solutions for orchestrating applications and/or workloads across distributed computing systems in an efficient manner, as described further throughout the sections below. For example, these solutions can be leveraged to orchestrate large-scale applications and/or workloads across a diverse range of distributed heterogeneous computing resources, such as computing resources with different types of systems boards, CPUs, memory capacities and speeds, persistent storage, network interface controllers (NICs), hardware accelerators (e.g., GPUs, artificial intelligence (AI) accelerators, FPGAs, ASICs), and so forth. Moreover, these solutions can also be implemented by a diverse range of computing resources, including general-purpose processors, special-purpose processors and/or accelerators (e.g., GPUs, AI accelerators, smart NICs, FPGAs, ASICs), and so forth. It should be appreciated that fog computing system 100 of FIG. 1 may be implemented with any aspects of the embodiments described throughout this disclosure.

Dynamic Rebalancing of Edge Resources for Multi-Camera Video Streaming

Figure 2:
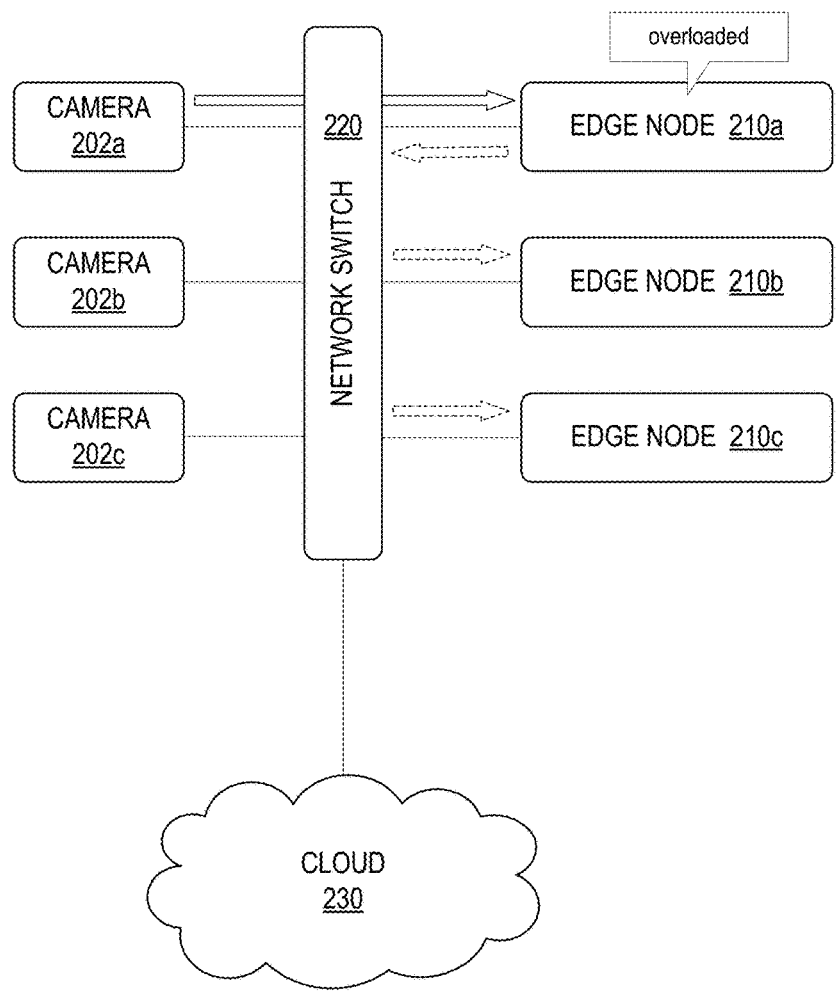
FIG. 2 illustrates an example of a video streaming system in accordance with certain embodiments.

FIG. 2 illustrates an example of a video streaming system 200 in accordance with certain embodiments. In the illustrated embodiment, video streaming system 200 includes a collection of cameras 202a-c that are connected to edge nodes 210a-c (e.g., edge computing servers, edge processing devices) via a network switch 220, which is further connected to the cloud 230 (e.g., via one or more communication networks). The cameras 202a-c capture video footage of their respective surroundings, and that video footage is then streamed to the edge nodes 210a-c (e.g., via the network switch 220) for further processing. If one of the edge nodes 210a-c becomes overloaded, however, a portion of its video processing workload can be dynamically offloaded to other edge nodes 210a-c to prevent video frames from being dropped, as described further below.

Figure 3:
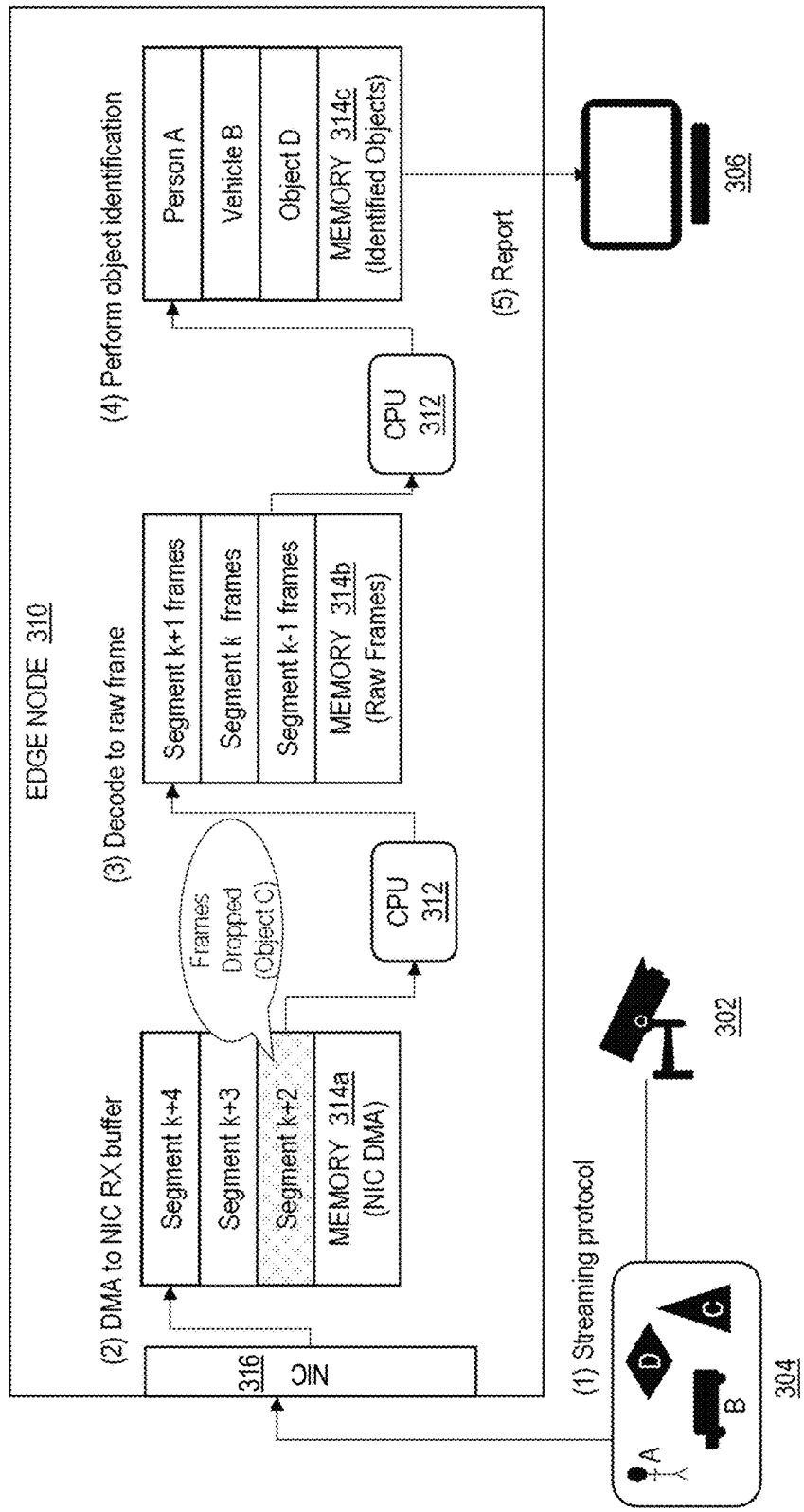
FIG. 3 illustrates an example embodiment of an edge video streaming architecture that drops frames.

In many video streaming architectures, for example, edge compute servers are assigned to a predefined number of cameras to perform computational tasks, such as feature extraction, event detection, object identification, target tracking, and so forth. However, the bandwidth and computation requirements for each edge compute server can vary dramatically depending on the video content that a particular edge server is receiving from its corresponding cameras. For example, at the intersection of a small street and a main road, video captured by a camera facing the main road will typically require more processing than video captured by a camera facing the small street, particularly during peak business hours. Moreover, different cameras often have different characteristics, such as picture quality, streaming requirements, and so forth, which means they will produce video streams that have different compute requirements. As a result, it is common for some edge compute servers to be computationally overloaded while others are underutilized, which inevitably leads to dropped video frames (e.g., as illustrated in FIG. 3).

For example, when an edge compute server becomes overloaded, it may resort to blindly dropping video frames to reduce its processing burden. While this approach is effective at reducing the processing burden on the edge compute server, video frames are often dropped after they have already been decoded, which is a significant waste of resources at the edge. Moreover, dropping video frames also introduces information loss, which can potentially break service level agreements (SLAs) and may have drastic consequences for certain applications or use cases. In some cases, for example, dropped frames may be essential to detecting emergencies, such as traffic accidents, crimes (e.g., robberies/burglaries), and/or other potential life-threatening events.

While certain approaches can be leveraged to reduce video frame loss, they suffer from various shortcomings.

In some cases, for example, load balancing may be leveraged to improve quality of service (QoS). Load balancing solutions can be implemented at various different levels. In particular, many web servers (e.g., NGINX, Apache, Microsoft IIS, common web proxy services) include a load balancer as a feature to balance hypertext transfer protocol (HTTP) requests. At the data link layer (e.g., layer 2 (L2) of the Open Systems Interconnection (OSI) model), there are standards designed to facilitate NIC endpoint-to-endpoint reliable non-drop packet behavior by imposing carefully calculated hardware (HW) packet buffer configuration parameters (e.g., the IEEE Data Center Bridging (DCB) standard). At the operating system (OS) level, various scheduler algorithms exist to balance CPU-centric tasks, particularly with respect to multi-core architectures. These load balancing approaches are generally designed to work at a fixed point in the pipeline of an end-to-end application, such as the OSI L2 (e.g., data link layer) or L3 (e.g., network layer) protocol levels. These load balancing approaches will not be as effective for a video analytics pipeline, however, as the compute load is dependent on the underlying video content, which is not known at the networking level or the decoding/transcoding level.

As another example, some solutions may rely on camera-side buffering and retransmission when the receive side at the edge compute server is overloaded. Camera-side buffering is essentially an over-provisioning approach that requires extra storage resources on the camera side, which increases the total cost of ownership (TCO) on the camera side. For example, the storage device used on the camera side can be very costly depending on its capacity, form factor, operating temperature/humidity, and so forth. Moreover, this approach is not scalable due to the number and variety of cameras that are typically involved.

Another approach is to reduce the compute quality at overloaded edge compute servers, such as by processing video streams using lower resolutions and/or less complex algorithms (e.g., a CNN algorithm with fewer layers). Reducing the compute quality is undesirable, however, as it produces higher-error results that can be disastrous for detecting critical events. Moreover, as a practical matter, it is not easy to tune the compute quality in real time. While lowering the resolution may be tolerable in some cases, such as for a video streaming service that replays live news or concerts, it still faces the same type of information loss that is undesirable and/or unacceptable for critical event detection applications.

Another approach is to push video frames to the cloud for processing at a later time. While this approach may be tolerable for video content that is not time critical, it is not suitable for video content that needs to be processed in real time. For example, the latency required to transmit video content from the edge to the cloud through a wide area network (WAN) precludes the video content from being processed in real time, which means any time-sensitive processing (e.g., real-time critical event detection) must be performed at the edge. Additionally, pushing unprocessed video to the cloud requires significant amounts of bandwidth, which substantially increases bandwidth costs. Accordingly, this approach is not helpful for real-time processing that needs to be performed at the edge, as the cloud is typically limited to providing long-term data storage (e.g., for archiving and retention purposes) to allow local storage at the edge to be reclaimed.

Accordingly, in the illustrated embodiment, video streaming system 200 leverages a visual computing architecture that enables edge nodes 210*a-c* (e.g., edge computing servers) to avoid dropping incoming video frames even under heavy loads (e.g., by dynamically rebalancing the video stream processing among edge nodes), while continuing to perform computation tasks (e.g., video analytics) at the edge.

In some embodiments, for example, edge nodes 210*a-c* may be implemented with the following capabilities:

(i) Low-latency persistent storage (e.g., 3D XPoint-based memory, such as Intel Optane DC Persistent Memory) to store incoming video stream segments that have not yet been processed due to insufficient compute or memory resources in real time;

(ii) A scalable dynamic replication peer selection algorithm based on the real-time load status from all edge compute server nodes, where load status is shared using common mechanism such as broadcast/multicast of heart-beat messages; and (iii) Fast data replication among edge compute nodes over a local network to redirect previously-staged video segment data from overloaded edge compute nodes to non-overloaded edge compute nodes.

In this manner, an overloaded edge node 210*a-c* can (i) store unprocessed video segments that would otherwise be dropped in the low-latency persistent storage, (ii) select a peer node 210*a-c* to handle the processing of the unprocessed video segments, and (iii) rapidly replicate the unprocessed video segments to the selected peer node 210*a-c*.

The described solution provides various advantages. For example, this solution ensures that no video frames are dropped by edge compute nodes for real-time video streaming applications. Video analytics is one of the most important applications of edge computing for communication service providers (e.g., telecom providers) and cloud service providers. This novel architecture for video analytics at the edge helps these service providers satisfy or exceed service level agreements (SLAs) that are otherwise difficult to satisfy due to unpredicted workload patterns in video content from different camera sources. Accordingly, this architecture greatly improves the level of service that these service providers can offer to customers with video streaming applications.

This solution also takes advantage of low-latency persistent storage (e.g., 3D XPoint persistent memory) and showcases how it can be applied to edge computing architectures. Low-latency persistent storage is particularly well-suited for the purpose of locally persisting video streams at the edge when edge compute nodes are overloaded.

This solution also reduces the total cost of ownership (TCO) for visual computing architectures that commonly depend on overprovisioning of both memory and compute resources. For example, this solution leverages edge nodes to handle the processing of large volumes of video data in a timely manner, thus avoiding the latency and bandwidth costs associated with transmitting the video data to the cloud. When faced with the potential loss of video content due to overloaded resources, however, users often turn to overprovisioning memory and compute resources, both in the cloud and at the edge. This solution uses low-latency persistent storage to avoid overprovisioning of more costly memory and compute resources, thus greatly reducing the TCO.

Additional functionality and embodiments are described further in connection with the remaining FIGURES. Accordingly, it should be appreciated that visual streaming system 200 of FIG. 2 may be implemented with any aspects of the embodiments described throughout this disclosure.

FIG. 3 illustrates an example embodiment of an edge video streaming architecture 300 that drops frames. In the illustrated embodiment, for example, an edge node 310 (e.g., an edge compute server) is performing object identification and tracking on a video stream 304 captured by a camera 302, but certain video frames are dropped when edge node 310 becomes overloaded.

In the illustrated example, the process flow for performing object identification and tracking on edge video streaming architecture 300 includes the following steps:

(1) A camera 302 captures video 304 of a scene containing objects A, B, C, and D, and the camera 302 uses a streaming protocol to stream the video 304 to an edge node 310 in real time.

(2) The video stream 304 is then streamed into the edge node 310 for processing. For example, the video stream 304 is received by a network interface controller (NIC) 316 of the edge node 310, and then stored in memory 314a of the edge node 310 as video segments. The size of the video segments may vary depending on the particular streaming protocol employed, but they generally have a length of approximately 3-10 seconds.

(3) The central processing unit (CPU) 312 of the edge node 310 decodes each segment and stores the raw decoded frames from each segment in memory 314b.

(4) The CPU 312 then performs the computation tasks for object identification and tracking over the raw frames in memory 314b, and the identified objects (e.g., person A, vehicle B, object D) are stored back in memory 314c as metadata.

(5) The edge node 310 then sends the results (e.g., the metadata associated with the identified objects) to a management interface 306 for further processing and/or auditing.

In the illustrated example, however, the edge node 310 becomes overloaded and is forced to drop video segment k+2, which contains the video frames corresponding to object C. For example, assume object C is only captured in the frames of video segment k+2, while objects A, B, and D are captured in the frames of other video segments. In the illustrated example, video segments k+2, k+3, and k+4 are pending in the receive buffer 314a, while the raw decoded frames for video segments k−1, k, and k+1 are pending in the raw frame buffer 314b. Meanwhile, the CPU 312 becomes overloaded, as it is still processing the raw frames for segment k−1 while the NIC 316 continues to receive new video segments (e.g., segments k+4, k+5, and so forth). To allow the NIC 316 to continue receiving new video segments, segment k+2 is discarded from the receive buffer 314a. As a result, object C is unavoidably missed when performing object identification and tracking, as object C was captured in the frames of the discarded segment k+2.

Figure 4:
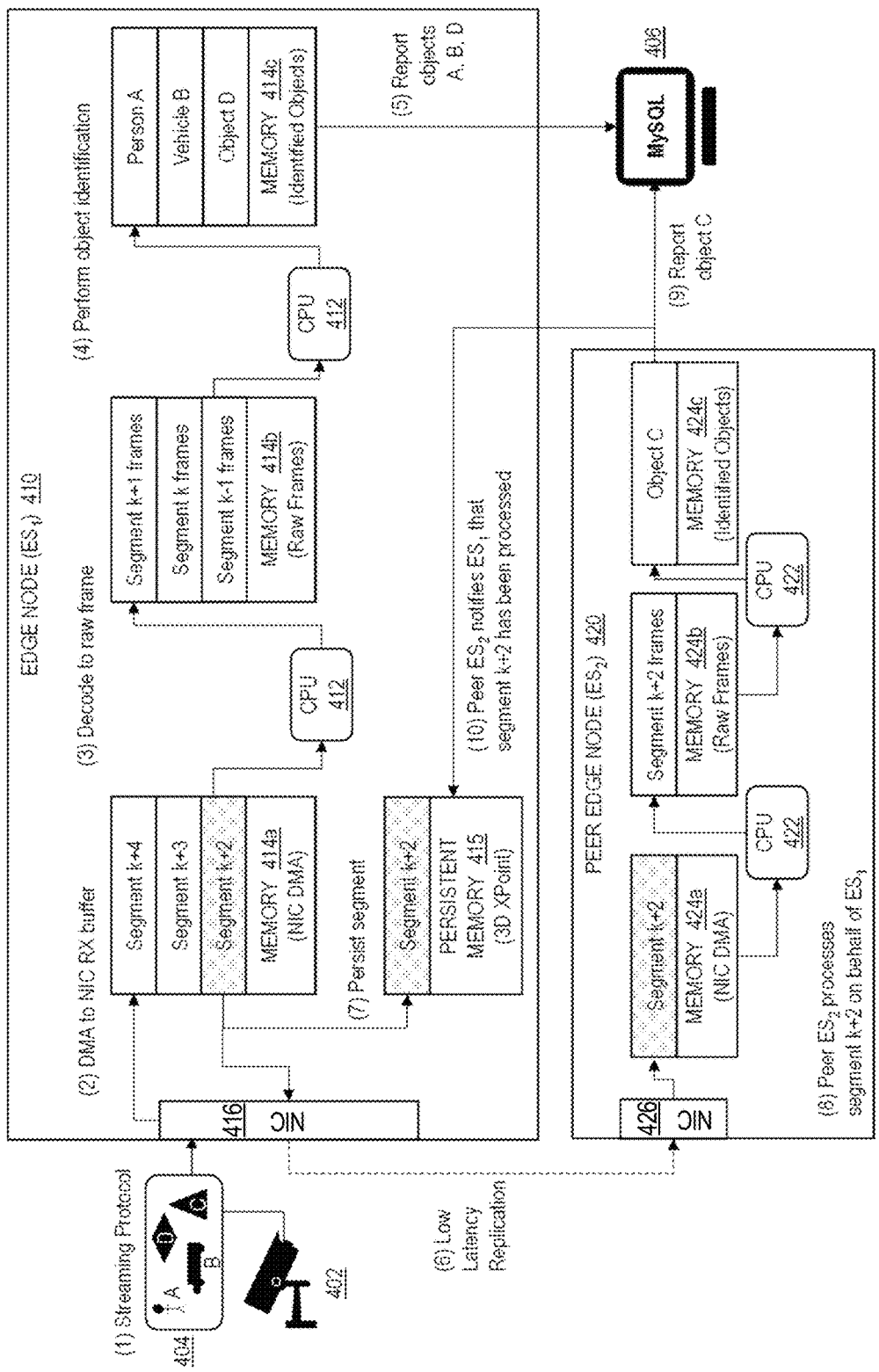
FIG. 4 illustrates an example embodiment of an edge video streaming architecture that leverages dynamic resource rebalancing to avoid dropping frames.

FIG. 4 illustrates an example embodiment of an edge video streaming architecture 400 that leverages dynamic resource rebalancing to avoid dropping frames. In the illustrated embodiment, for example, an edge node 410 (e.g., edge server $ES_1$) is performing object identification and tracking on a video stream 404 captured by a camera 402, but as the edge node 410 becomes overloaded, it offloads the processing of certain video frames to another peer edge node 420 (e.g., edge server $ES_2$) to avoid dropping the frames.

In the illustrated example, the process flow for performing object identification and tracking on edge video streaming architecture 400 involves the following steps:

(1) A camera 402 captures video 404 of a scene containing objects A, B, C, and D, and the camera 402 uses a streaming protocol to stream the video 404 to an edge node 410 ($ES_1$) in real time.

(2) The video stream 404 is then streamed into edge node 410 ($ES_1$) for processing. In particular, the video stream 404 is received by a network interface controller (NIC) 416 of edge node 410 ($ES_1$), and then stored in memory 414a of edge node 410 ($ES_1$) as video segments using direct memory access (DMA). In some embodiments, for example, the network hardware (HW) and software (SW) stack on edge node 410 ($ES_1$) uses direct memory access (DMA) to store incoming packet video data 404 in a receive (Rx) packet buffer in system memory 414a. Moreover, based on the streaming protocol, the packet payloads are organized and assembled into video segments in the receive (Rx) packet buffer 414a for subsequent decoding/transcoding.

(3) The CPU 412 of edge node 410 ($ES_1$) then performs a decoding task to decode each encoded video segment in the receive buffer 414a into raw video frames (e.g., using an H.264 codec), which are then stored in a raw video frame buffer in system memory 414b.

(4) The CPU 412 of edge node 410 ($ES_1$) then performs compute tasks associated with object identification and tracking (e.g., using standard machine learning and/or statistical algorithms and tools) on the raw frames stored in the video frame buffer in system memory 414b. The objects that are identified (e.g., person A, vehicle B, object D) and any related information (e.g., tracking predictions) are output as metadata, which is stored in system memory 414c for subsequent reporting.

(5) The metadata associated with the identified objects is then fed to a management server instance 406 (e.g., a MySQL server) to properly store and report the results.

(6) Edge node 410 ($ES_1$) becomes overloaded while processing the frames for video segments k−1 to k+1 (e.g., due to those frames containing underlying video content that requires more processing than usual). Accordingly, edge node 410 ($ES_1$) uses a peer selection algorithm (e.g., described below) to select a peer edge node 420 ($ES_2$) to handle the processing of video segment k+2 (e.g., the next video segment to be processed in the receive buffer 414a). Edge node 410 ($ES_1$) then replicates video segment k+2 to peer edge node 420 ($ES_2$) (e.g., as described below) for processing.

(7) Edge node 410 ($ES_1$) also persistently stores video segment k+2 in low-latency persistent memory 415 (e.g., 3D XPoint persistent memory) before reclaiming the corresponding memory 414a in the receive buffer. In this manner, video segment k+2 is made durable locally and can be recovered later in the event edge node 410 ($ES_1$) or edge node 420 ($ES_2$) crashes.

(8) Peer edge node 420 ($ES_2$) receives the replicated video segment k+2 from edge node 410 ($ES_1$), and peer edge node 420 ($ES_2$) performs the requisite compute tasks on that video segment (e.g., object identification and tracking) on behalf of edge node 410 ($ES_1$).

(9) Peer edge node 420 ($ES_2$) reports its compute results (e.g., identified object C) to the management MySQL server 406.

(10) Peer edge node 420 ($ES_2$) then notifies edge node 410 ($ES_1$) that video segment k+2 has been processed, and edge node 410 ($ES_1$) can then reclaim the persistent memory 415 that was used to store video segment k+2.

As noted above, when an edge node 410 becomes overloaded, it uses a peer selection algorithm to select a peer edge node 420 to handle the processing of certain video segment(s), which are replicated from the original edge node 410 to the peer edge node 420. The peer selection algorithm uses the load status of all available edge nodes to select the appropriate peer node to handle the offloaded processing and rebalance the overall processing load. Accordingly, load status information must be collected from all edge nodes. For example, all edge compute nodes involved in this collaborative video analytics pipeline must share their system load status to allow overloaded edge nodes to choose optimal peer edge nodes for offloading compute tasks and rebalancing the overall load.

Any suitable approach can be used to share load status information among edge nodes. In some embodiments, for example, each edge node may periodically broadcast or multicast a "heartbeat" that indicates its current load status. Alternatively, edge nodes may use a shared distributed in-memory key-value (KV) store or cache (e.g., memcached or Apache ZooKeeper) to collect and share load status information.

An example peer selection algorithm is described below. However, it should be appreciated that this peer selection algorithm is merely presented as an example, as other peer selection algorithms can also be used.

In this example peer selection algorithm, assume the set of edge server nodes is denoted as $E=\{ES_1, ES_2, \ldots, ES_n\}$, with total of $n=|E|$ edge server nodes. In addition, assume the load for an edge server $ES_i$ is denoted as $L_i$, $i=1 \ldots n$. The process for an overloaded edge server $ES_i$ to select a peer to handle the processing of certain replicated video segment(s) involves the following steps:

(1) Collect the load status $L_i$ from the most recent timestamp t from all edge servers. If the load status for an edge server has not yet been received for timestamp t, then use the load status from timestamp t−1 for that edge server.

(2) Generate an ordered set E' from E with the load sorted from low to high. For example, assuming $E=\{ES_1: L_1=50\%, ES_2:L_2=70\%, ES_3:L_3=40\%, ES_4:L_4=60\%, ES_5:L_5=90\%\}$, then $E'=\{ES_3:L_3=40\%, ES_1:L_1=50\%, ES_4:L_4=60\%, ES_2:L_2=70\%, ES_5:L_5=90\%\}$.

(3) Generate the peer selection set $E_p$ as a subset of E', where $E_p$ contains the first m elements from E'. The value of m is a preconfigured load balancing factor that can changed at runtime. As an example, if the total number of edge nodes is 10, then m may be set to a value of 4 (e.g., m=4 for n=10). This allows the load to be distributed evenly without potentially overloading other servers. Thus, $|E_p|=m<=|E'|=n$, and $E_p$ is defined as:

$$E_p = \{ES_k, \text{ where for all } ES_i \text{ in } E'-E_p, L_i > L_k\}. \quad (1)$$

(4) Calculate average load $L_p$ from the peer selection set $E_p$:

$$L_p = \Sigma L_k/|E_p|, \text{ for all } ES_k \text{ in } E_p. \quad (2)$$

(5) Select the replication peer node $ES_r$ whose load has the minimal distance to the average load ($L_p$) of the peer selection set ($E_p$):

$$ES_r \text{ in } E_p \text{ where } \|L_r-L_p\|=\min\{\|L_k-L_p\|\} \text{ for all } ES_k \text{ in } E_p. \quad (3)$$

The above replication peer selection algorithm is designed to allow an overloaded edge server to select a peer $ES_r$ that has enough load to spare, while simultaneously avoiding the scenario where $ES_r$ becomes overloaded due to a burst of replication requests from multiple overloaded edge compute servers. For example, the algorithm limits the peer node candidates to a smaller peer selection set ($E_p$) and chooses the node whose load is the closest to the average load ($L_p$) for that set, as opposed to simply choosing the node with the lowest load. As a result, the same peer node is less likely to be repeatedly selected by a burst of overloaded nodes (e.g., which could potentially cause the selected peer node to become overloaded itself), as its load will likely deviate far enough from the average load relatively quickly upon being selected as a peer node, thus causing a different peer node to be selected by the next overloaded node. Moreover, this algorithm is scalable based on the total number of edge servers.

Once the peer node 420 is selected, the overloaded node 410 can then offload the processing of the next video segment in its receive buffer 414a to the peer node 420. In some embodiments, for example, the overloaded node 410 may deliver the offloaded video segment to the peer node 420 using a fast replication mechanism, which may be designed to achieve low latency using a "zero-copy" implementation that avoids memory copy operations. For example, the system memory 414a containing the video segment on the overloaded node 410 may be reused to replicate the video segment over the local network to the peer node 420 (e.g., using network transmission DMA acceleration). Moreover, if the video segment is still in the CPU cache of the overloaded node 410, it can be replicated directly from the CPU cache (e.g., using Intel Data Direct I/O) rather than from main memory.

In this manner, a video segment can be replicated directly from system memory 414 of the overloaded node 410 into system memory 424 of the peer node 420 (e.g., over the local network via the respective network interface controllers (NICs) 416, 426 of the edge nodes 410, 420). In particular, the replication may be performed directly between the CPU caches, main memories, persistent memories 415, and/or other forms of system memory 414, 424 of the respective edge nodes 410, 420. For example, in some embodiments, Intel Data Direct I/O may be leveraged to replicate the video segment directly between the CPU caches of the respective edge nodes 410, 420 (e.g., avoiding the latency associated with a subsequent CPU cache miss that requires a main memory access).

Moreover, various approaches can be used to replicate the video segment from system memory 414 over the local network, such as remote direct memory access (RDMA) and/or RDMA over Converged Ethernet (RoCE). For example, RDMA enables direct memory access (DMA) from the memory of one node into that of another node with no or minimal involvement from the CPUs 412, 422 and operating systems of the respective nodes 410, 420, while RDMA over Converged Ethernet (RoCE) is a network protocol that implements RDMA over an Ethernet network. RDMA supports zero-copy access by enabling the network interface controllers 416, 426 to transfer data directly to and from the appropriate memory locations 414, 424 on the respective nodes 410, 420, thus eliminating the need to copy the data between multiple memory locations within each individual node. As a result, RDMA can be used to achieve high-throughput and low-latency for replication of video segments between nodes 410, 420. Alternatively, a similar benefit can be achieved using a low-latency polling mode TCP/IP stack in user space, such as the Data Plane Development Kit (DPDK).

The overloaded edge node 410 also persists the video segment locally in low-latency persistent memory 415 (e.g., 3D XPoint persistent memory) before reclaiming the corresponding memory 414a in the receive buffer. In this manner, rather than dropping the video segment, the video segment is locally preserved and can be recovered in the event of a crash.

Further, in some embodiments, the replication mechanism discussed above may replicate the video segment directly from persistent memory 415 of the overloaded node 410 to the peer node 420. In some embodiments, for example, persistent memory 415 may be treated as part of the overall system memory 414 of a node 410. Accordingly, in order to persist the video segment file with low latency, the overloaded node 410 may leverage memory-to-memory DMA from the volatile domain (e.g., DRAM) to the non-volatile domain (e.g., persistent memory (PM)). This can be achieved using a software framework such as the Persistent Memory Development Kit (PMDK).

Persistent memory 415 is beneficial in this context because it is a cost-effective solution that combines the benefits of both volatile memory and non-volatile storage. For example, persistent memory 415 provides persistent data storage and increased storage capacity comparable to non-volatile storage, while also providing low-latency access comparable to volatile memory.

Figure 5:
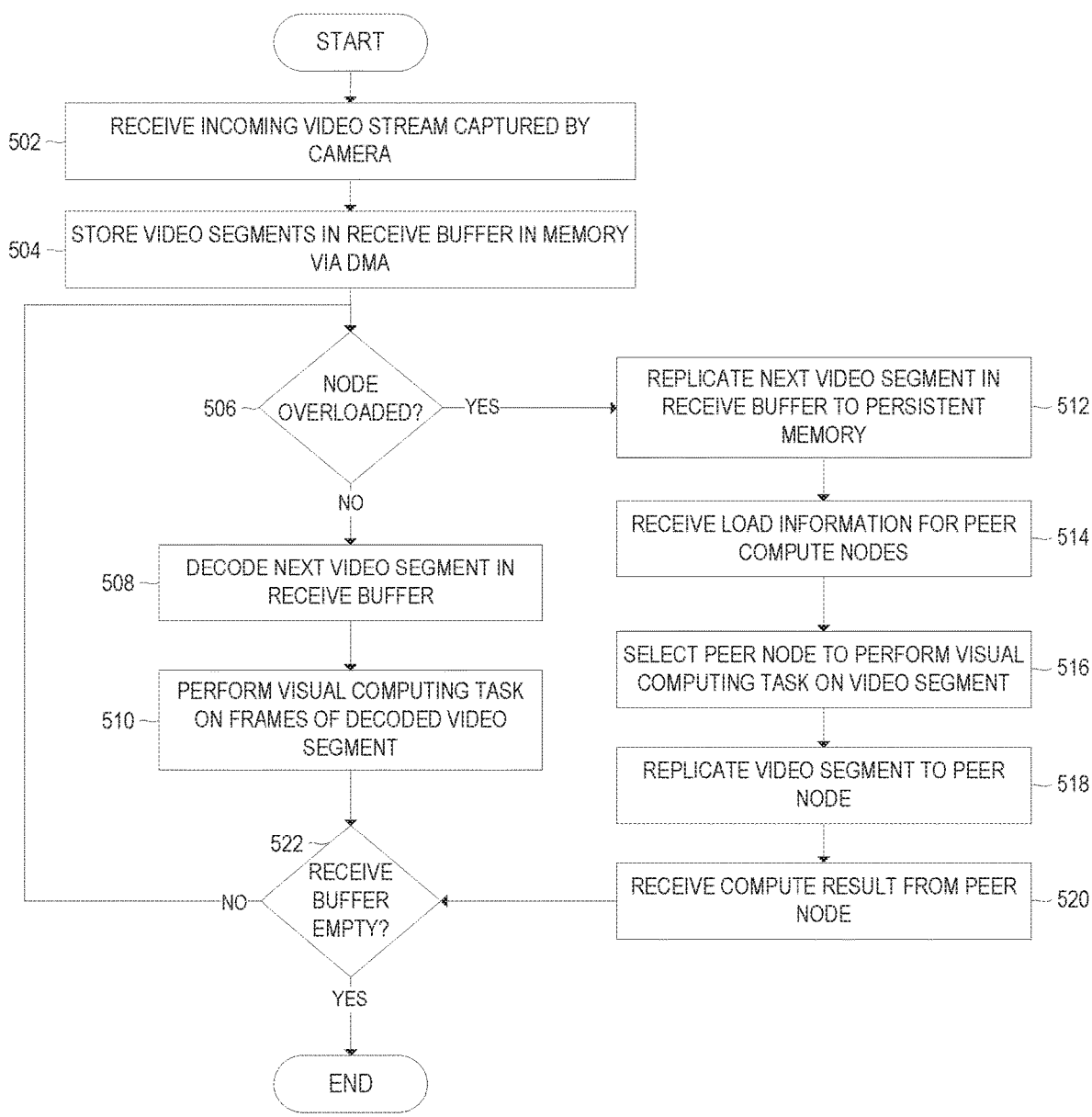
FIG. 5 illustrates a flowchart for an example embodiment of dynamically rebalancing edge video streaming resources.

FIG. 5 illustrates a flowchart 500 for an example embodiment of dynamically rebalancing edge video streaming resources. In some cases, for example, flowchart 500 may be implemented by an edge compute node based on the embodiments described throughout this disclosure (e.g., edge compute node 410 of FIG. 4).

The flowchart begins at block 502, where an incoming video stream captured by a camera is streamed to, and received by, an edge compute node. In general, an edge compute node can include any processing device deployed at or near the edge of a communication network (e.g., an edge compute server). Moreover, in some embodiments, the edge compute node and the camera may be connected to the same local network, along with other peer edge compute nodes and cameras. Further, video captured by the camera may be streamed to the edge compute node over the local network (e.g., using a streaming protocol). For example, the edge compute node may receive an incoming video stream over the local network (e.g., via a network interface and/or network interface controller (NIC)), which contains a sequence of video segments encapsulated in packets. Thus, based on the corresponding streaming protocol, the incoming packets may be reassembled into video segments.

The flowchart then proceeds to block 504 to store the video segments in a receive buffer in system memory of the edge compute node. In some embodiments, for example, a direct memory access (DMA) transfer may be performed to transfer the video segments from a network interface controller (NIC) of the edge compute node directly into the receive buffer in system memory. Moreover, in various embodiments, the system memory may include any combination of volatile and/or non-volatile memory, such as main memory (e.g., random access memory), processor caches, persistent memory (e.g., 3D XPoint memory), and so forth.

The flowchart then proceeds to block 506 to determine if the edge compute node is overloaded. In some cases, for example, the edge compute node may become overloaded while receiving and processing the incoming video stream. For example, while the edge node is processing video frames from decoded video segments, the edge node may continue receiving new video segments at a faster rate than the current video frames are being processed. As a result, the receive buffer (e.g., video segment memory) may be running low on memory or may otherwise become full, resulting in a resource overload. This resource overload may impede the edge node from continuing to receive video segments and process frames without eventually being forced to drop certain video segments.

Thus, in some embodiments, the edge node may detect when its resources become overloaded so it can offload certain processing to other peer compute nodes. For example, if a resource overload is detected, it may cause the edge node not to process the next video segment in the receive buffer, and instead offload the processing of that video segment to another peer node.

In various embodiments, for example, the edge node may detect a resource overload if the receive buffer is full, or if the receive buffer otherwise exceeds a memory utilization threshold (e.g., the percentage of the receive buffer's overall capacity that is currently being used exceeds a threshold). Alternatively, any other metric may also be used to detect when the edge node's resources have become overloaded.

If it is determined at block 506 that the edge node is not overloaded, the flowchart then proceeds to block 508 to decode the next video segment in the receive buffer. For example, the next video segment in the receive buffer is decoded into raw video frames, and the raw video frames are then stored back in memory.

The flowchart then proceeds to block 510 to perform a visual computing task on the raw video frames from the decoded video segment. The visual computing task, for example, can include any compute task (e.g., an operation, function, algorithm, and/or workload) that processes and/or interprets visual data, such as object identification and tracking, facial recognition, event detection, and so forth. The result of the visual computing task (e.g., an indication of identified objects, people, and/or events) may then be stored back in memory, and/or may be returned and/or reported to an appropriate destination, such as a database or management server, visual computing application, and so forth. The flowchart then proceeds to block 522, as described further below.

If it is determined at block 506 that the edge node is overloaded, however, the flowchart then proceeds to block 512, where the overloaded edge node replicates the next video segment in the receive buffer to persistent memory. In some embodiments, for example, the memory of the overloaded edge compute node may include both volatile memory (e.g., random access memory) and persistent memory (e.g., 3D XPoint memory). Moreover, the receive buffer containing the incoming video segments may be stored in the volatile memory. If the edge node becomes overloaded, however, the next video segment in the receive buffer may be replicated from the volatile memory to the persistent memory (e.g., using a DMA transfer), and the corresponding portion of the volatile memory may be subsequently freed or reclaimed.

The flowchart then proceeds to block 514, where the edge compute node receives load information for the other peer compute nodes on the local network. In various embodiments, for example, all edge compute nodes on the local network may broadcast or report their current load status to each other, either periodically or on demand. In this manner, the overloaded edge compute node receives load information from all of its peer compute nodes on the local network.

The flowchart then proceeds to block 516, where the edge compute node selects a peer compute node to perform the visual computing task on the video segment from block 514. In some embodiments, for example, the edge compute node uses a peer selection algorithm to select one of its peer compute nodes based on the load information received for the peer nodes at block 512.

First, the peer selection algorithm may identify a subset of peer compute nodes whose loads are the lowest. For example, the subset may contain a particular number or percentage of the full set of peer nodes whose loads are the lowest. In this manner, each peer node in the subset has a lower load than all other peer nodes that are not in the subset.

Next, an average load is computed for the subset of peer compute nodes based on the corresponding load information.

Finally, the peer node from the subset of peer compute nodes whose load is closest to the average is selected to perform the visual computing task.

The flowchart then proceeds to block 518, where the overloaded edge node replicates the video segment from block 514 to the selected peer compute node.

In some embodiments, for example, the video segment may be replicated using a low-latency replication mechanism, such as a zero-copy networking transfer using direct memory access (DMA) and/or remote direct memory access (RDMA), or a low-latency polling mode TCP/IP stack in user space, such as the Data Plane Development Kit (DPDK).

For example, in some embodiments, a DMA and/or RDMA transfer of the video segment may be performed directly from the system memory (e.g., processor cache, main memory, and/or persistent memory) of the overloaded edge compute node to the system memory (e.g., processor cache, main memory, and/or persistent memory) of the peer compute node. In some cases, for example, the video segment may be transferred directly from the processor cache of the overloaded node to the processor cache of the peer node (e.g., using Intel Data Direct I/O).

The flowchart then proceeds to block 520, where the overloaded edge node receives a compute result from the peer node. For example, after the peer node receives the replicated or offloaded video segment from the overloaded edge node, the peer node performs the visual computing task on the video segment, and the peer node then sends the compute result from the visual computing task (e.g., an indication of identified objects, people, and/or events) back to the overloaded edge node. The overloaded edge node may then store the compute result back in memory, and/or may return or report the compute result to an appropriate destination, such as a database or management server, visual computing application, and so forth.

The flowchart then proceeds to block 522 to determine whether the receive buffer is empty. If the receive buffer is not empty, the flowchart proceeds back to block 506 to continue processing video segments in the receive buffer. If the receive buffer is empty, however, the incoming stream has been fully processed, and the flowchart is complete.

At this point, the flowchart may be complete. In some embodiments, however, the flowchart may restart and/or certain blocks may be repeated. For example, in some embodiments, the flowchart may restart at block 502 to continue receiving and processing incoming video streams.

Automated Capacity Planning for Dynamic Environments

Current approaches to capacity planning are static and offline. Edge infrastructure service providers cannot dynamically and optimally provision virtual and physical capacity across the multiple service classes that sit across globally distributed infrastructure, as they do not have continual planning decision support.

With the growth of edge computing scenarios, today's infrastructure is becoming more heterogeneous, dynamic, distributed, and more modular in nature, hosting multiple virtualized services. This increases the difficulty in conducting business capacity, service capacity, and component capacity planning to meet current and future requirements in a cost-effective manner. Moreover, the challenges of capacity planning are exasperated as application workloads continue to grow more diverse, heterogeneous, and dynamic and are further affected by user mobility, traffic distributions, and other external factors.

Current capacity planning solutions focus only on datacenter capacity planning methodologies and systems, showing total cost of ownership (TCO) advantages when considering operating costs (e.g., power), quality of service (QoS) (e.g., latency), and number of servers with compute capacity, or when comparing extending capacity in existing locations versus building in new locations for improved TCO.

Opportunistic thresholds based on manual devised growth estimates have also been provided, but there is limited simulation work (primarily in academic deployment scenarios) and limited online methodologies and tools, with available technologies focused primarily on energy consumption costs.

These standard capacity planning practices rely on manual static determinations of resource capacity, and use very opportunistic thresholds to add capacity into a system, which is inefficient and often results in costly overprovisioning of capacity within the system. Simulation work and the limited online planning methodologies focus only on specific workloads primarily with respect to their energy/power consumption costs, which does not offer the holistic insights required to optimally plan and place applications and their workloads. There is also limited work that considers the distribution of resources from the cloud to the edge, with very restrictive runtime models for workloads to reduce the complexity of the deployment scenario.

Accordingly, this section presents a solution that provides automated capacity planning for dynamic environments. The described orchestration and resource management solution is capable of automatically ordering additional resource capacities, such as automatically purchasing a particular type and quantity of compute resources (e.g., physical hardware and/or virtual resources in the cloud) that are determined to be optimal (e.g., targeting optimized features). In some embodiments, for example, the solution may include the following aspects:

(1) a 'resource reasoning and planning module' (RRPM) that complements existing resource managers/orchestrators by enabling continuous capacity planning, near-term scheduling decisions, and business/purchasing decisions;

(2) a model-based mechanism/subsystem for expression and reasoning between different stakeholders (in space and time) based on different objectives capturing used and available capacity, dynamicity of the system, dynamicity of the workload, and dependability of a distributed edge platform, among other examples; and (3) a method/subsystem that allows for 'what-if' and forward-looking planning capabilities while comprehending future and dynamic changes in resources availability and resource requirements.

The described solution provides numerous advantages, including:

(1) shifting from manual static determination of resource capacity to an automated optimized means of capacity planning aiding real-time, near-real-time, and longer-term resource allocation decisions;

(2) allowing for customers and service providers to automatically plan for optimal capacity; and (3) improving return on investment (ROI) and reducing qualification time for customers by optimally leveraging computing resources at the edge.

As noted above, challenges facing capacity planning in distributed edge systems require intelligent automated capacity planning. Such automated planning involves balancing multiple objectives (e.g., focusing on maximizing total cost of ownership (TCO) and quality of service (QoS)) across multiple stakeholders (e.g., infrastructure provider, service provider, end-user), whereby details of a set of dynamic workloads and/or applications is available. This solution focuses on encapsulating this intelligence into a 'resource reasoning and planning module', termed as the RRPM, that provides insights for optimized 'forward-looking' and immediate planning recommendations with ongoing calculation of current and additional available capacity.

Figure 6:
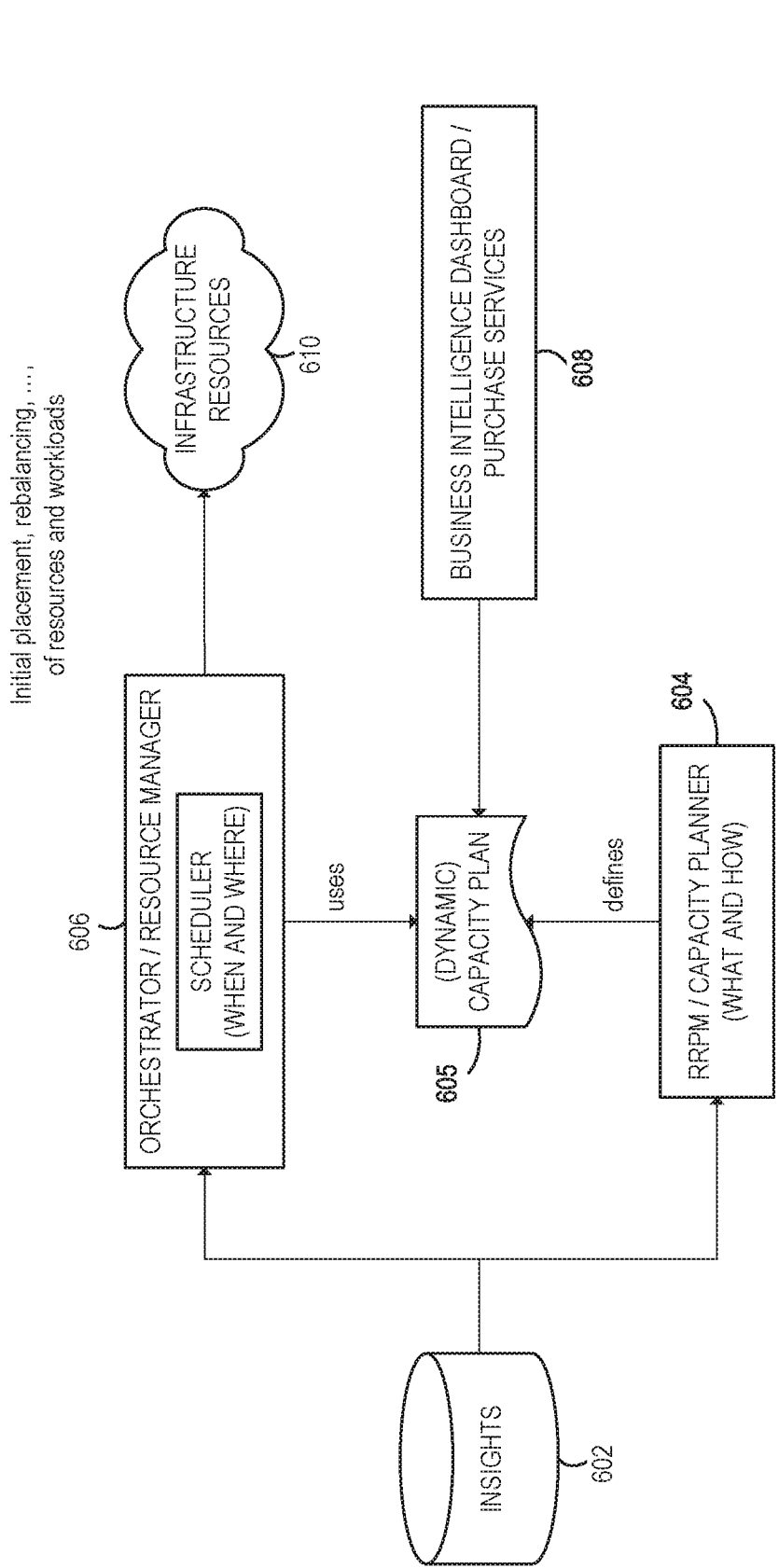
FIG. 6 illustrates an example architecture for managing compute infrastructure using a resource reasoning and planning module (RRPM).

FIG. 6 illustrates an example architecture 600 for managing compute infrastructure 610 using a resource reasoning and planning module (RRPM) 604. This architectural diagram outlines the interaction of RRPM 604 with the other components available for managing compute platforms. For example, based on various insights 602 associated with the infrastructure and workloads, the RRPM 604 outputs a capacity plan 605. The capacity plan 605 can help inform a scheduling component of an orchestrator/resource manager 606 to make spatial and temporal workload placement decisions (in the near and longer term), as well as inform business decisions (e.g., via business intelligence dashboard 608) on adding additional capacity to the infrastructure 610 to maintain an overall optimal infrastructure capacity.

Figure 7:
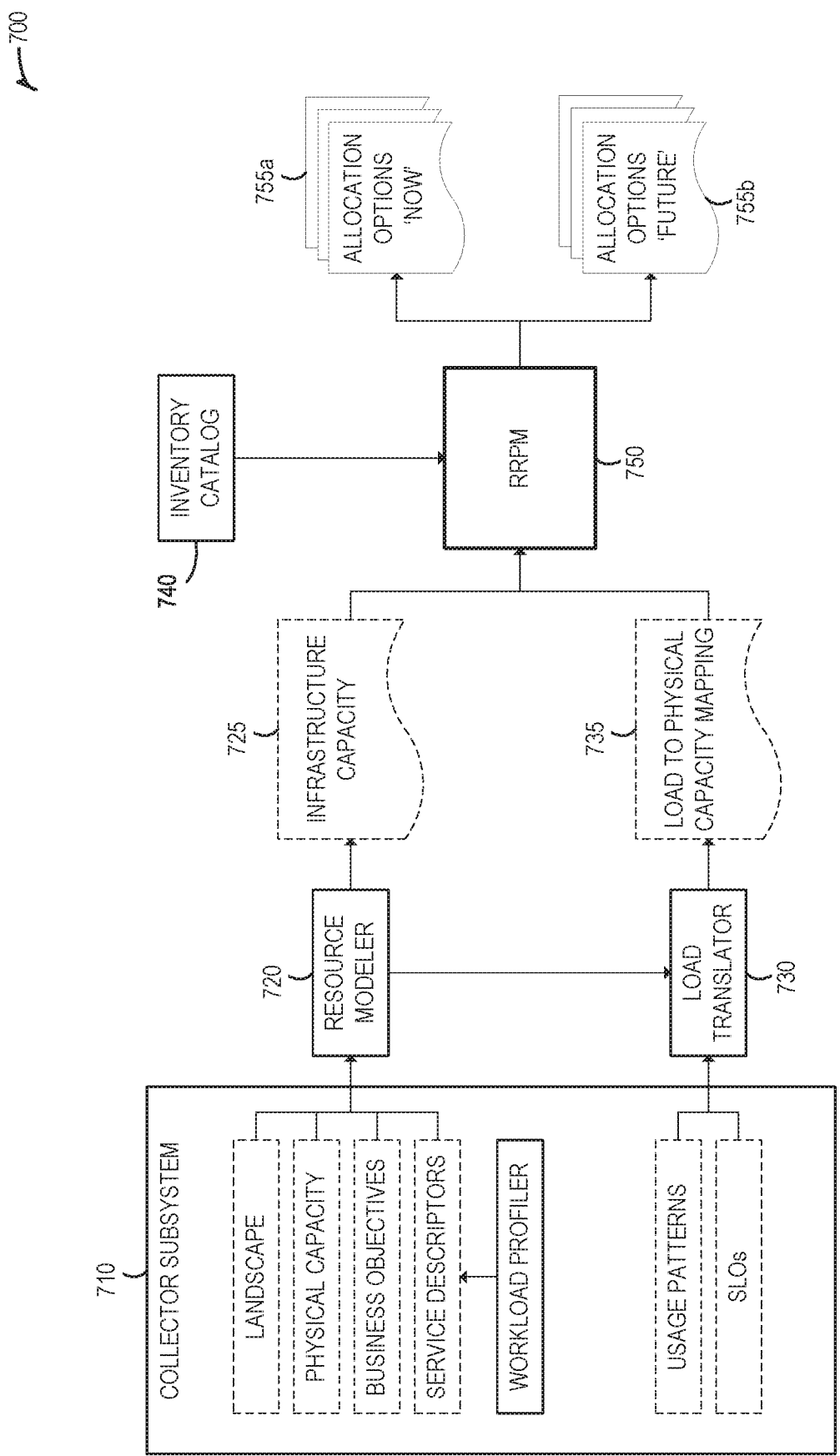
FIG. 7 illustrates an example embodiment of an automated capacity planning system.

FIG. 7 illustrates an example embodiment of an automated capacity planning system 700. In the illustrated example, the core of the capacity planning solution is the RRPM component 750 (e.g., described above in connection with FIG. 6). The process of determining an optimal plan involves a flow of information through the components of the system 700.

For illustration purposes, the functionality of system 700 is described in connection with an example scenario. While this example is simplified in complexity for purposes of illustration, the described solution can also be used to address more complex scenarios.

The example is defined from an infrastructure provider perspective, requiring the system to present capacity planning results over three time slots, T1 to T2, T2 to T3, and T3 to T4, over two resources R1 and R2. There is a service S1 running on resource R2, and two service requests incoming, namely S2 and S3. The process of performing automated capacity planning for this example using system 700 is described below.

The first step involves collection of infrastructure and application Information. For example, the collector subsystem 710 collects a variety of infrastructure-related and service-related information.

The infrastructure-related information may include the following types of information:
(1) Landscape of infrastructure: A landscaper subsystem may be used to collect details on the physical and logical resources and service instances available on the infrastructure, including geographical, topological, and contextual details of the individual entities. The landscape, for example, may hold details on how a set of virtual machines (VMs) are being deployed on a physical server (e.g., VM sizes/configurations pinned to particular physical cores).
(2) Physical capacity: A telemetry subsystem may be used to capture information on available capacity from physical resources, such as compute resources (e.g., number of physical cores available and used), memory resources (e.g., available and used random access memory (RAM)), network resources (e.g., bandwidth available and consumed for each network interface controller (NIC) and single root input/output virtualization (SR-IOV) channel), and storage resources (e.g., available and used disk space).
(3) Business objectives of resource provider: Details on the business objectives of the resource provider may be collected, such as target values for key performance indicators (KPIs) related to the business objective(s) of the provider. As an example, these business objectives may include notions of "optimal" gross profit versus total cost of ownership (TCO), service distribution, and data localization.
(4) Service descriptors: Optimal service descriptors are determined, such as details on the optimal configuration and setup of (a set of) virtual machines (VMs), containers, and so forth. This includes input from a workload profiler that details how end-users use the service and how the performance of the workload is impacted. The workload profiles can be used to predict the behavior of current or future workloads. As an example, a trace can detail the number of Netflix end-user requests over a particular duration of time. In this example scenario, the profile may include information on how the two services will stress the resources.

The service-related information may include the following types of information:
(1) Usage patterns: The telemetry subsystem may capture usage patterns on how end-users of a service consume the capacity made available to the service. As an example, the usage patterns may include information on the number of bytes transmitted or received.
(2) Service-level objectives (SLOs) of the service owner: Details on the service-level objectives (SLOs) of the service owner may be collected, such as target values for KPIs related to the business objective(s) of the service owner or service provider. As an example, the service-level objectives may include details on the latency, throughput, runtime, and/or availability requested by the service owner.

With respect to the example scenario noted above, the landscape information presents details on two resources, R1 and R2, and two service instances, S1 and S2, each composed of one VM. The infrastructure KPI is the total cost of the infrastructure, and the service SLO is its performance, measured in terms of the application latency.

The second step involves modeling the available and requested capacity of the infrastructure. For example, informed by the information from the collector subsystem 710, a resource modeler 720 determines current and future (based on predictions) available capacities 725 for the resources and the service instances available. This will be carried out over a variety of tunable time windows (e.g., 1 s, 1 m, 1 h, and so forth). The computation is performed based on the following types of information:
(1) Resource capacity: The resource capacity quantifies the assigned versus available capacity of platform features of a resource, which can include notions of over- and under-provisioning. As an example, it may be determined that 12 out 24 sockets of a physical CPU are assigned to VMs.
(2) Processing capacity: The processing capacity quantifies the usage of the resources and service in the landscape. As an example, based on utilization and saturation metrics, it may be determined that the 24-socket CPU is only used 5% of the time.

Figure 8:
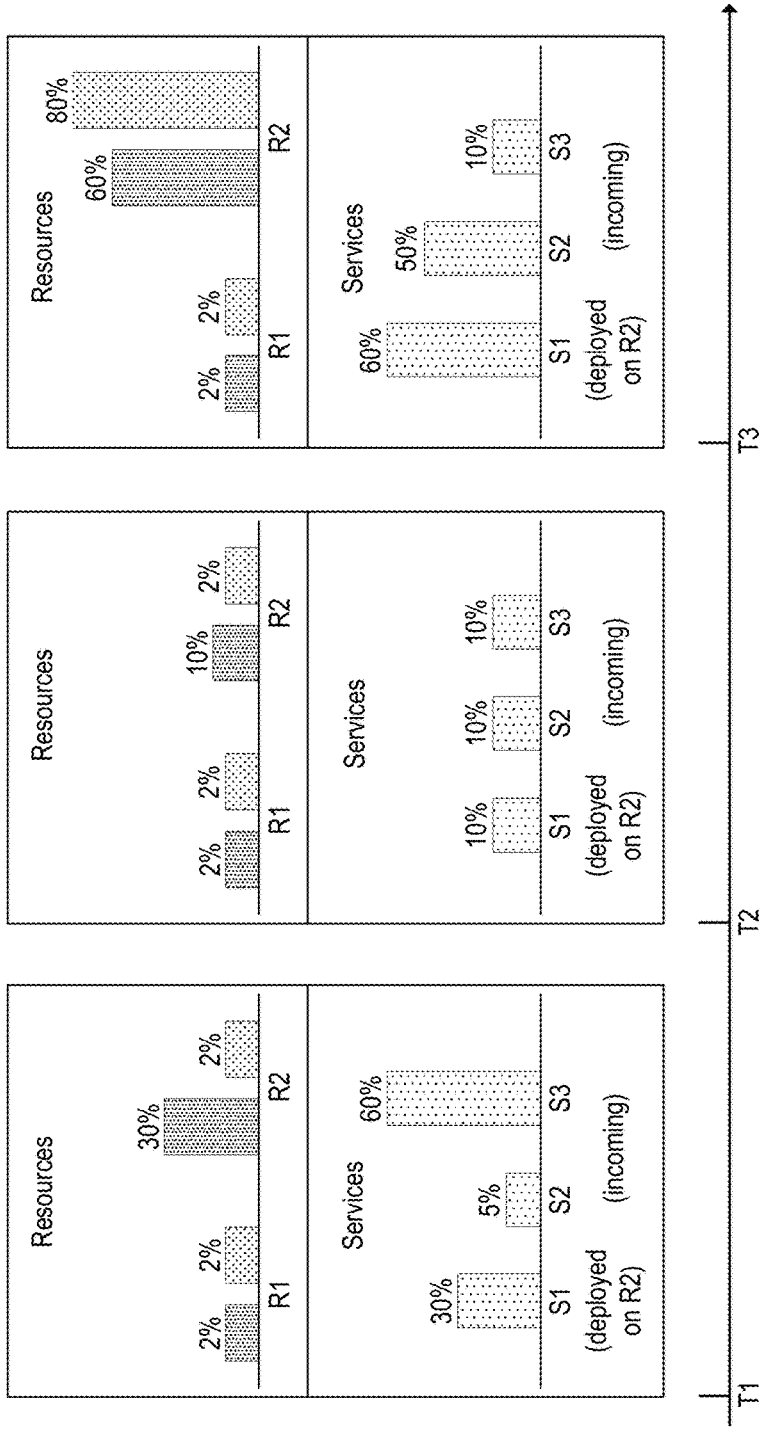
FIG. 8 illustrates a capacity chart for a consolidated infrastructure model based on existing resources.

With respect to the example scenario noted above, the consolidated infrastructure model for two resources is presented as a capacity chart in FIG. 8.

The third step involves quantification of service-to-resource mappings using a load translator 730. For example, based on the infrastructure capacity information from the resource modeler 720, along with the usage patterns and service level objectives (SLOs) from the collector subsystem 710, a load translator 730 determines and quantifies potential mappings of services to resources in order to compare, contrast, and tradeoff various placement options. The quantification can be based on cost/utility functions that provide a notion of how optimal the particular mapping is able to perform. This can comprehend insights based on understandings gained through machine learning. This process is described further in U.S. patent application Ser. No. 15/361,905, filed on Nov. 28, 2016, and entitled "COMPUTING INFRASTRUCTURE RESOURCE-WORKLOAD MANAGEMENT METHODS AND APPARATUSES," the contents of which are hereby expressly incorporated by reference.

With respect to the example scenario noted above, the quantification is defined as follows:
(1) For service S1, Resource R2's features>R1's features (e.g., CPU/compute features such as Intel Architecture (IA) features) to support better performance with no penalty when application capacity allocation is not made in the timeslot requested; and
(2) For service S2, Resource R1's features>R2's features (e.g., CPU/compute features such as IA features) to support better performance with 20% penalty when application capacity allocation is not made in the timeslot requested.

The fourth step involves comprehending inventory. For example, an inventory catalog subsystem 740 persists a catalog of available resources and configurations that can be added to the existing computing infrastructure, along with the times at which any of those resources are requested to be deployed/placed in the infrastructure. This can be an extension of the current infrastructure landscape from the collector subsystem 710.

With respect to the example scenario noted above, the inventory catalog subsystem: (1) provides details on one server R3 that has been ordered and will be available for use at time T2, whose configuration has higher memory; (2) informs on the possibility of including server R4 at any time from T1 to T3; and (3) provides details on configurations for resources R3 and R4 (e.g., configurations of CPU/compute features).

The fifth step involves reasoning and planning with respect to the infrastructure capacity. For example, the information from the steps above (e.g., current infrastructure capacity 725, load to physical capacity mapping 735, inventory catalog 740) serve as input to the RRPM 750, which is responsible for performing automated capacity planning. This is handled by two tasks, namely reasoning and planning, that are continuously invoked in combination to support automation and coherent planning. The definitions and functions of these tasks are detailed below.

The reasoning task is responsible for balancing out all the objectives (across stakeholders) for a given time window, considering the resources and service present within the same. It incorporates the following functions:
(1) Collating inputs from the resource modeler and the inventory catalog to continuously provide an updated capacity assessment for all infrastructural resources. This also includes estimating minimal processing capacity required to ensure optimal resource performance (defined as a threshold) and includes resource performance characterization (e.g., CPU/compute performance characterization) for the same.
(2) Collating inputs from load to physical capacity mappings are used for better assessment of the capacity required by the application. This value might possibly be more or less than what had originally been determined in the application model. As such, this additional assessment is crucial to the system and proposed added value.
(3) Based on a set of applicable states, the module computes utilities (for various objectives for multiple stakeholders, such as desired levels of dependability, throughput, TCO, and so forth) and considers tradeoffs over a given timeframe(s) (e.g., using techniques such as game theory, fuzzy logic, system auctioning, and so forth). This is in order to find the best optimal mapping for the set of states, for the current or look-ahead time over which capacity should be determined.

The planning task is responsible for providing possible actions that change the capabilities available in the environment. It incorporates the following functions:
(1) Computing various states and actions (that capture for example time, space, dynamicity of workloads, dynamicity of infrastructure) that can be performed to transition between states. This comprehends the timeslots within which they are applicable that the system can assume. This is called N-dimensionality analysis, as it calculates the degrees of freedom possible.
(2) Forward search to reach optimal goal state (given by business objective of the resource provider) by associating the state changes with changes of the calculated utilities from the reasoning component (e.g., using algorithms such as Anytime A*). The start state, the end state, and the actions can be dynamically adapted. This allows for comprehending futuristic states in the system, and hence influences near-term decisions. For example, at a future point more memory capacity will be available, but in the near term this can be accommodated by a cloud bursting scenario. This can inform the reasoning tasks.
(3) Estimating business/purchasing decisions by conducting 'what-if' scenarios based available inventory configurations and resource configuration updates that can inform an update to the future inventory.

Based on the reasoning and planning tasks, the RRPM 750 outputs allocation options 755a,b that are available both now and in the future. These outputs 755a,b can then be used by:
(1) An orchestrator or resource manager, whose scheduler can, based the on the knowledge of available capacities, make a decision on where to optimally place workloads. The RRPM essentially provides a suggestion on how to optimally place workloads based on utility assessments.
(2) A business intelligence (BI) dashboard or similar platform to enable purchasing decisions to be made. This can include long-term purchases of new computing hardware to bring additional capacities into the system, or short-term purchases such as renting capacities from cloud providers.

Figure 9B:
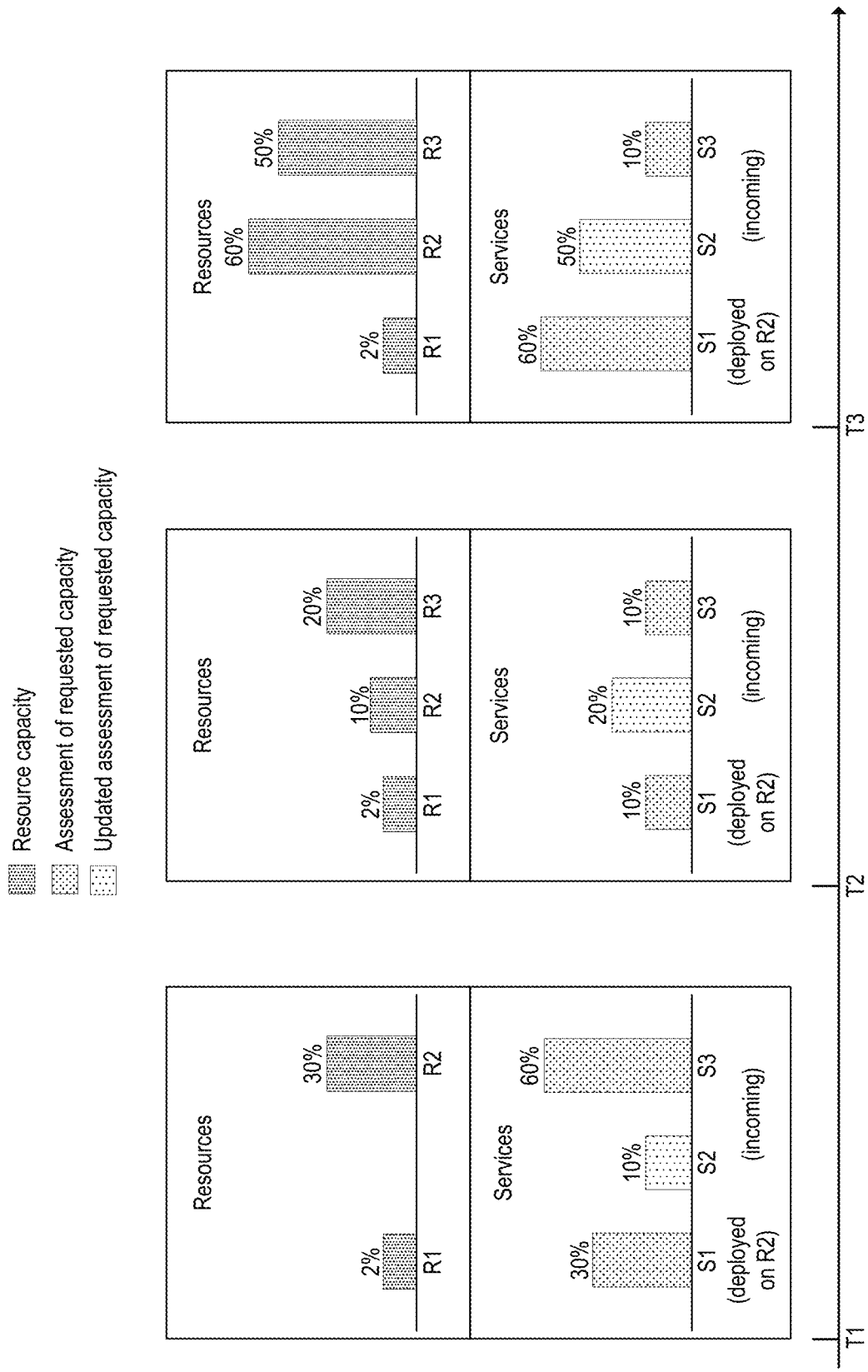
Figure 10:
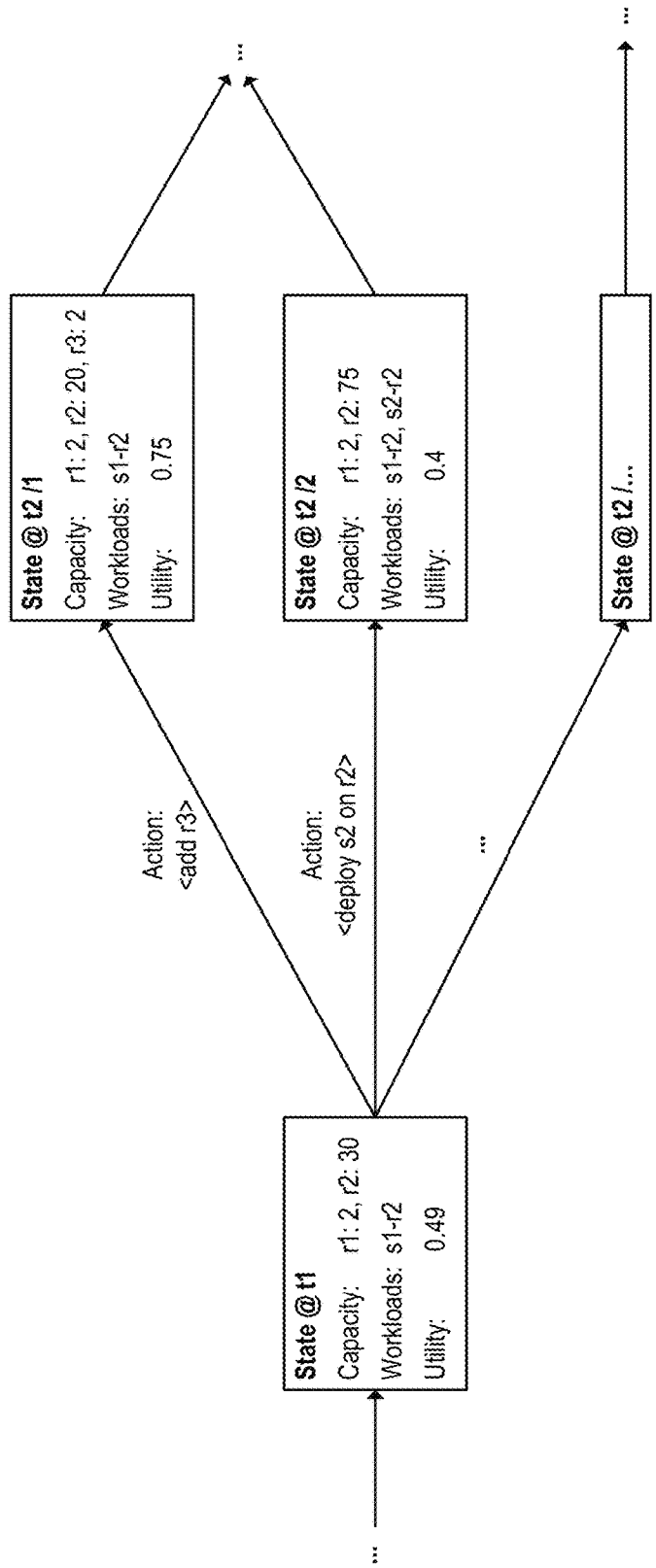
FIG. 10 illustrates a portion of a state graph for a resource capacity planning task.

With respect to the example scenario noted above, the reasoning and planning process is illustrated in FIGS. 9-10.

For example, based on the inputs from the previous steps, the initial view of the reasoning task can be represented as shown in FIG. 9A, which illustrates an updated capacity chart representing the consolidated infrastructure model for the original resources. For all resources and services, the capacities are calculated. Note that in this example, based on input from the load translator, the capacity requested by service S2 has increased from 5% to 10% in timeslot T1 to T2 and from 10% to 20% in timeslot T2 to T3 (in contrast to FIG. 8), which leads to a change in resource capacity for R2 (assuming S2 is not suited to be run on R1).

Based on the capacities, the objectives of the various stakeholder utilities are calculated to quantify how well the potential mapping of services to resources stake up to the optimal. These utilities are being used during the planning tasks to determine a best possible set of actions that can be performed. This is depicted in FIG. 10, which illustrates an excerpt of a state graph for a planning task.

Once the planner finds an optimal state transition, the updated capacity chart as seen by reasoning tasks will be updated accordingly, as shown in FIG. 9B. In this particular case, the best possible transition has been determined to be the addition of a new resource R3.

Figure 11:
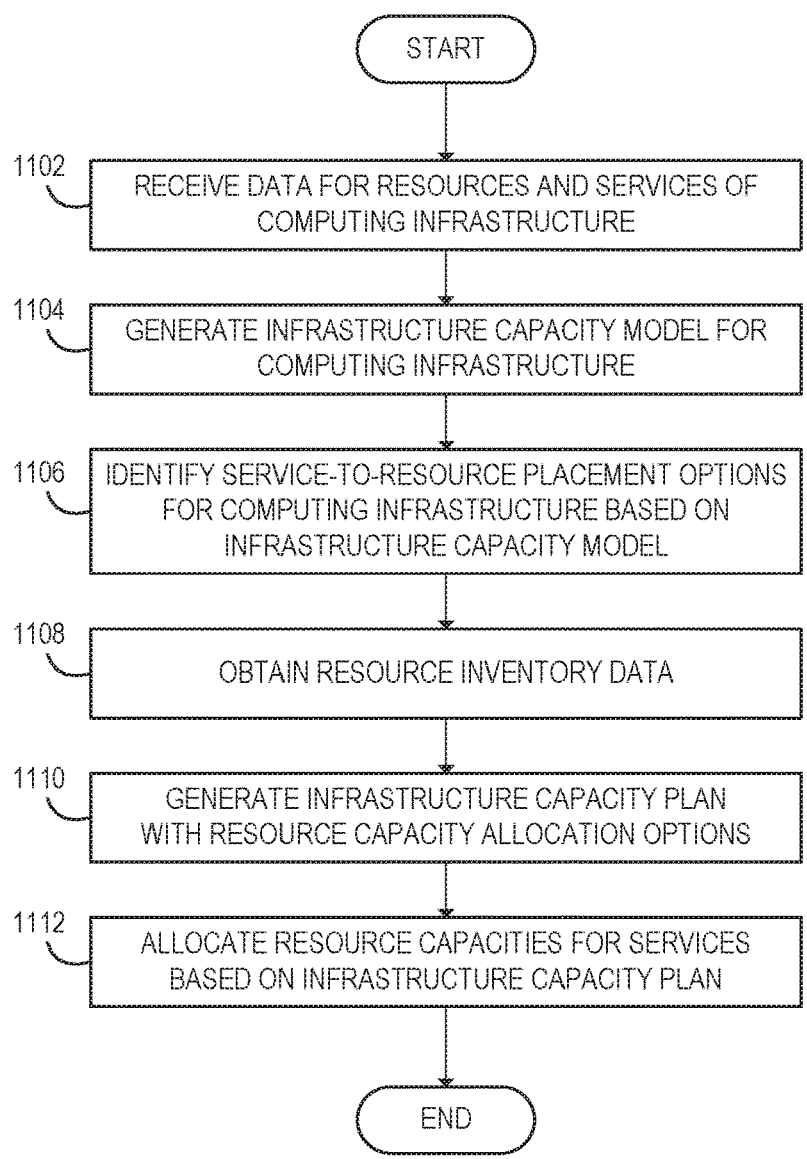
FIG. 11 illustrates a flowchart for an example embodiment of automated resource capacity planning.

FIG. 11 illustrates a flowchart 1100 for an example embodiment of automated resource capacity planning. In various embodiments, flowchart 1100 may be implemented using the embodiments and functionality described throughout this disclosure (e.g., the systems of FIGS. 6 and 7).

The flowchart begins at block 1102, where data associated with the resources and services of a computing infrastructure is received. In some embodiments, for example, the data may include infrastructure data and service data.

The infrastructure data contains information about the physical and/or logical resources in the computing infrastructure. The physical resources may include compute resources (e.g., general-purpose processors such as CPUs and processing cores, special-purpose processors such as GPUs and AI accelerators), memory resources, storage resources, network resources, and so forth. The logical resources may include virtual machines (VMs), containers, and any other virtualized resources provisioned on the physical resources (e.g., virtualized memory, network, and storage resources).

In some embodiments, for example, the infrastructure data may contain an infrastructure landscape that identifies the topology of the physical and logical resources in the computing infrastructure, the resource types, the capabilities and capacities of the resources, the services or workloads deployed across the resources, and so forth. The infrastructure data may also contain telemetry or usage data for the resources, which identifies the current usage and availability of the resource capacities. In some embodiments, the infrastructure landscape may be represented as an infrastructure model or graph, with nodes corresponding to the resources and edges corresponding to the communication links between the resources.

The service data contains information about the workloads of services and/or applications that are or will be deployed, placed, or executed across the resources of the computing infrastructure. For example, the service data may contain a workload model for each service or application to be deployed on the computing infrastructure. The workload model for a particular service or application may identify the underlying tasks of the workload, the task requirements, and the dependencies among those tasks. This may also be referred to as the application model, service model, service function chain, and so forth. In some embodiments, a workload model, application model, or service model may be represented as a graph, with nodes representing the underlying tasks/requirements and edges representing the dependencies among those tasks.

The flowchart then proceeds to block 1104, where an infrastructure capacity model is generated for the computing infrastructure based on the infrastructure data and the service data. The infrastructure capacity model represents the capacity of the computing infrastructure over a particular time window, such as its current capacity and its predicted future capacity over the particular time window. The infrastructure capacity model may be generated based on the current capacity and telemetry data for the resources in the computing infrastructure, existing services on the computing infrastructure, incoming service requests for new services, usage patterns, and predictions about future capacity based on this universe of information.

The flowchart then proceeds to block 1106 to identify service-to-resource placement options for the computing infrastructure based on the infrastructure capacity model and the service data. The service-to-resource placement options identify possible placements of the respective services or workloads across the respective resources of the computing infrastructure over the particular time window. For example, the placement options may identify possible mappings of the underlying tasks and dependencies of the services to the resources of the computing infrastructure, which may be determined based on the service requirements and the available capacities of the infrastructure resources.

The flowchart then proceeds to block 1108 to obtain resource inventory data for the computing infrastructure. The resource inventory data identifies an inventory of resources that are available to add to the computing infrastructure during the particular time window, which may be obtained from a resource inventory catalog. For example, the resource inventory catalog may identify resources that are available to request or order for inclusion in the computing infrastructure during the relevant time window, along with any such resources that have already been requested and will become available sometime during the time window. Moreover, the resources in the inventory catalog can include physical resources that can be purchased for deployment in the computing infrastructure (e.g., hardware components), along with logical/virtual resources that can be rented from other service providers (e.g., processing or storage capacity rented from a cloud service provider).

The flowchart then proceeds to block 1110 to generate an infrastructure capacity plan with resource capacity allocation options for the computing infrastructure. For example, the infrastructure capacity plan may be generated based on based on the infrastructure capacity model, the service-to-resource placement options, and the resource inventory data. Moreover, the infrastructure capacity plan provides resource capacity allocation options for the computing infrastructure, which identify various combinations of resource capacities that could potentially be allocated for the respective services in each time slot of the relevant time window.

In some embodiments, for example, the infrastructure capacity plan is generated based on an infrastructure state graph. The infrastructure state graph identifies possible states of the computing infrastructure that could occur based on possible resource capacity allocation actions that could be performed over the various time slots of the relevant time window. For example, the infrastructure state graph may include nodes corresponding to the possible states of the computing infrastructure over the respective time slots, and edges corresponding to the possible resource capacity allocation actions that could be performed to transition among the possible states. In particular, each state (or node) may identify the current resource capacities and service placements on the computing infrastructure at a particular time slot based on the capacity planning action(s) (or edges) that have been performed. For example, each state may identify the used and available capacity on each resource, the requested capacity for each service, the current mappings of services to resources, and so forth.

In this manner, utility scores can then be calculated for the possible states (or nodes) of the computing infrastructure based on a set of stakeholder objectives, such as the various objectives of the respective infrastructure provider, service providers, end users, and so forth. Based on the utility scores, an optimal path through the infrastructure state graph can then be identified, and the resource capacity allocation options corresponding to the optimal path can be extracted and included in the infrastructure capacity plan.

The flowchart then proceeds to block 1112, where resource capacities are allocated in the computing infrastructure for the respective services based on the infrastructure capacity plan.

For example, the infrastructure capacity plan may indicate that a first portion of the requisite resource capacities should be allocated in certain resources that are already deployed in the computing infrastructure, while a second portion of the requisite resource capacities should be allocated in new resources that can be added to the computing infrastructure from the resource inventory catalog (e.g., physical resources available for purchase or logical resources available to rent). Depending on the circumstances, the respective first and second portions of the resource capacities may be allocated in either the same or different time slots of the relevant time window.

After the requisite resource capacities have been allocated, the respective services may subsequently be orchestrated across the computing infrastructure during the relevant time window using the allocated resource capacities from the infrastructure capacity plan.

At this point, the flowchart may be complete. In some embodiments, however, the flowchart may restart and/or certain blocks may be repeated. For example, in some embodiments, the flowchart may restart at block 1102 to continue planning and allocating resource capacities in the computing infrastructure.

Insight-Driven Distributed Orchestration

In some cases, interconnected distributed systems at the edge in different management domains (e.g., a system-of-systems (SoS)) may cooperate to perform certain tasks. For example, a variety of resources may be offered by different stakeholders within their respective management domains. In certain cases, it might be necessary for the various systems across different management domains to combine their capabilities to perform the tasks at hand given resource constraints at the edge. As an example, the systems may cooperate to store datasets that are too large to store on any of the systems individually due to constraints on capacity, replication, and so forth. It can be challenging, however, to perform optimal placements of tasks and services (e.g., components of a workflow) across these complex systems. Moreover, the problem of placement and re-balancing of these services and tasks continues to increase in complexity given their heterogeneity, scale, and dynamicity.

Centralized orchestration solutions (e.g., Kubernetes, OpenStack, VMware, and so forth) could be used to perform the task of managing services at the edge with various stakeholders and management domains available. In this context, however, centralized orchestration solutions have various drawbacks. For example, centralized orchestration presents a single point of failure. Moreover, when the systems can move spatially and temporally, a centralized solution becomes infeasible. Furthermore, the inability to have multiple management domains involved in the decision making is not easy to solve, as centralized decision making requires all of the underlying knowledge locally.

Multi-agent systems could also be used to manage distributed systems by defining intelligent agents that cooperate to solve a task at hand. While multi-agent systems are interesting from an academic perspective and have been applied in fields such as robotics, their use has primarily been limited to ensuring full cooperation between the agents. Moreover, the use of machine learning (ML) models to capture insights in multi-agent systems is underdeveloped. Thus, multi-agent systems are currently unsuitable for performing multi-domain orchestration in an intelligent and optimal manner (e.g., using advanced insights derived from machine learning).

Further, decomposing services into sub-tasks for orchestration purposes is currently a very static process that requires the possible sub-tasks to be determined by developers. For example, current solutions for decomposing a service into sub-tasks require a developer to manually define the individual steps, which can be a time-consuming and tedious process.

Accordingly, this section presents a solution for performing distributed orchestration at the edge for capacity-constrained dynamic environments across different management domains. For example, the described solution leverages insights (e.g., derived using machine learning models capable of predicting service level key performance indicators (KPIs) based on given configurations) to help provide higher precision in the placement and re-balancing of tasks across management domains.

In some embodiments, for example, the described solution may include the following aspects:
 (1) discovery and advertisement of capabilities and capacities in a dynamic distributed system, while allowing for both the sharing of public information and hiding of private information;
 (2) insight-driven mapping of task(s) and/or sub-task(s) to the best suited resources in dynamic distributed environments while taking care of different management domains; and
 (3) enabling distributed orchestration and control for various types of dynamic distributed systems.

The described solution provides numerous advantages. For example, while insight-driven orchestration allowing for separation of concern and privacy is key for distributed edge computing scenarios, it must be assured that platform feature differentiation capabilities can be enabled in processes such as the one presented in this solution. Service and infrastructure providers will have the benefit of mapping task(s) and/or sub-task(s) to feature-differentiated platforms while allowing for hiding internal insights when making distributed orchestration decisions. These providers can also enable discovery and advertisement of capabilities in a way that guarantees the separation of concerns between management domains.

The remainder of this section describes methods on how distributed orchestration can be achieved, while allowing resources to be managed by different stakeholders. Each stakeholder can have its own (machine learned) insights that enable it to optimally host the services at hand. In some cases, these insights should not be shared and should be protected for each management domain (per stakeholder).

Figure 12:
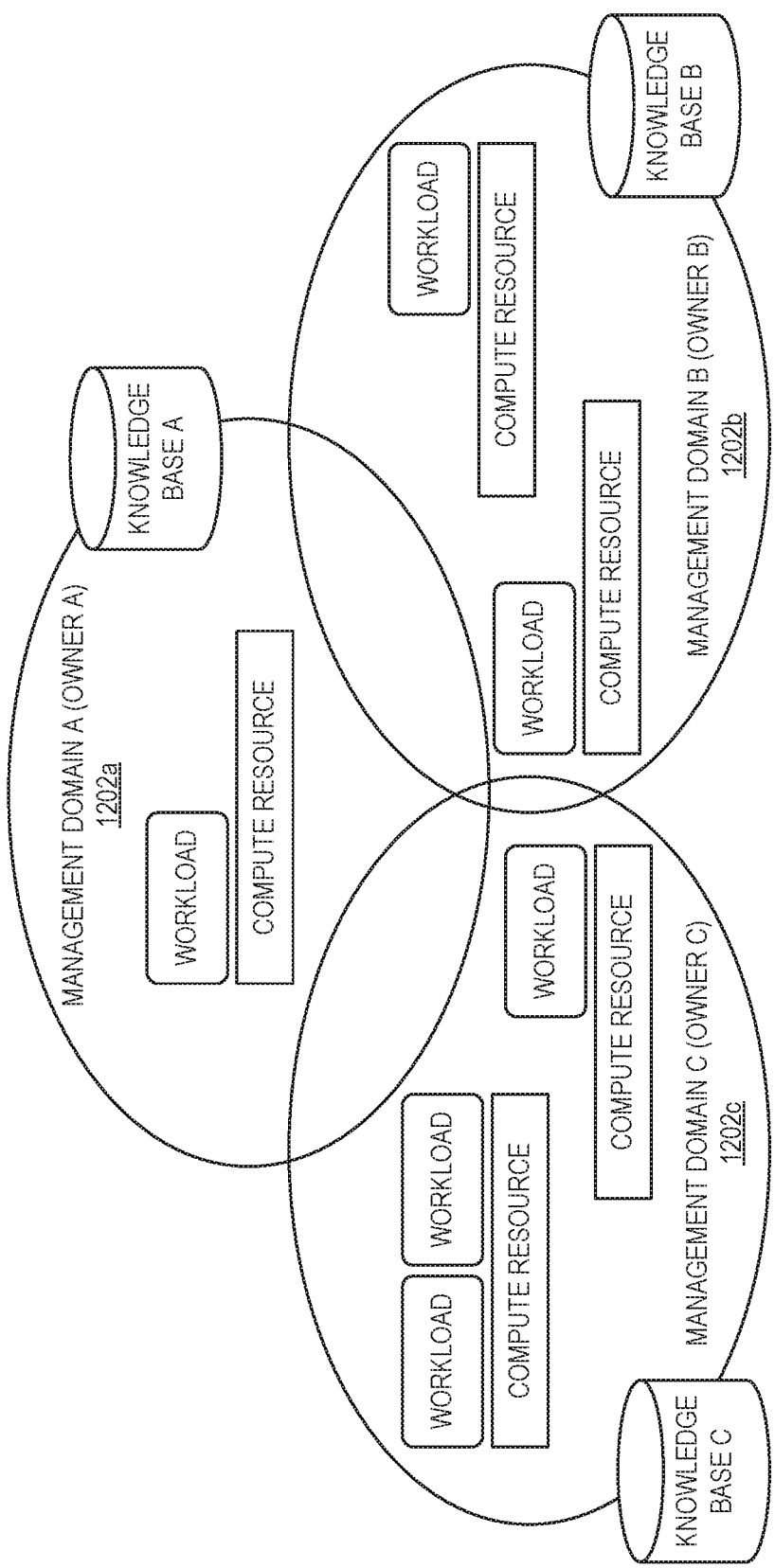
FIG. 12 illustrates a high-level diagram of edge compute resources managed by different stakeholders.

FIG. 12 illustrates a high-level diagram 1200 of edge compute resources managed by different stakeholders in different management domains 1202*a-c*, each of which maintains a knowledge base of potentially sensitive information (e.g., potential competitive advantages).

Three basic steps may be involved:
(1) discovery and advertisement of capabilities and capacities;
(2) insight driven mapping of task(s) and/or sub-task(s) to the best suited resources; and
(3) distributed orchestration and control.

Each of these steps are addressed further below.

Discovery and Advertisement of Capabilities

Individual systems need to get the necessary platforms hooks (e.g., through innovation engine (IE) and/or management engine (ME) capabilities or similar alternatives) to (a) express their capabilities, allow for monitoring and controlling the capabilities (e.g., platform features available) and (b) express a value (e.g., through a utility value) quantifying their state of being useful, profitable, or beneficial for a given hypothetical task. In general, a hook may include any mechanism that enables the behavior of hardware and/or software component(s) to be configured, controlled, modified, customized, and/or otherwise influenced in some manner.

Figure 13:
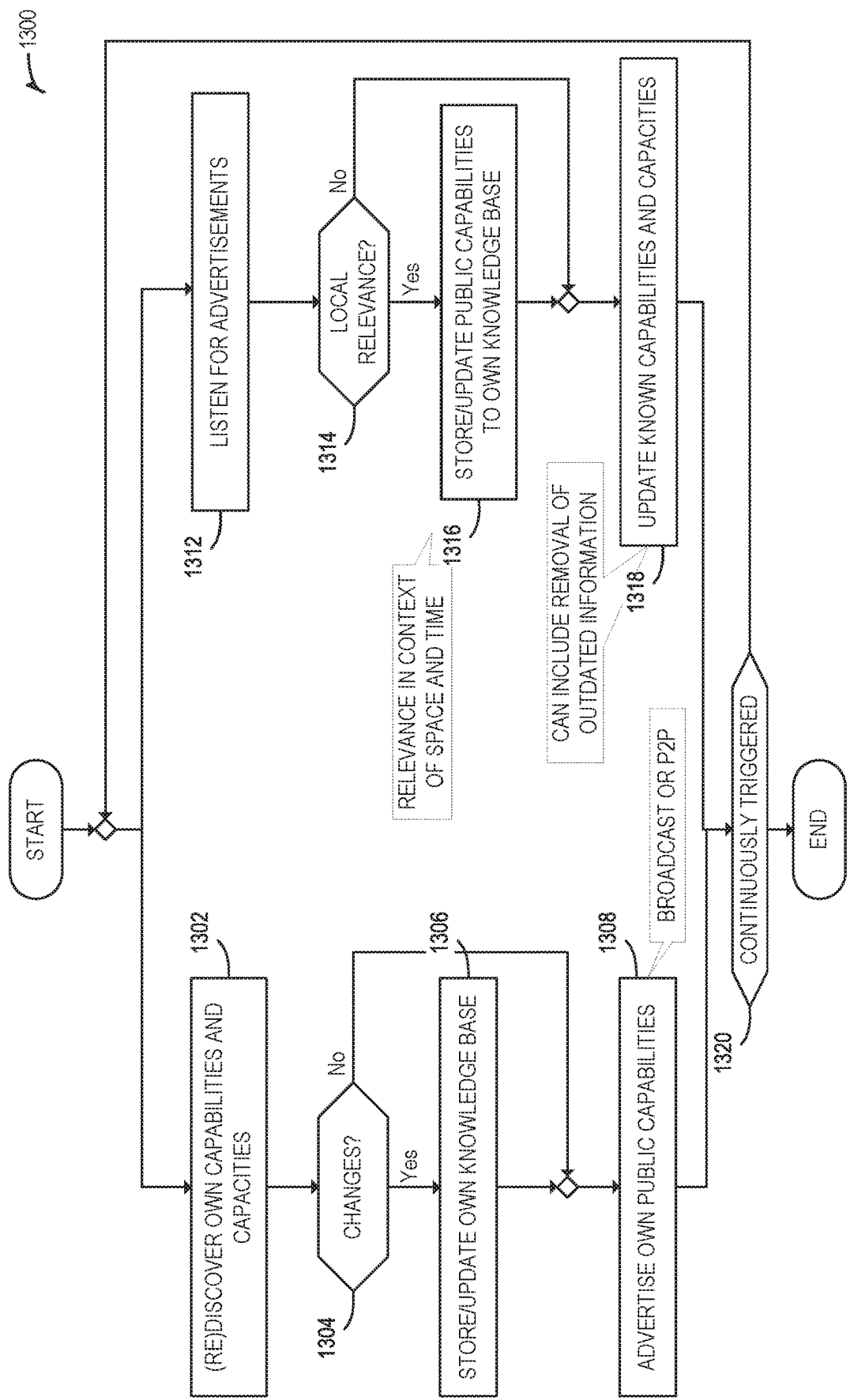
FIG. 13 illustrates a process flow for discovery and advertisement of capabilities and capacities of systems.

FIG. 13 illustrates a process flow 1300 for discovery and advertisement of capabilities and capacities of individual systems. In particular, FIG. 13 shows the flow of how individual systems share the publicly-available capabilities and capacities. Systems will continuously or periodically (block 1320) look out for their own capabilities (e.g., capable of hosting docker containers, VMs, and so forth) and current available capacities (e.g., available number of available cores, free memory, and so forth, or aggregated metrics from telemetry, such as utilization levels and so forth) (block 1302). Should changes be discovered in either capabilities or capacities (block 1304), those are stored in a locally available database or "knowledge base" (block 1306). These can be local per system or per management domain. Systems will advertise (e.g., via either peer-to-peer (P2P) or broadcast) their public capabilities to their environment, and hence neighboring systems (block 1308). This can be achieved using various protocols, including, but not limited to, the Advanced Message Queuing Protocol (AMQP).

In parallel, should the system learn about capabilities from neighboring systems in the environment (block 1312), it will decide the local relevance of that information (block 1314). The local relevance can be determined based on properties such as spatial (e.g., geolocation) or temporal (e.g., availability schedule) of the corresponding system. Should the information be relevant, it will be merged into the knowledge base (block 1316). Note that both the spatial and temporal aspect have a dynamicity aspect, and this needs to be accounted for when storing the information (e.g., by providing a lifespan of the information in the knowledge base) (block 1318).

Insight-Driven Task Mapping

The distributed orchestration activities (described in the next sub-section) need to gather information regarding how well individual resources at the edge can perform the task(s) and/or sub-task(s) at hand based on, for example, insights derived from artificial intelligence (AI) and machine learning (ML). Hence, tasks and services requests need to express their requirements and operations margins (e.g., latency boundaries in which it can operate and hence defining where it can be placed at the edge). Within the orchestration flow, the orchestration components can reason over available capabilities and capacities (e.g., through planning and scheduling algorithms) in the environment and together with quantifications of how the overall or individual systems will perform come up with an optimal actuation plan.

Figure 14:
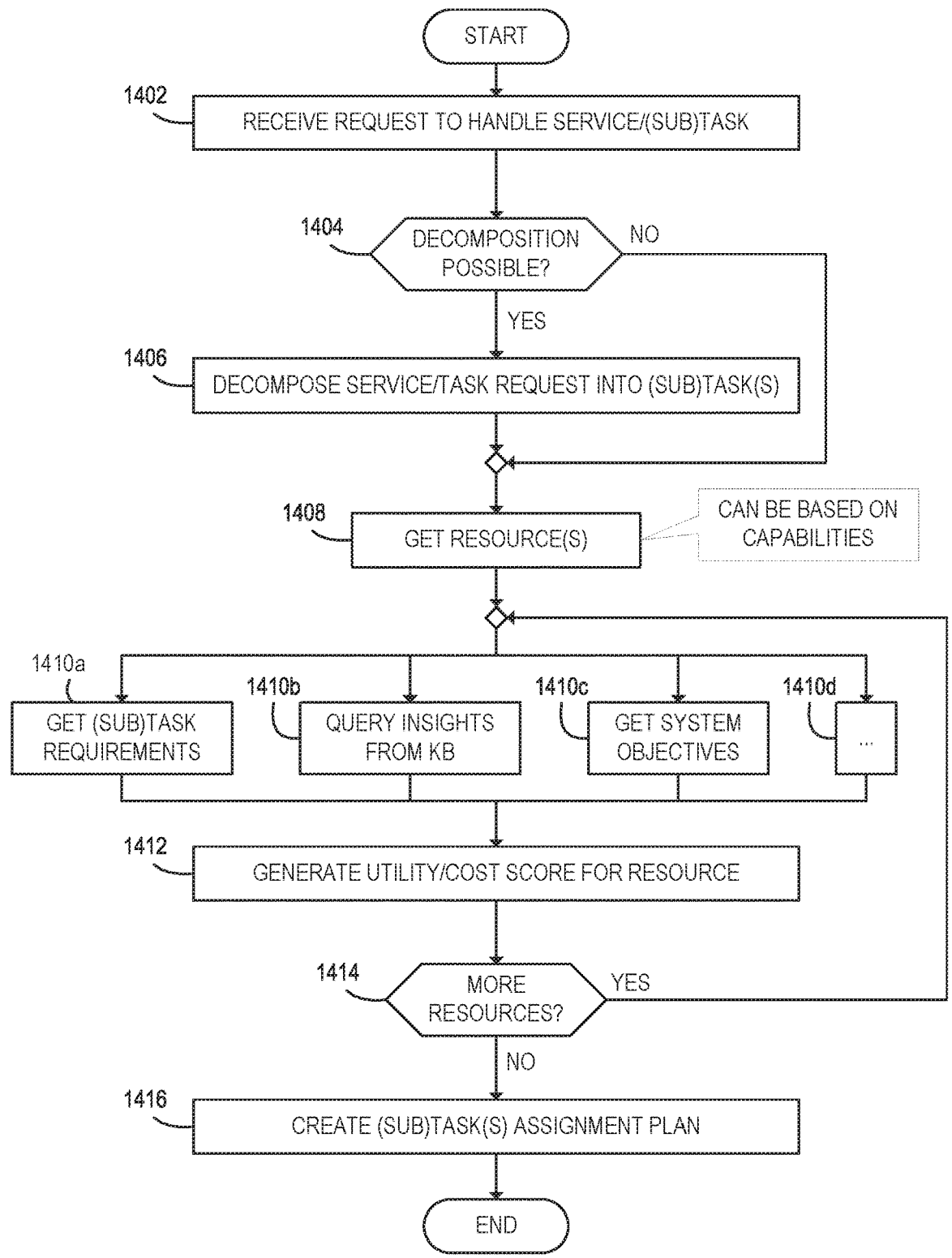
FIG. 14 illustrates a process flow for matching tasks and sub-tasks to resources based on various properties.

FIG. 14 illustrates a process flow 1400 for matching task(s) and/or sub-task(s) to resources based on various properties. In particular, the illustrated process flow shows how a system can, given a service request, decompose it into a set of task(s) and/or sub-task(s) and match those to resources capabilities known to it.

In the illustrated process flow, for example, should a system receive a service request or a (sub-)task(s) request (block 1402), it will see if the request needs to be further decomposed (block 1404). Decomposition can be done by applying planning algorithms that are able to determine the optimal steps required to solve the service request (block 1406). Once decomposed, the available resources can be determined (blocks 1408, 1414).

For each of the resources known to the system, information is determined on how well the tasks would run on each such resource. This matching/mapping may be based on multiple properties 1410*a-d*, such as task requirements (block 1410*a*), ML-based insights from a knowledge base (block 1410*b*), suitability of requirements and objectives (block 1410*c*), as well as any further decision-influencing parameters 1410*d* (e.g., financial considerations). Based on these properties 1410*a-d*, a utility/cost score may then be generated for each resource (block 1412). Based on the resource determined to be the best match, a possible actuation or task assignment plan will then be created (block 1416).

Distributed Orchestration

Centralized and decentralized orchestration components can reason over available capabilities (e.g., through planning and scheduling algorithms) and capacities in the environment and together with quantifications of how the overall or individual systems will perform come up with optimal actuation plans based on the previous step. These actuation plans can comprise of simple task and service assignments to:
(1) single systems;
(2) a set of systems forming a cluster and coalition; or
(3) a hierarchically controlled System-of-Systems (SoS).

Individual systems or leaders—which could be selected upfront through bidding and negotiation schemes—can monitor and control the individual systems or SoS to assure QoS in the operation. Changes in the environment, as systems temporally become available, as well as spatial movement or context changes (e.g., change of leader, task requirements, and objectives of the system), can trigger an update of the actuation plan.

Figure 15:
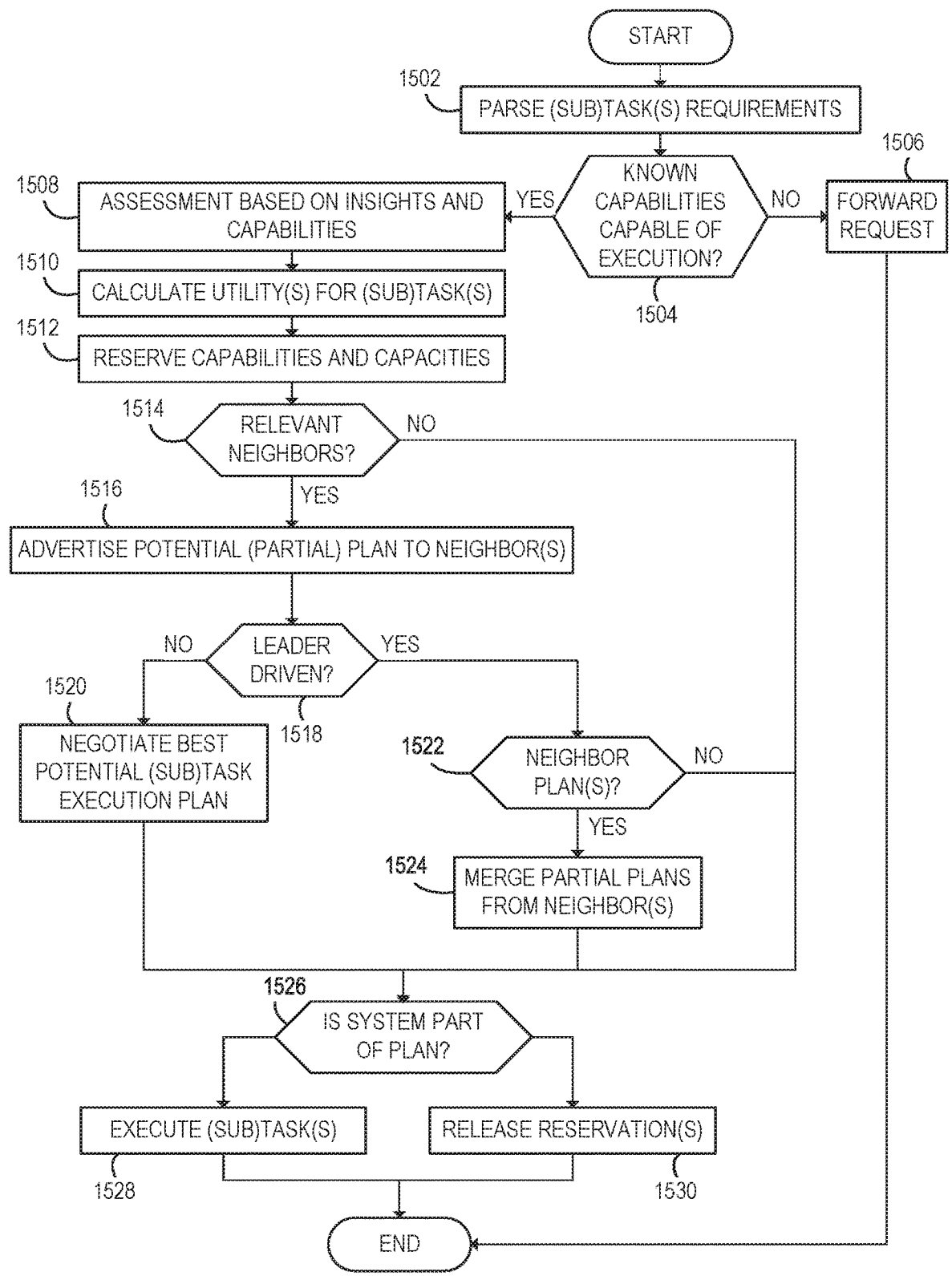
FIG. 15 illustrates a process flow for making distributed orchestration decisions.

FIG. 15 illustrates a process flow 1500 for making distributed orchestration decisions. In particular, process flow 1500 shows how orchestration decisions can be made in a distributed system.

In the illustrated process flow, for example, systems will parse incoming service and (sub-)task(s) requests to identify the requirements of each request (block 1502), and the systems will then determine if any of their known capabilities can be used for execution of the request (block 1504).

Should a system not be aware of any required capability, it will try to forward the incoming request (e.g., via broadcast) (block 1506). Should the system know about a set of required capabilities (even if just partially), it will try to come up with an actuation plan (or a partial actuation plan) in the manner described above in connection with process flow 1400 of FIG. 14. For example, the system performs an assessment of the task based on various insights and its capabilities (block 1508) and then calculates utility score(s) (block 1510).

In the event a plan can be determined, the local system will reserve the necessary capabilities and capacities (block 1512), which may reside in the local system itself and/or any child systems under its control. In some cases, for example, a higher level system may instruct a lower level system to reserve certain resources.

The system will then advertise the potential actuation plan to the known environment (blocks 1514, 1516), such as its relevant neighbors. If the decision making process is leader driven (block 1518), the local system can optionally try to merge other parts of the plan from its environment/neighbor systems (blocks 1522, 1524) into its plan, if desired. If there is no defined leader (block 1518), the systems that are part of the environment need to negotiate (e.g., through bidding schemes) about the actuation plan and eventually reach consensus (e.g., through mechanisms such as Paxos) (block 1520).

Finally, if the local system is part of the resulting plan (block 1526), it will execute its respective task(s) and/or sub-task(s) from the plan (block 1528), or if it is not part of the plan (block 1526), it will release its earlier resource reservations (block 1530).

Overall these steps ensure that insights that are relevant for operations—and that potentially represent confidential competitive advantages—can only be accessed within an individual management domain, while still allowing for orchestration and control of services across multiple resources at the edge that are owned by various stakeholders.

Optimal Spatiotemporal Workload Placement

As more and more compute, communication, and control platforms are being pushed to the edge, there is an emerging need to address their capacity constraints. The complexity of managing these resource limitations is further coupled with the dynamicity and mobility of the edge resources, and the need of infrastructure providers to host heterogeneous resources for supporting a broad spectrum of workloads.

It is, however, expensive to maintain optimal capacity of heterogeneous resources distributed at the edge. The inherent diversity of workload requirements, along with the dynamicity of edge workloads further exacerbates this problem. This becomes crucial since performance characteristics of workloads differ vastly across the heterogeneous resources and given the dynamic nature of workload environments, deciding optimum placement or workloads becomes a key task for profitability and service assurance.

Currently, such placement decisions are typically made using inputs gathered from the current status of the infrastructure landscape with respect to an incoming workload placement request. This approach, however, does not take into account the possibility of better placement opportunities existing in the near feature due to, for example, the addition and/or availability of specialized higher-end infrastructure, exploiting features (e.g., CPU/compute features, such as Intel Architecture (IA) features) which are optimized to handle the specific workload behavior and characteristics to improve performance. These missed opportunities arising from workload placement decisions then lead to overall inefficiency and poor resource utilization, which often becomes detrimental to future placements.

Workload placement methods have been explored for workload placement deferral or delay in datacenter operations at certain operational constraints, or resource uncertainty. Overall, these approaches are targeting specific objectives such as energy saving, the opportunities resulting from the variation of the tariff at different time points. Geographical and heterogeneity-aware placement methods have been proposed, which employ a non-linear programming model to construct a transactional workload placement as a constrained optimization problem. Their focus is also significantly towards the optimization of energy utilization by migrating workloads across datacenters. A probabilistic approach has also been proposed, which formulates an optimization problem to identify the scheduling plans to minimize the overall cost subject to workload constraints. A utility-aware workload balancing and deferral have also been proposed to balance the operating cost resulting from varying electricity prices. The range of time-decaying utility functions are derived to make tradeoff decisions between customer satisfaction and energy efficiency.

These previous solutions are limited in complexity, scale, and objective tradeoff considerations. They are based on predetermined inputs, such as the time-dependent variable cost of resources or predicted performance and resource availability, relying only on single objective linear/non-linear optimization. These are often unscalable, and further do not account for:
 (1) the dynamicity of workload patterns, and dependencies to specific resource sites/groups and time frames;
 (2) the dynamicity and limitations of resource capacity available at the edge;
 (3) tradeoff of placement at different time points in the future in comparison to the current status.

This solution proposes a novel methodology and algorithm to solve the technical problem of: (i) determining the best placement choices at various time points, such as present and future time points with high confidence; and (ii) incrementing the flexibility of cloud orchestrators to choose the right placement option without compromising service level objectives (SLOs) while achieving operational efficiency and desired total cost of ownership (TCO).

In some embodiments, for example, the described solution may include the following aspects:
 (1) a comprehensive methodology with two algorithms working in parallel across distributed heterogeneous resources to support improved heterogeneous workload placement;
 (2) spatiotemporal flexibility of infrastructure providers to place workloads distributed over edge, core network, and cloud resources either at the current time (Algorithm 1) or at a later deferred time (Algorithm 2); and
 (3) comparison of short-term and long-term stakeholder objectives across the two algorithms, including inventory analysis for possible edge resources.

This solution provides numerous advantages, including exploitation of processing architecture features, improved resource management, and improved resource matching. For example, with respect to exploitation of processing architecture features (e.g., Intel Architecture (IA) features), features optimized to handle a specific workload are easily identified with a continuous resource prediction model, and they are used to understand decisions around workload placement/deferral for optimality and delivering expected performance. This solution also improves resource management and service assurance in a highly distributed and resource-constrained edge computing environment. Further, this solution provides better resource matching as specialized resources become available in time, which leads to lower service level agreement (SLA) violations, uniform resource utilization, and low saturation amongst resources to achieve the optimum TCO.

Today, edge compute platforms include heterogeneous dynamic workloads, each with varying access patterns and resource utilization trends. These need to be optimally managed and maintained by infrastructure providers, ensuring a TCO advantage. However, current approaches are limiting and only focus on cost/performance tradeoff analysis in near real-time, without considering decisions that include deferral or delayed placement of the workload based on placement opportunities either due to spatial hierarchies from the cloud to the edge, or due to temporal dependencies making capacity available at previously restricted sites/time points in the near future.

As workload characterization and classification techniques are increasingly growing in accuracy and runtime efficiency, there are several benefits for such workload placement deferrals, mainly in conjunction with improved assessment of available and incoming capacity. Based on workload characterization, the workload can be deferred to ensure:

(1) placement on higher-end specialized infrastructure resources as they become available in time, such as mobile agents that are only valid for placement at certain spatial and temporal instances;

(2) exploitation of CPU/compute features (e.g., Intel Architecture (IA) features) that are optimized to handle the specific workload behavior and characteristics for improving performance;

(3) improved TCO leading to lower SLA violations, uniform resource utilization, and low saturation amongst resources;

(4) improved scheduling, especially in the scenario of incomplete metadata on the workload or workload behavior; and (5) scenarios with sufficient capacity and improved service distribution for optimized placement.

Figure 16:
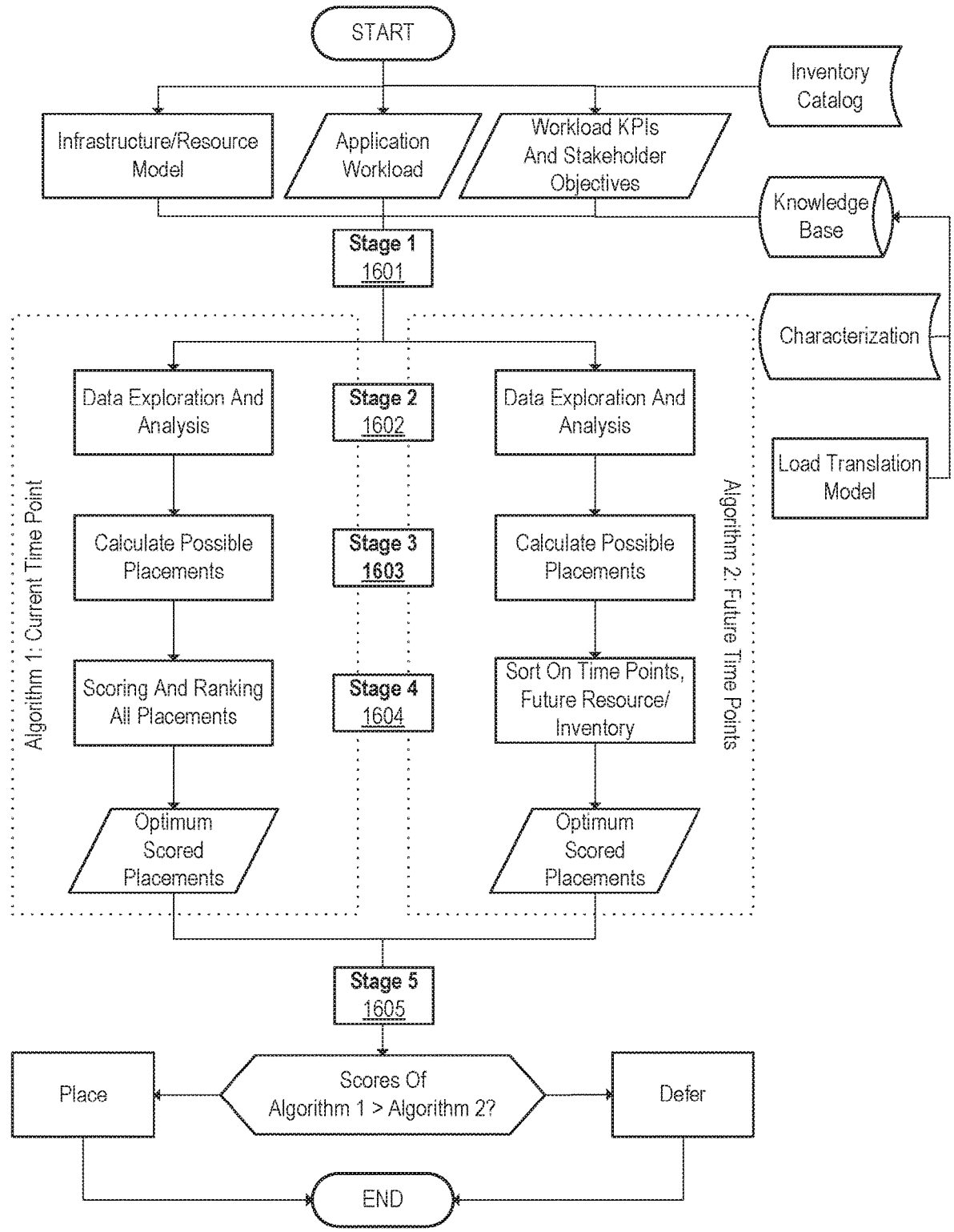
FIG. 16 illustrates a process flow for optimal spatiotemporal workload placement.

FIG. 16 illustrates a process flow 1600 for optimal spatiotemporal workload placement. In the illustrated process flow, for example, workload placement and/or deferral decisions are made based on parallel computation of placement options at both current and future time points, as described further below.

The first stage 1601 involves collecting various inputs that are required to determine an optimal spatiotemporal placement for a workload, such as the resource model of the infrastructure (e.g., given by a set of all resources and their configurations), the inventory catalog (e.g., given by available resources and their configurations in the inventory), the workload model (e.g., given by a set of virtual machines/containers, their interactions, and their configurations), the workload key performance indicators (KPIs) and the stakeholder objectives (e.g., given by runtime performance for the workload, cost for the infrastructure, and so forth).

These inputs are then provided to the following algorithms:

(1) Algorithm 1: derives optimal workload placement options in (near) real time based on current resource availability (e.g., by performing placement modeling using current resource and workload data);

(2) Algorithm 2: derives optimal workload placement options at future time points based on future resource availability (e.g., by performing forward-looking placement modeling using predicted resource and workload data, such as the possibility of resources being freed/reserved or added/removed from inventory in the future).

As an example, consider an experimental setup with two processing resources that are currently deployed and available (e.g., Intel Xeon E5-2680 and E5-2630) and a third processing resource assumed to be present in the inventory (e.g., Intel Xeon X5660), each of which is a different processor model with varying performance capabilities and resources (e.g., varying number of processors, cores, and/or threads, processing frequency, memory capacity, bus speed, hardware acceleration technologies, and so forth). Moreover, the workload model for the experimental setup is a compute-intensive OpenFoam computational fluid dynamics (CFD) simulation workload, requesting for 24 cores. The cost of the infrastructure and the runtime performance of the workload are defined as KPIs. This experimental setup is presented as an example in connection with the functionality described throughout this section.

In the second stage 1602, data exploration and analysis is performed by the respective algorithms. In particular, the algorithms take inputs from a database (e.g., a knowledge base), which is integrated with a continuous analytical system running in the background to provide resource performance characterization (e.g., Intel Architecture (IA) characterization), load translation models, and the future inventory catalog. This helps determine the time points and available inventory that are pertinent to the algorithms.

Figure 17:
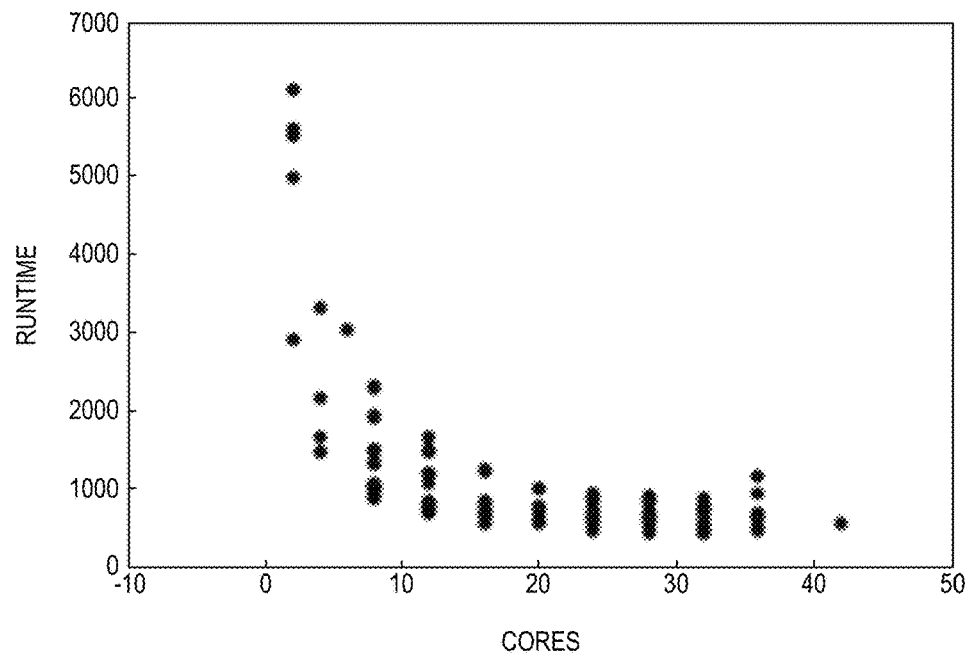
FIG. 17 illustrates an example of the runtime performance data distribution associated with performing optimal spatiotemporal workload placement.
Figure 17:
Figure 17:
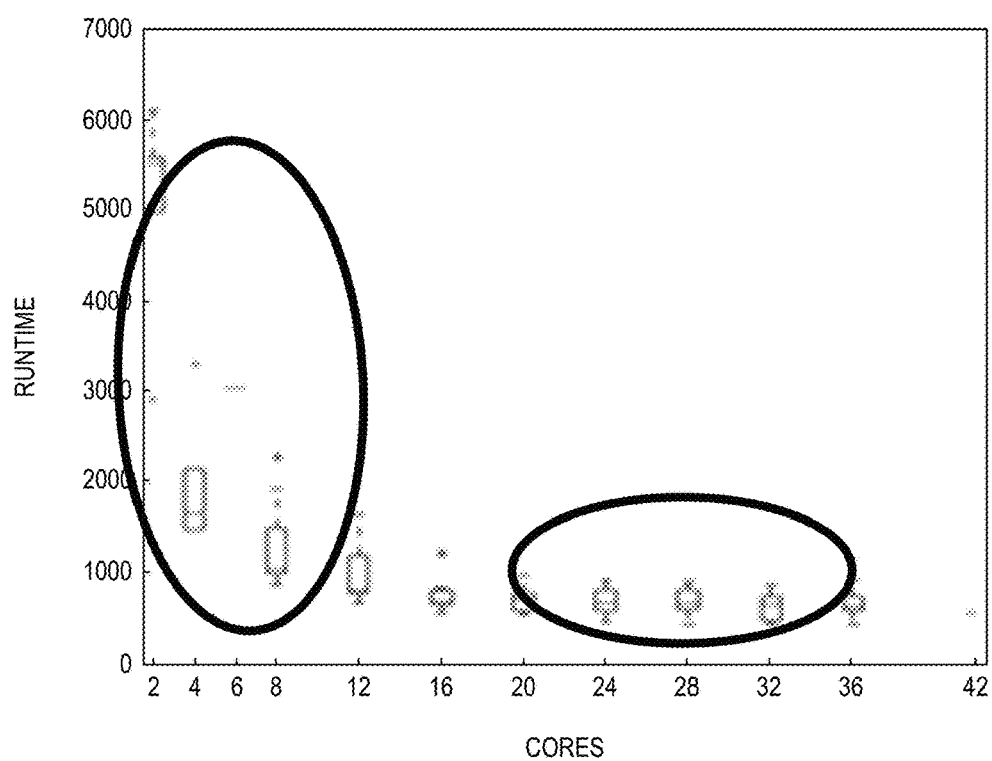

For example, with respect to the experimental setup, the IA compute features are quantified across varying number and heterogeneous combinations of allocated CPU cores across the three servers. FIG. 17 illustrates the runtime performance data distribution from roughly 100 experiments conducted on discrete number of core combinations. These results show a very limited performance gain, which highlights that the workload will imminently exhibit a scalability saturation point. This helps develop a classification model to predict workload runtime that is aware of the resource heterogeneity. Using these results, applicable time points for Algorithm 2 can be determined.

In the third stage 1603, possible workload placements are calculated by the respective algorithms. For example, based on the information noted above, the two placement algorithms are run in parallel to compute all, or a subset, of the possible placement options at the current time point as well as future time points. Algorithm 1 identifies the best placement options by processing the data pertaining to current resources, such as inventories, availability, capacity, and incoming workloads. Algorithm 2 considers a set of hypothetical placement options by analyzing workload performance on predicted resources, such as inventories, availability, and capacity at future time points, and with the current workloads.

For example, with respect to the experimental setup, the optimum combination of resources to be provisioned are quantified based on the data analysis to achieve the best performance (e.g., shorter execution time in this scenario). All or a subset of possible placements are thus determined, by varying the capacity provisioned, for the current time by Algorithm 1, and the applicable future time points by Algorithm 2.

In the fourth stage 1604, the possible workload placements are scored and ranked by the respective algorithms. For example, the workload placement scores are calculated by prioritizing objectives such as TCO, SLA, and QoS, subject to resource constraints and workload performance, given the KPI inputs. This is accomplished by following concepts, for example, from fields of game theory and fuzzy logic, optimization techniques in general (e.g., particle swarm optimization), and analytical based approaches (e.g., decision trees or neural networks) to build a reasoning model that trades off business objectives of multiple stakeholders of the edge compute platform (e.g., heterogeneous infrastructure providers, service providers, and end-users) to compute the utility of workload placement when requested, versus workload placement if deferred by varying time frames. Then, these scores are compared between current time points and the future time points. This results in optimum scored placements for both algorithms.

For example, with respect to the experimental setup, the workload performance utility of these placement options is then compared with other objectives, such as utility based on the cost of the resources, and the possible placements are scored as a tradeoff between these objectives. It is important to note that higher the utility, the better the placement option for that objective.

In the fifth stage 1605, a final selection of the optimal workload placement is performed based on the placement options derived by the respective algorithms. For example, the placement options are compared against each other, in Algorithm 1 for the current time, and in Algorithm 2 for future time points. If the scores of future time points are greater than current placement scores, the workload placement is deferred, otherwise it is placed given the best placement options as given by Algorithm 1.

Figure 18:
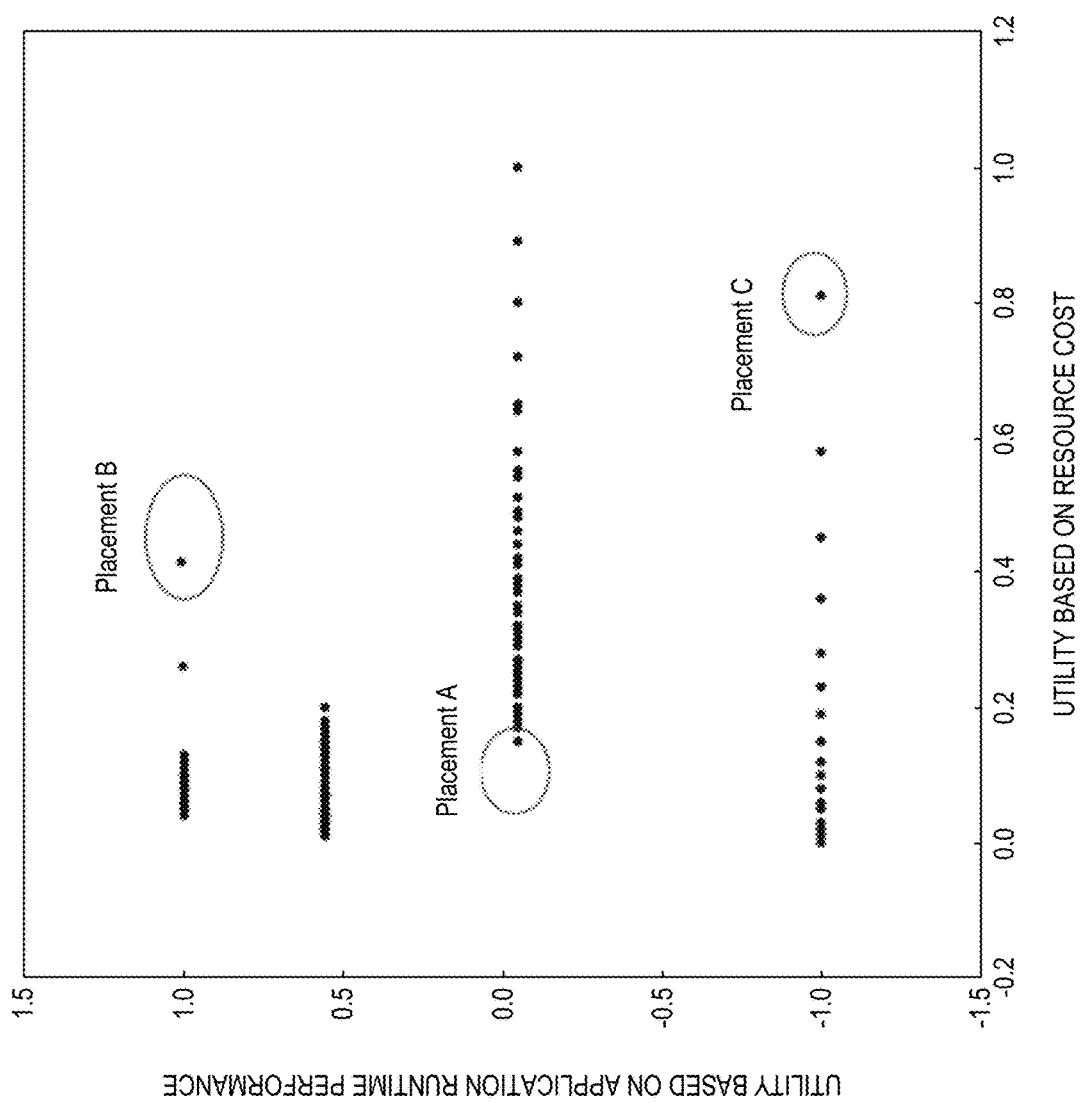
FIG. 18 illustrates a comparison of placement options derived from optimal spatiotemporal workload placement algorithms.

For example, with respect to the experimental setup, FIG. 18 illustrates a comparison of placement options from Algorithm 1 and Algorithm 2. As shown in FIG. 18, three placement options can be compared against each other, namely:

(i) Placement A from Algorithm 1, which has very low utility for both the infrastructure and the workload;
(ii) Placement B from Algorithm 2 (workload placement deferred by 400 seconds), which has medium utility for the infrastructure and high utility for the workload; and
(iii) Placement C from Algorithm 2 (workload placement deferred by 800 seconds), which has high utility for the infrastructure, but low utility for the workload.

Thus, given this information, the final conclusion is to delay the workload placement by 400 seconds, as this provides most benefit for workload performance, without being detrimental to the infrastructure. In this manner, the proposed methodology is able to balance and trade off objectives in a spatiotemporal manner to support optimal workload placement.

Figure 19:
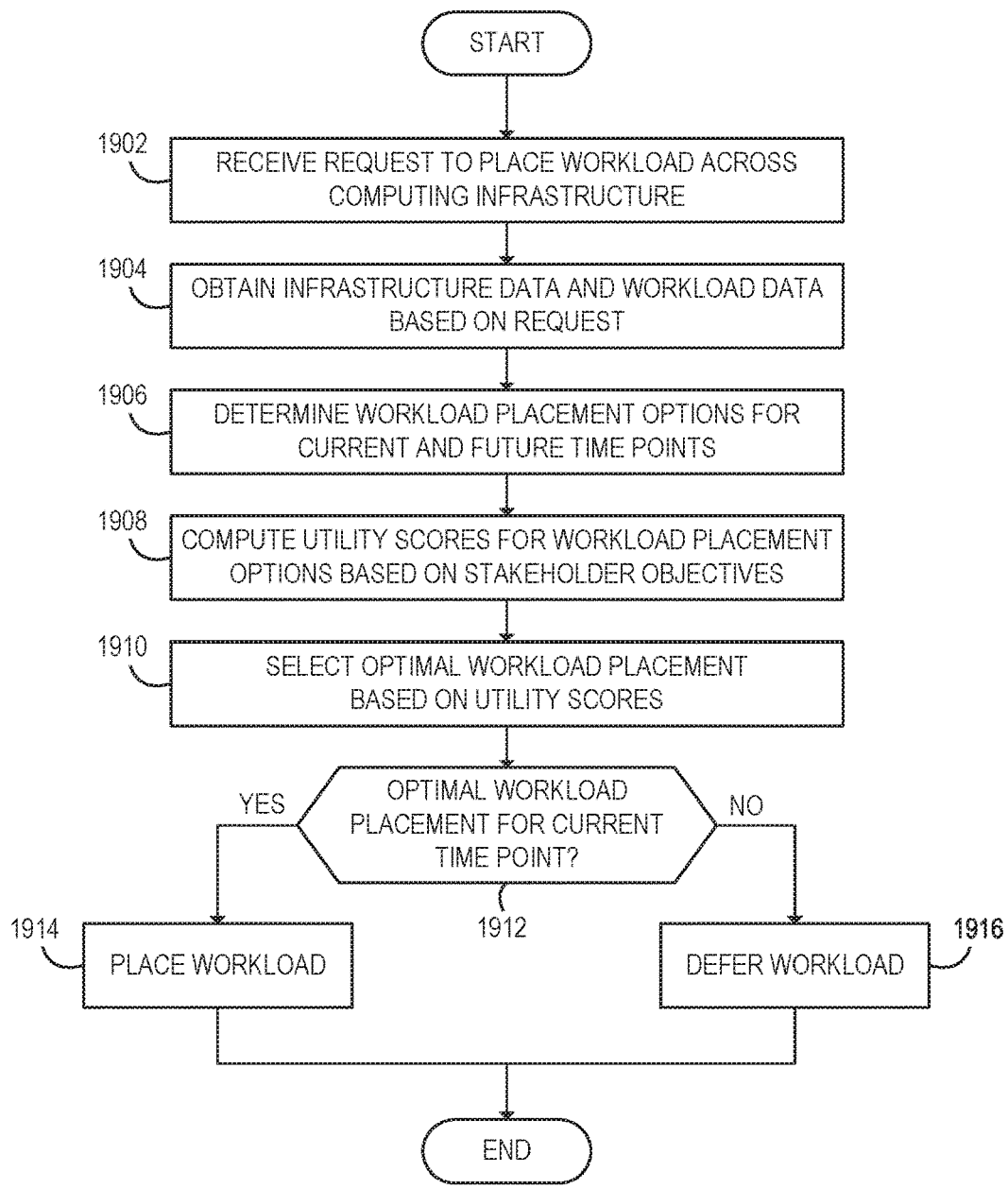
FIG. 19 illustrates a flowchart for an example embodiment of optimal spatiotemporal workload placement.

FIG. 19 illustrates a flowchart 1900 for an example embodiment of optimal spatiotemporal workload placement. In various embodiments, flowchart 1900 may be implemented using the embodiments and functionality described throughout this disclosure.

The flowchart begins at block 1902, where a request to place a workload across a computing infrastructure is received. For example, the workload may include a set of tasks associated with a particular service or application, which may need to be placed across certain resources in the computing infrastructure.

The flowchart then proceeds to block 1904 to obtain infrastructure data and workload data based on the request.

The infrastructure data contains information about the physical and/or logical resources in the computing infrastructure. The physical resources may include compute resources (e.g., general-purpose processors such as CPUs and processing cores, special-purpose processors such as GPUs and AI accelerators), memory resources, storage resources, network resources, and so forth. The logical resources may include virtual machines (VMs), containers, and any other virtualized resources provisioned on the physical resources (e.g., virtualized memory, network, and storage resources).

In some embodiments, for example, the infrastructure data may contain an infrastructure landscape that identifies the topology of the physical and logical resources in the computing infrastructure, the resource types, the capabilities and capacities of the resources, the services or workloads deployed across the resources, and so forth. The infrastructure data may also contain telemetry or usage data for the resources, which identifies the current usage and availability of the resource capacities. In some embodiments, the infrastructure landscape may be represented as an infrastructure model or graph, with nodes corresponding to the resources and edges corresponding to the communication links between the resources.

The infrastructure data may also contain a resource inventory for the computing infrastructure, which identifies an inventory of resources that are available to add to the computing infrastructure. For example, the resource inventory may identify resources that are available to request or order for inclusion in the computing infrastructure sometime in the future, along with any such resources that have already been requested and will become available at a certain time in the future. The resources in the resource inventory can include physical resources that can be purchased for deployment in the computing infrastructure (e.g., hardware components), along with logical/virtual resources that can be rented from other service providers (e.g., processing or storage capacity rented from a cloud service provider).

The workload data contains information about a workload for a service and/or application to be deployed, placed, or executed across the computing infrastructure. For example, the workload data may contain a workload model for the workload, which may identify the underlying tasks of the workload, the task requirements, and the dependencies among those tasks. In some embodiments, the workload model may be represented as a graph, with nodes representing the underlying tasks/requirements and edges representing the dependencies among those tasks.

In some embodiments, the workload data may also contain workload performance data for the workload, such as runtime performance metrics for the workload across various heterogenous resources with varying resource capacities and configurations.

The flowchart then proceeds to block 1906, where a set of workload placement options is determined for a set of time points based on the infrastructure data and the workload data. The set of time points includes the current time point and various future time points, and the workload placement options identify possible placements of the workload across the resources of the computing infrastructure over those time points.

In some embodiments, for example, the infrastructure data and the workload data may be evaluated to identify a set of time points and a set of optimal resources to be considered for determining the workload placement options. For example, based on the workload performance data, the runtime performance of the workload may be determined across a set of possible resources for the workload (e.g., various heterogenous resources with varying resource capacities and configurations). The runtime performance of the workload across the various possible resources may then be used to identify a set of time points and a set of optimal resources to be considered for determining the workload placement options. The workload placement options may then be determined over the identified set of time points and the set of optimal resources.

In some embodiments, for example, the infrastructure data and workload data may be used to determine the current state of the computing infrastructure for the current time point and predicted future states of the computing infrastructure for the future time points. A first set of workload placement options may then be determined for the current time point based on the current state of the computing infrastructure, and a second set of workload placement options may then be determined for the future time points based on the predicted future states of the computing infrastructure. A resulting set of workload placement options may then be determined from the respective sets of workload placement options for the current and future time points (e.g., by combining them).

The flowchart then proceeds to block 1908, where utility scores are computed for the workload placement options based on a set of stakeholder objectives. The set of stakeholder objectives may include, for example, various objectives of the respective infrastructure provider (e.g., minimizing TCO), service providers (e.g., maximizing workload runtime performance), end users, and so forth.

The flowchart then proceeds to block 1910 to select an optimal workload placement from the workload placement options based on their respective utility scores. Depending on the circumstances, the optimal workload placement may correspond to either the current time point or one of the future time points.

The flowchart then proceeds to block 1912 to determine whether the optimal workload placement is for the current time point or a future time point. If the optimal workload placement is for the current time point, the flowchart proceeds to block 1914 to place the workload across the computing infrastructure based on the optimal workload placement plan. If the optimal workload placement is for a future time point, the flowchart proceeds to block 1916 to defer the workload for placement across the computing infrastructure in the future.

At this point, the flowchart may be complete. In some embodiments, however, the flowchart may restart and/or certain blocks may be repeated. For example, in some embodiments, the flowchart may restart at block 1902 to continue receiving and processing workload placement requests.

Deadline-Aware Mission-Critical Function Orchestration

Lack of time-deterministic performance is a significant barrier to adoption of the Functions-as-a-Service (FaaS) paradigm in domains like Industry 4.0 and Transport. Many cyber-physical scenarios in these domains require a response within a specific amount of time. However, there are no existing solutions that deliver time-deterministic performance for functions in Functions-as-a-Service middleware.

This solution proposes a method to characterize performance of functions on various configurations of the actual hardware on which they will be deployed, and offer appropriate service level objectives (SLOs), which users can subsequently request. This solution includes the ability for function developers and end users to benefit from differentiating platform features and tunability without function developers having to explicitly code for them.

For example, functions-as-a-Service middleware is enhanced with the ability to locally characterize new functions as they are onboarded, under various levels of hardware tuning, allowing explicit performance levels of the functions to be identified and offered. Users declare the performance levels they require for their functions with the FaaS middleware via negotiated service level agreements (SLAs). An embedded SLA handler comprehends actual versus expected behavior and adjusts aspects of the system as appropriate to ensure SLA fulfillment.

This solution provides numerous advantages. For example, this solution provides a new capability for platforms at the edge to host time-deterministic workloads. This solution also improves return on investment (ROI) and reduces qualification time for users, as their time-deterministic workload needs can be satisfied using automatically re-tuned hardware. Moreover, the benefits of differentiating processing features (e.g., Intel Architecture (IA) features) such as platform tuning can be leveraged by functions (and end users) without function developers having to explicitly code for them.

This solution proposes to enhance FaaS middleware with the ability to characterize, offer, and manage hard timing and other performance constraints on functions. This is achieved by the integration of Service Level Agreement (SLA) management logic that enhances the onboarding process, the end-user interaction, and the runtime management of function execution in the FaaS middleware.

This solution could be applied to any hardware appliance assigned to host functions, such as an appliance running Functions-as-a-Service (Faas) middleware that allows individual functions be invoked on the appliance hardware. This solution is particularly relevant for hardware appliances such as a microcluster at the network edge that is assigned to host functions with time-deterministic requirements in domains such as Industry 4.0 and transport. In addition, this solution is particularly relevant for appliances containing heterogeneous hardware that may include a mix of different system boards, CPU types, memory quantities and speeds, and additional optional hardware such as GPUs, FPGAs, accelerators, and high-speed NICs.

Figure 20:
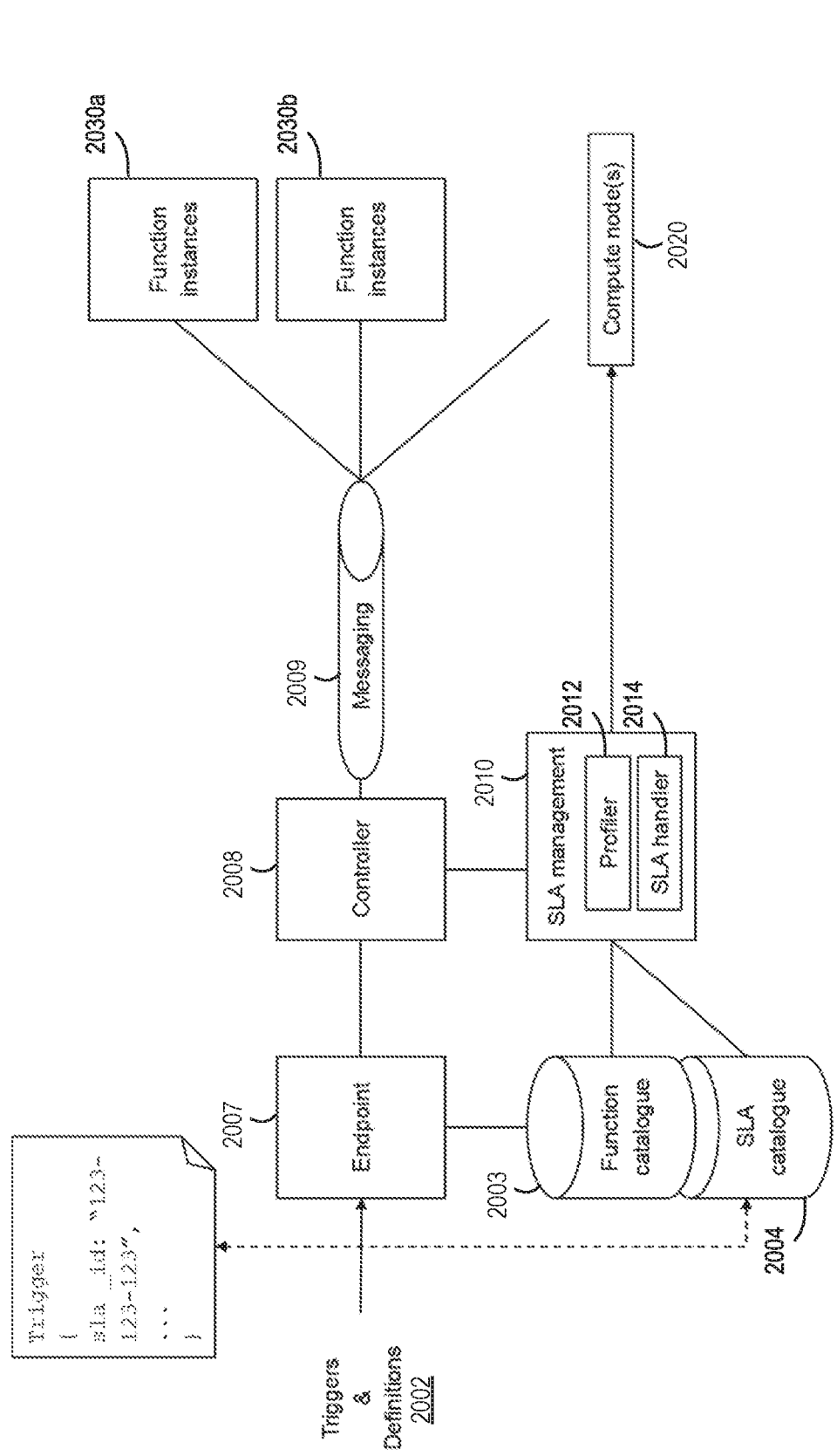
FIG. 20 illustrates an example embodiment of a system for performing deadline-aware mission-critical function orchestration.

FIG. 20 illustrates an example embodiment of a system 2000 for performing deadline-aware mission-critical function orchestration. In the illustrated example, typical FaaS middleware is extended with various components for implementing this solution.

A key concept in this solution is the introduction of service level agreements (SLAs) to allow performance of functions to be defined, agreed, and managed. SLAs are managed by an SLA management component 2010.

When new functions are added to the function catalog 2003, a profiler 2012 within the SLA management component 2010 analyzes the performance of the function under various configurations of the local hardware and updates the function catalog 2003 and SLA catalog 2004 with details on the performance of the function that a particular compute node or appliance 2020 can offer.

When end users 2007 request functions to be executed by the appliance, they must first agree to an SLA under which the functions will be executed. This negotiation is overseen by an SLA handler 2014 within the SLA management component 2010.

Finally, as functions 2030*a-b* are being executed, the SLA handler 2014 within the SLA management component 2010 continuously monitors the appliance for SLA compliance, and intervenes as necessary to ensure maximum SLA compliance.

The following sub-sections describe the SLAs and onboarding process and invocation processes that are introduced and enhanced by this solution.

Service Level Agreements

Under this solution, service level agreements (SLAs) will be configured for the end users of the functions. An SLA will typically reference service level objectives (SLOs), such as notions of deadline limits (e.g., the need fora particular function to be executed within 10 ms). When functions are invoked, they shall carry a reference to the SLA they need to adhere to. The SLA handler logic will be responsible for mapping this SLA to agreed SLO requirements and configuring the appliance to ensure these conditions are met.

Under this solution a typical SLA lifecycle consists of:
(1) Users negotiate a service level agreement (SLA) with the FaaS middleware on the appliance. This specifies the functions from the catalog they wish to be able to invoke, at what level of performance, and at what rates of invocation.
(2) The FaaS middleware evaluates the SLA requested against its existing SLA commitments and available hardware to establish if it can agree to the requested SLA. If not, it offers alternatives which it can meet.
(3) If an SLA is agreed, the FaaS middleware preloads functions and tunes the appliance hardware as appropriate to meet the new agreement. Some SLA agreements may not require any preloading or hardware tuning in advance.
(4) When an SLA expires it is removed from the system together with any associated preloading/pretuning of functions.

Onboarding of Functions

An additional onboarding lifecycle phase will be added for new incoming functions, in which the FaaS middleware should determine optimal settings—through means of machine learning and artificial intelligence (AI)—for various configuration options, including (i) how to optimally deploy a function (location wise), (ii) what hardware features the function will require at runtime, and (iii) how to optimally tune the platform (e.g., through setting policies). This functionality may similarly be performed when new compositions/workflows of functions are defined.

Figure 21:
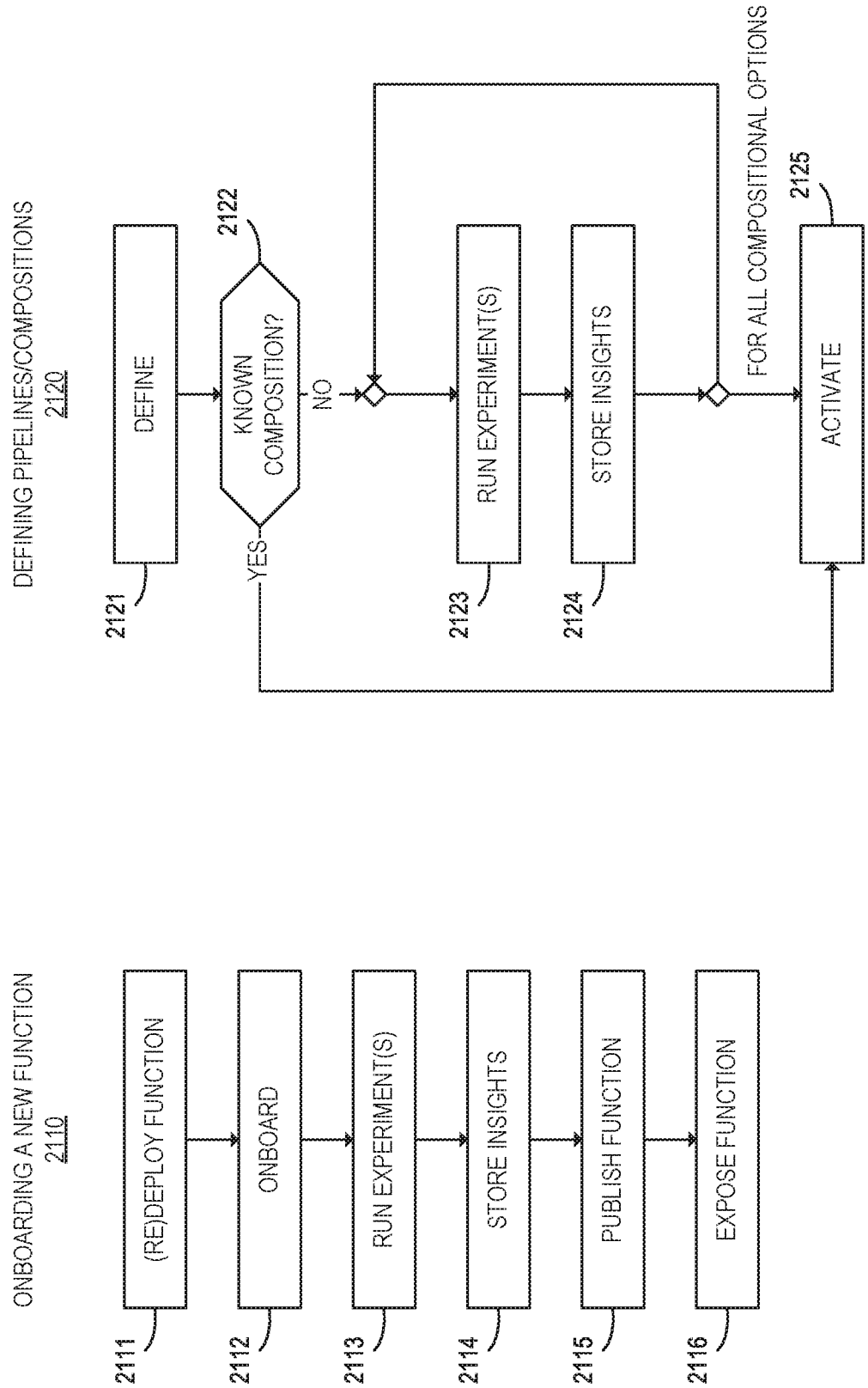
FIG. 21 illustrates example flowcharts for onboarding functions and compositions/workflows.

FIG. 21 illustrates example flowcharts for onboarding functions 2110 and compositions/workflows 2120.

For function onboarding, without this solution the typical workflow is as follows: functions are uploaded to the appliance FaaS middleware, stored in a catalog, and exposed for consumption. With this solution, however, the updated workflow for onboarding 2110 is as follows:
(1) Onboard: Functions are uploaded to the appliance FaaS middleware, and an onboarding process begins.
(2) Run experiment(s): The FaaS Middleware runs experiments by deploying the new function on the hardware, invoking it, and measuring the performance. The function is deployed on various combinations of the appliance hardware as appropriate. If attached hardware components are involved (e.g., FPGAs, graphics cards, and so forth), the FaaS Middleware runs the experiments with various configurations of the system fabric. FaaS middleware will tune possible control knobs on the platform to determine optimal settings (in general, a knob may include any mechanism that enables some aspect of a particular component and/or task to be configured, controlled, adjusted, and/or otherwise influenced in some manner). This can be achieved using reinforced learning techniques.
(3) Store insights: The FaaS Middleware builds up a picture of what performance the appliance hardware can deliver for the function. The levels of performance and associated tunings and hardware requirements are stored in the FaaS Middleware catalog. The associated tunings and hardware requirements are not exposed publicly—they are for internal purposes only.
(4) Publish function: The FaaS Middleware publishes the new function in its function catalog, and details the performance levels it can offer for that function. The catalog will also detail if the performance level is immediately available (e.g., the platform is already pre-tuned and the function is cached) or if the specific performance level requires some initial setup time to apply the tuning.

Figure 22:
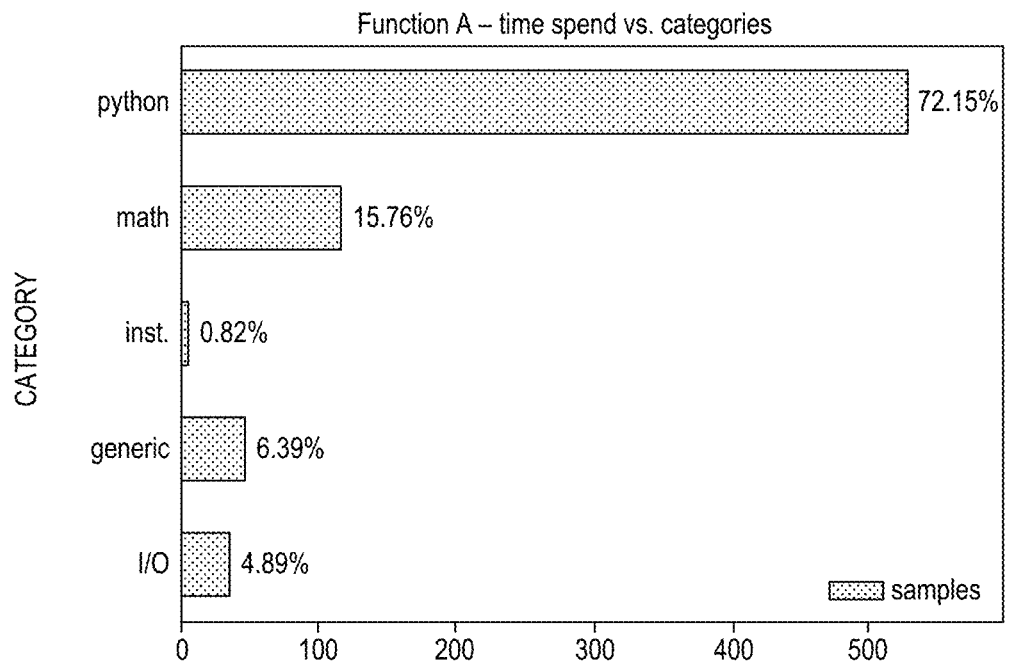
FIG. 22 illustrates a function characterization example that showcases where a function spends its time.
Figure 23:
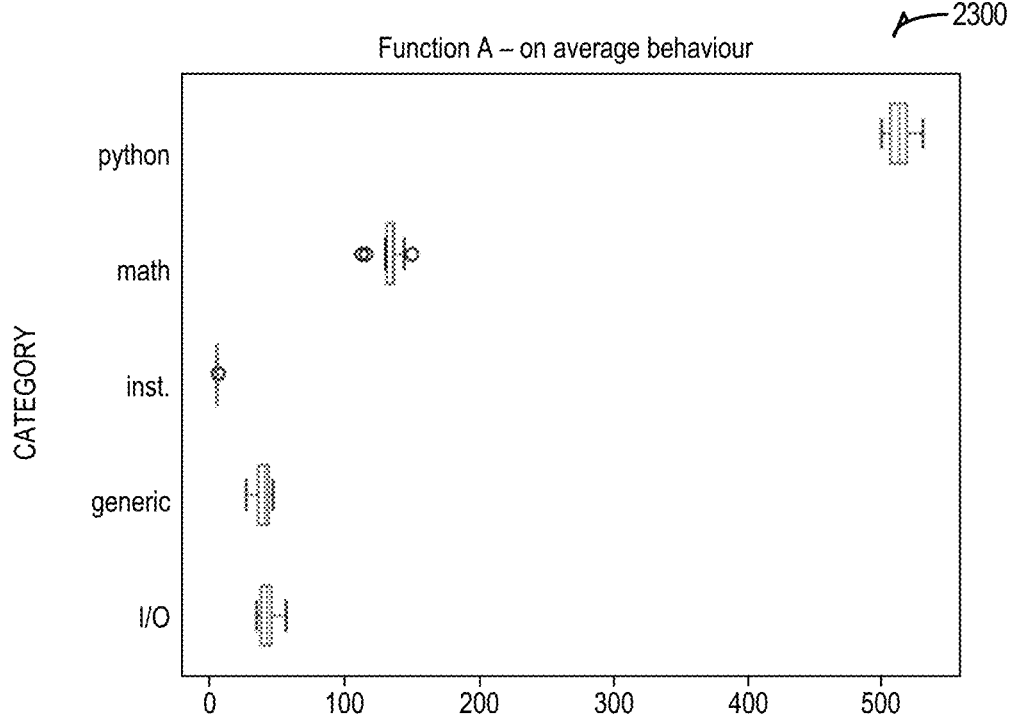
FIG. 23 illustrates a statistical summary example that showcases the behavior of a function over multiple runs.

The profiler component will perform these additional steps during the onboarding of a function, or when a function compositions/workflows is defined/updated. Characterizations of how functions should behave (e.g., in the form of trace, fingerprints, and so forth) can be represented as shown in FIGS. 22 and 23. For example, FIG. 22 illustrates an example of function characterization, which showcases where a function spends its time (e.g., roughly 5% of the function's time is spent on I/O operations for a given hardware configuration). FIG. 23 illustrates a statistical summary, which showcases steady behavior over multiple runs of a function. Outliers in execution performance for a function could be easily detected based on this. This process is also used to determine the best possible hardware configuration, such as by using a reinforced learning approach: a function with high input/output (I/O) utilization can be given increased I/O operations per second (IOPS) and the result of that action can be used to determine the optimal setting for IOPS of this function.

Once insights on how to configure the platform for a particular function are known, these will be stored in the function catalog as private information about the system (e.g., as traces). These can be referenced by the SLA handler whenever the function needs to be deployed. This configuration information is internal only—it is invisible to the end user. The function catalog can also store information about ranges of SLOs that can be fulfilled for each function. This information is public.

Function Invocation and SLA Management

Once functions are published (e.g., deployed in cold, warm, or hot containers), they can be invoked. These invocations would optionally include a reference to a previously agreed SLA. Should no reference be given, they are executed on a best effort approach basis.

An example invocation and response are shown below:
Invocation:
>POST/function/function_1 HTTP/1.1
>Host: 192.168.0.14:8080
>User-Agent: curl/7.58.0
>Accept: */*
>Content-Length: 14
>Content-Type: application/x-www-form-urlencoded
>X-SLA-Reference: 0ddd73b0-f25f-11e8-8eb2-f2801f1b9fd1
>
[ . . . ]
Invocation Response:
<HTTP/1.1 200 OK
<Content-Length: 44
<Content-Type: application/x-www-form-urlencoded <Date: Tue, 27 Nov. 2018 16:07:21 GMT
<X-Call-Id: b4bf27af-3972-4bf6-a837-326eae128193
<X-Duration-Seconds: 0.044262
<X-Start-Time: 1543334841090949273
<
[ . . . ]

Without this solution, the typical workflow for function invocation is as follows: when users make a request, the function is loaded into memory (if not pre-loaded) and invoked and executed on the appliance hardware on a best-effort basis.

With this solution the updated workflow is as follows:

(1) When users make a request, the function is loaded into memory (if not pre-loaded), the underlying hardware is tuned to meet the SLA obligations (if not pre-tuned), and the function is invoked and executed as per the agreed SLA. Other functions may be re-prioritized, retuned, relocated, and/or rescheduled if necessary, and subject to their SLAs, to ensure all hosted functions are executed in compliance with the SLAs applicable to them at that time.

(2) The execution of the function is monitored for SLA compliance by the SLA handler component, and interventions are made if possible to avoid any violations of the agreed SLA. These interventions could include re-tuning for higher performance, or de-prioritizing function invocations with lower priority (or no) SLAs.

Thus, the SLA handler needs to map all the SLOs/deadlines that it currently needs to satisfy-based on the incoming triggers—to a set of actions, which are then issued to the controller. These actions can include:

(1) rearranging the execution order of the functions (e.g., by performing a preemption/eviction of lower priority functions triggers, or inserting advanced reservations to keep enough headroom for future function invocations);

(2) re-configuring of the function's deployment (e.g., the deployment option can change from a cold to warm to hot container, or hardware acceleration techniques can be turned on/off); and (3) re-configuration of platform features (e.g., changing the configuration of an SDN network, or by setting policies on the platform (e.g., required IOPS on the storage system), or by tuning the underlying system fabric, and so forth).

It should be noted that with increased awareness of future function invocations, the more effectively and efficiently the SLA handler will be able to manage the appliance for maximum workload within SLA compliance.

Figure 24:
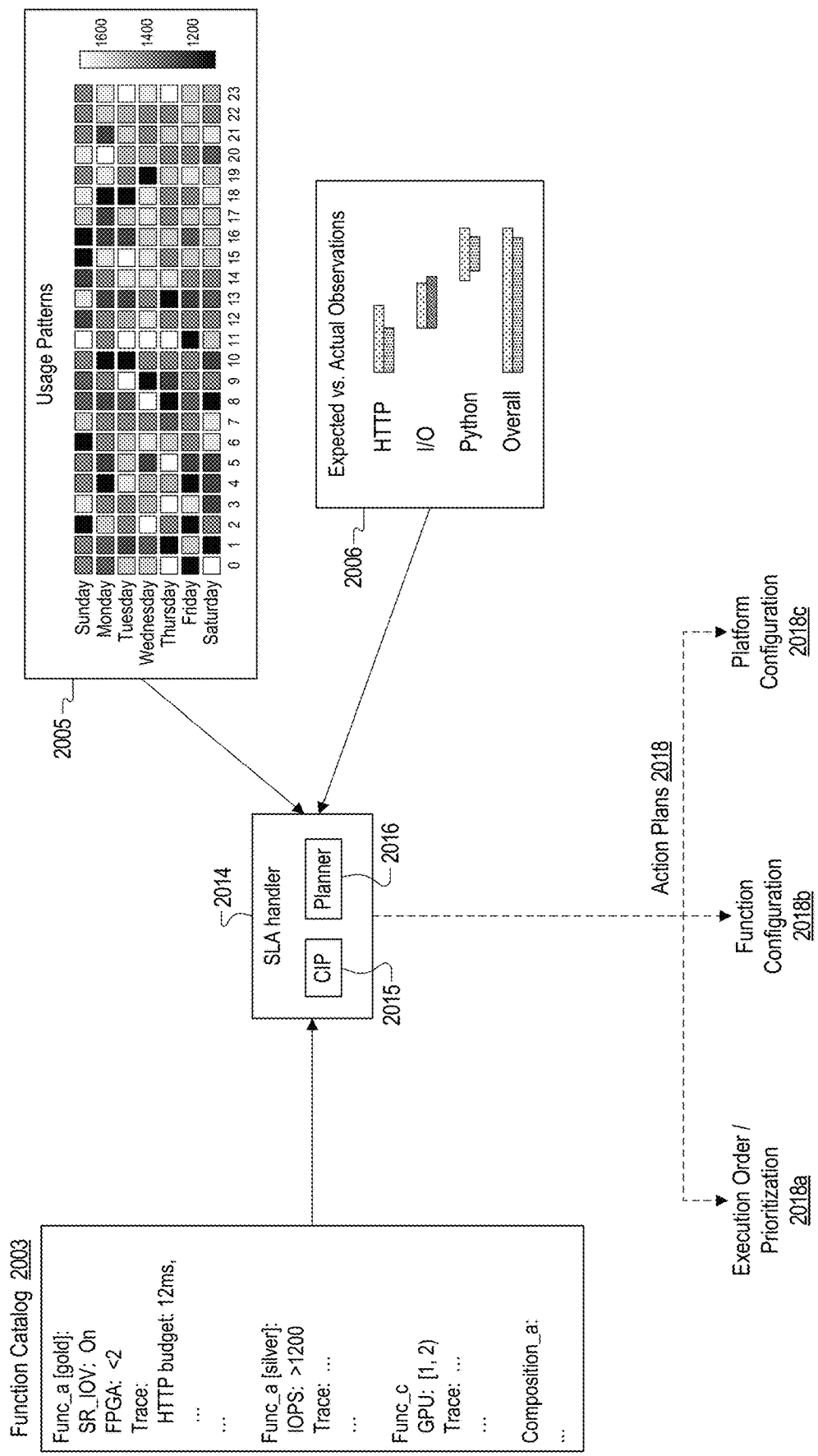
FIG. 24 illustrates an example embodiment of a service level agreement (SLA) handler for function orchestration.

FIG. 24 illustrates an example of the inputs and outputs of the SLA handler 2014. For example, through a continuous improvement process (CIP) 2015, the handler 2014 will compare the expected versus actual performance of the function 2006. Expected information on how a function instance should perform is stored in the function catalog 2003 based on previous characterization during the onboarding process by the profiler component 2012.

In addition, the usage patterns 2005 of the functions are analyzed. For example, functions used less often—with less prioritization based on their SLA—might not be pre-tuned, while functions often used and which show discrepancy in their expected versus actual behavior 2006 need to be addressed first. Also, the usage patterns 2005 and information about actual versus current behavior 2006 will facilitate determining the headroom of the system, helping decide what additional SLAs the system can accept.

As SLAs expire, this must also be considered as reconfiguration of other functions may be appropriate, and additional headroom and resources will be released for future SLAs.

The CIP 2015 triggers the planning module 2016 with a ranked list of functions that need consideration. The planning component 2016 will use these rankings to determine the best possible (set of) action(s) to perform 2018. Given the current configuration and setup of a function, the planning component will determine possible configuration changes (and recursively their follow-up configuration changes) and based on cost functions determine the best possible set of actions 2018*a-c*. This set of actions 2018*a-c* is issued to the controller 2008.

Figure 25:
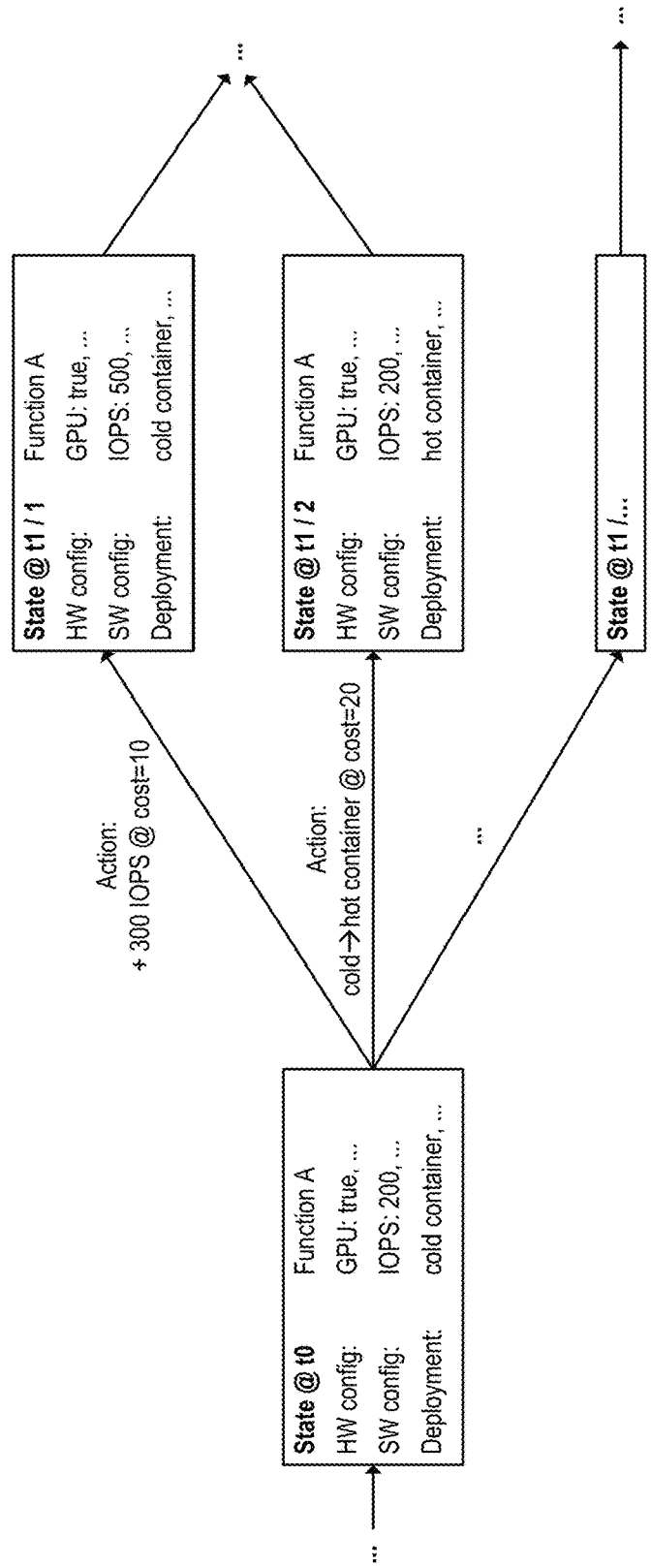
FIG. 25 illustrates a portion of a planning state graph for function orchestration.

FIG. 25 illustrates an excerpt of a planning state graph used to determine the best possible next (set of) action(s). In particular, the planning component 2016 of the SLA handler 2014 can perform its reasoning over the planning state graph of FIG. 25.

Local Camera Discovery and Secure Streaming Microservices

In some embodiments, a set of reusable microservices may be used to (i) securely and dynamically discover local camera streams independent of the camera vendors, and (ii) restream the discovered streams locally. Vendor-agnostic discovery enables dynamic video streaming systems with reduced configuration overheard. Moreover, secure restreaming allows lower network utilization, reduces the burden on camera hardware, and decouples camera security credentials from local microservice credentials. In some cases, it may be appropriate to notify the original content owner and/or camera owner regarding a second node's interest in re-streaming a video stream for the purpose of obtaining approval and/or sharing compensation or remuneration.

Video Object-Aware Orchestration

Visual analytics pipelines, such as those deployed across an end-to-end (E2E) computing infrastructure, typically need to process various diverse video objects, such as videos and/or streams of videos with various frame rates, compression ratios, encryption ratios, and so forth. Furthermore, particularly for streams of video, chunks of video frames typically need to be processed (e.g., compressed, encrypted, transcoded) at various rates for various use cases.

Given that the E2E infrastructure reaches from the edge to the cloud, networking connections are ephemeral, and bandwidth is constrained, performing orchestration for a visual analytics pipeline can be challenging. For example, workloads need to be placed in optimal locations in the E2E infrastructure-preferably close to the video objects they need to process—and data (e.g., video objects, visual metadata) also needs to be moved to optimal locations in the infrastructure. Further, the orchestration must also be capable of considering and adapting to dynamic environments in which usage patterns vary over time. For example, the "interesting" video clips for a retail use case may typically be captured during business hours, while the "interesting" video clips of a road intersection for a smart city use case may typically be captured during rush hour.

Accordingly, in some embodiments, video object-aware orchestration techniques may be leveraged to perform orchestration for a visual analytics pipeline in a more efficient manner. For example, due to the dynamicity of these deployments (e.g., the dynamic infrastructure, environment, and/or workloads), techniques may be applied to adapt the video delivery (e.g., delivery of video objects and feeds/streams) in an optimal manner, such as by adapting the compression rate, the quality of machine learning (ML) models derived from the video data, the encryption or transcoding of the video data, and so forth. This allows for adapting to the various latency requirements that might be in place.

In some embodiments, for example, the video data may be intelligently tagged on a block-level basis once it is created and before it is uploaded to a particular network location, such as the cloud, edge, and/or a content delivery network (CDN), among other examples. The tags then allow decision-making systems to reason over requirements and the tagged data to make decisions on when to transcode/encrypt/move/ . . . the video data on the fly and in a dynamic fashion.

Example Computing Embodiments

The following sections present various examples of computing devices, systems, architectures, and environments that may be used in conjunction with the orchestration functionality described throughout this disclosure.

Example Edge Computing Embodiments

Figure 26:
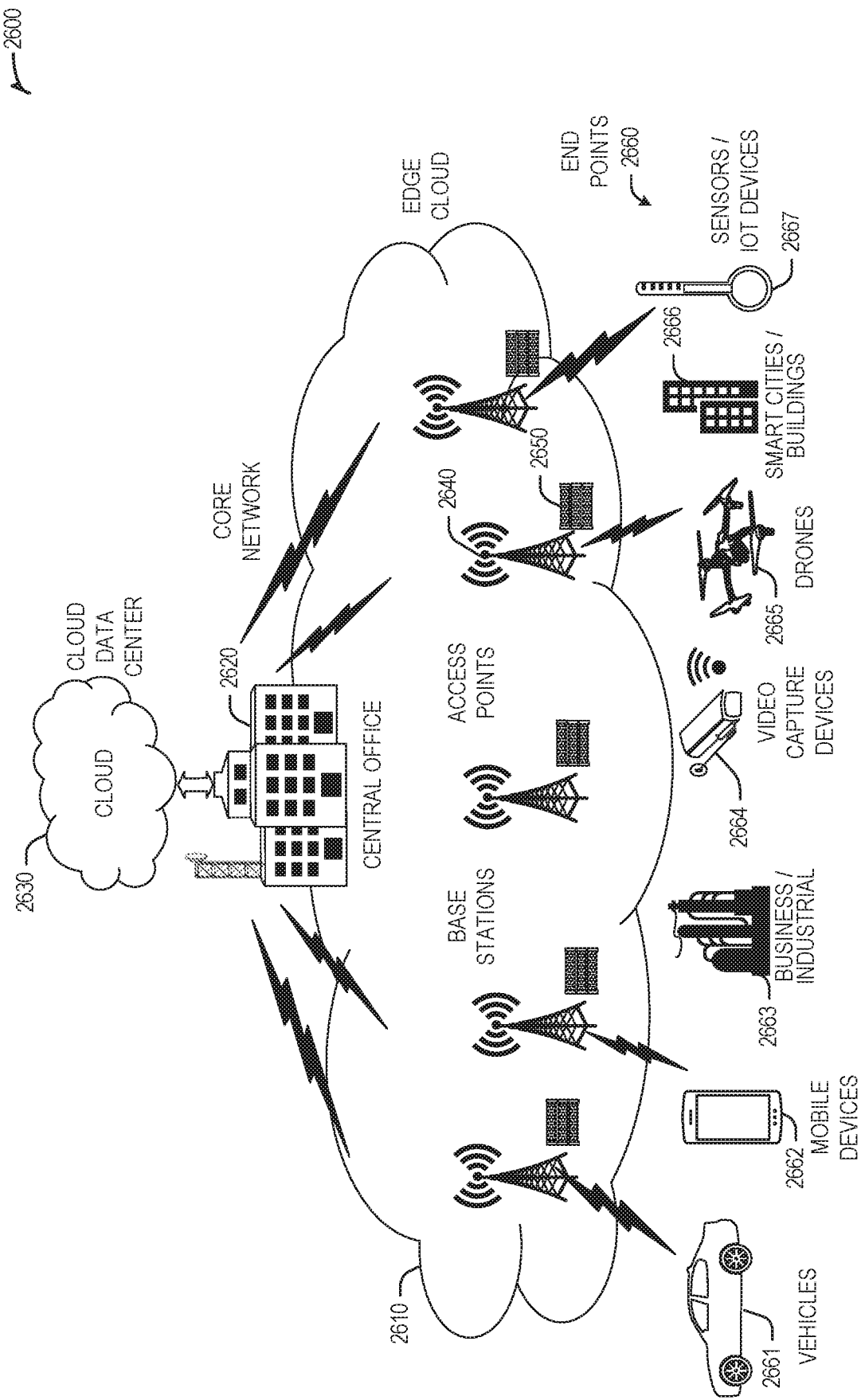
FIG. 26 illustrates an overview of an edge cloud configuration for edge computing.

FIG. 26 is a block diagram 2600 showing an overview of a configuration for edge computing, which includes a layer of processing referred to in many of the following examples as an "edge cloud". As shown, the edge cloud 2610 is co-located at an edge location, such as an access point or base station 2640, a local processing hub 2650, or a central office 2620, and thus may include multiple entities, devices, and equipment instances. The edge cloud 2610 is located much closer to the endpoint (consumer and producer) data sources 2660 (e.g., autonomous vehicles 2661, user equipment 2662, business and industrial equipment 2663, video capture devices 2664, drones 2665, smart cities and building devices 2663, sensors and IoT devices 2667, etc.) than the cloud data center 2630. Compute, memory, and storage resources which are offered at the edges in the edge cloud 2610 are critical to providing ultra-low latency response times for services and functions used by the endpoint data sources 2660 as well as reduce network backhaul traffic from the edge cloud 2610 toward cloud data center 2630 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., UEs), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In various embodiments, the automated resource management and workload orchestration functionality described throughout this disclosure may be used to manage resources and orchestrate workloads for services and applications in system 2600 of FIG. 26.

Figure 27:
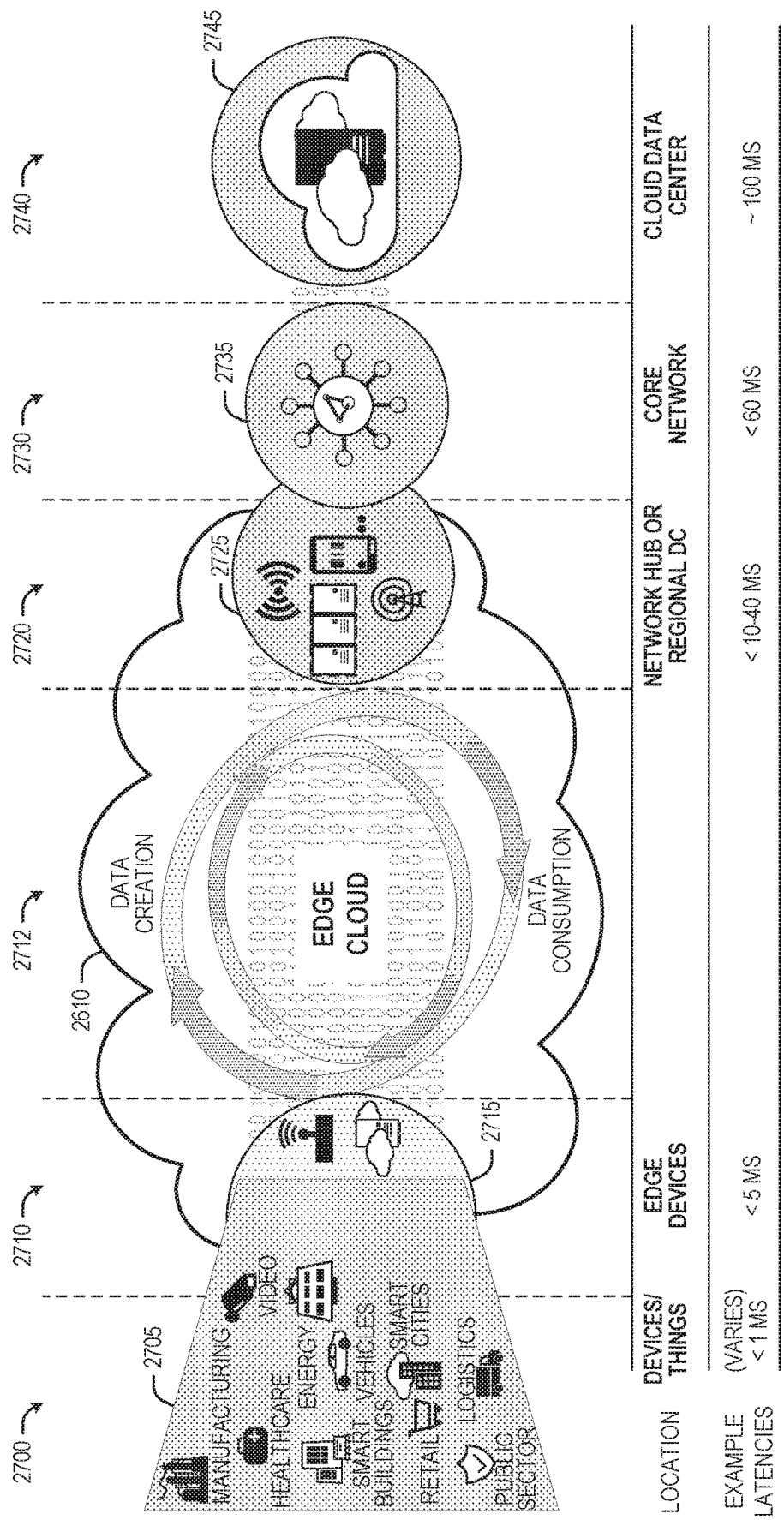
FIG. 27 illustrates operational layers among endpoints, an edge cloud, and cloud computing environments.

FIG. 27 illustrates operational layers among endpoints, an edge cloud, and cloud computing environments. Specifically, FIG. 27 depicts examples of computational use cases 2705, utilizing the edge cloud 2610 among multiple illustrative layers of network computing. The layers begin at an endpoint (devices and things) layer 2700, which accesses the edge cloud 2610 to conduct data creation, analysis, and data consumption activities. The edge cloud 2610 may span multiple network layers, such as an edge devices layer 2710 having gateways, on-premise servers, or network equipment (nodes 2715) located in physically proximate edge systems; a network access layer 2720, encompassing base stations, radio processing units, network hubs, regional data centers, or local network equipment (equipment 2725); and any equipment, devices, or nodes located therebetween (in layer 2712, not illustrated in detail). The network communications within the edge cloud 2610 and among the various layers may occur via any number of wired or wireless mediums.

Examples of latency, resulting from network communication distance and processing time constraints, may range from less than a millisecond (ms) when among the endpoint layer 2700, under 5 ms at the edge devices layer 2710, to even between 10 to 40 ms when communicating with nodes at the network access layer 2720. Beyond the edge cloud 2610 are core network 2730 and cloud data center 2740 layers, each with increasing latency (e.g., between 50-60 ms at the core network layer 2730, to 100 or more ms at the cloud data center layer). As a result, operations at a core network data center 2735 or a cloud data center 2745, with latencies of at least 50 to 100 ms or more, will not be able to accomplish many time-critical functions of the use cases 2705. Each of these latency values are provided for purposes of illustration and contrast; it will be understood that the use of other access network mediums and technologies may further reduce the latencies.

The various use cases 2705 may access resources under usage pressure from incoming streams, due to multiple services utilizing the edge cloud. To achieve results with low latency, the services executed within the edge cloud 2610 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation and (2) augment other components in the system to resume overall transaction SLA and (3) implement steps to remediate.

Thus, with these variations and service features in mind, edge computing within the edge cloud 2610 may provide the ability to serve and respond to multiple applications of the use cases 2705 (e.g., object tracking, video surveillance, connected cars, etc.) in real-time or near real-time, and meet ultra-low latency requirements for these multiple applications. These advantages enable a whole new class of applications (VNFs, Function as a Service (FaaS), standard processes, etc.) which cannot leverage conventional cloud computing due to latency or other limitations.

However, with the advantages of edge computing comes the following caveats. The devices located at the edge are often resource constrained and therefore there is pressure on usage of edge resources. Typically this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 2610 in a multi-tenant, multi-owner, or multi-access setting, where services and applications are requested by many users, especially as network usage dynamically fluctuates and the composition of the multiple stakeholders, use cases, and services changes.

Figure 28:
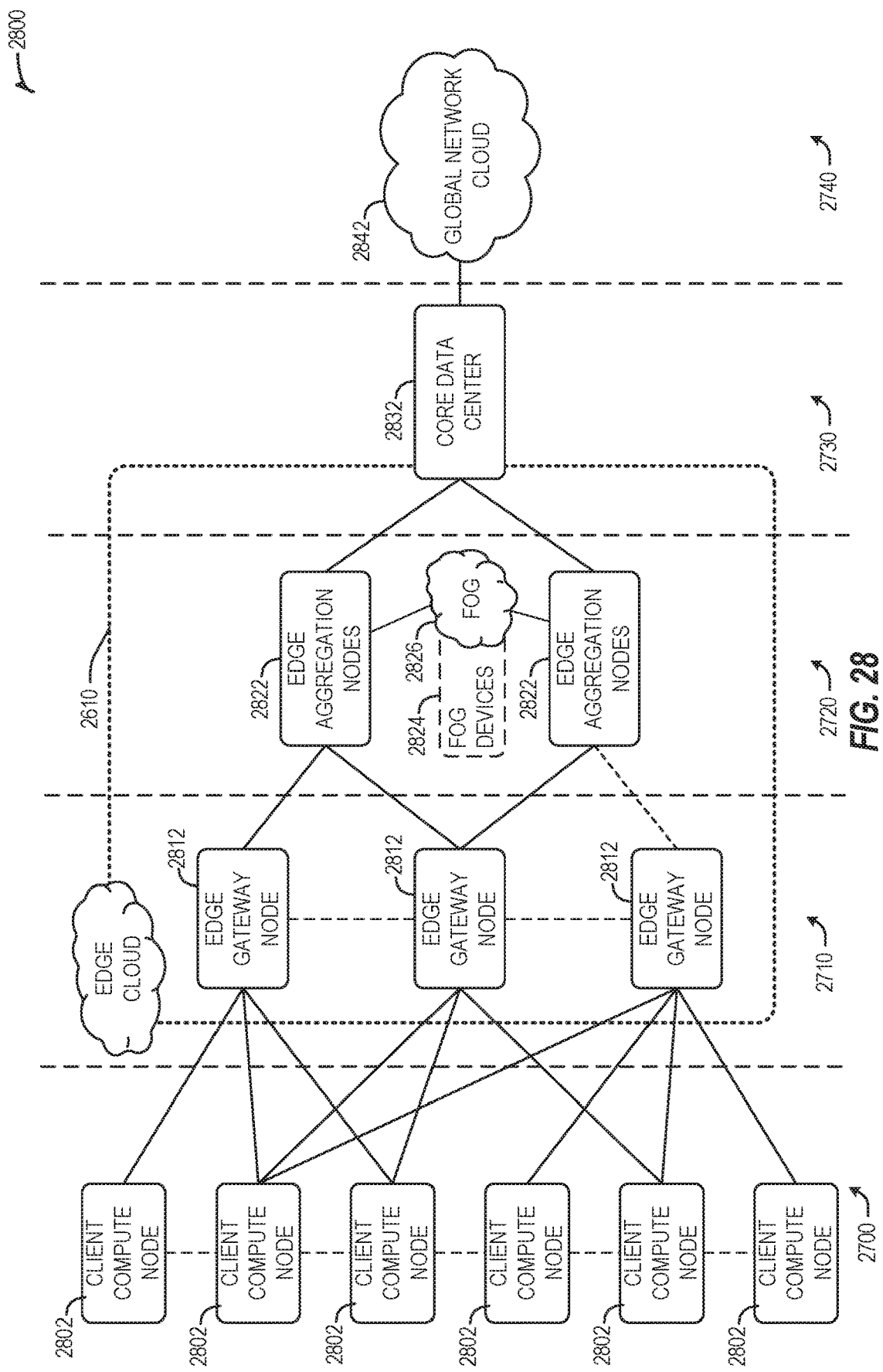
FIG. 28 provides an overview of layers of distributed compute deployed among an edge computing system.

At a more generic level, an edge computing system may be described to encompass any number of deployments at the previously discussed layers operating in the edge cloud 2610 (network layers 2700-2740), which provide coordination from client and distributed computing devices. FIG. 28 provides an abstracted overview of layers of distributed compute deployed among an edge computing environment for purposes of illustration. Various types of network links at the same (e.g., peer-to-peer) or different layers are also depicted.

FIG. 28 generically depicts an edge computing system 2800 for providing edge services and applications to multi-stakeholder entities, as distributed among one or more client compute nodes 2802, one or more edge gateway nodes 2812, one or more edge aggregation nodes 2822, one or more core data centers 2832, and a global network cloud 2842, as distributed across layers of the network. The implementation of the edge computing system 2800 may be provided at or on behalf of a telecommunication service provider ("telco", or "TSP"), internet-of-things service provider, cloud service provider (CSP), enterprise entity, or any other number of entities. Various implementations and configurations of the system 2800 may be provided dynamically, such as when orchestrated to meet service objectives.

Individual nodes or devices of the edge computing system 2800 are located at a particular layer corresponding to layers 2700, 2710, 2720, 2730, 2740. For example, the client compute nodes 2802 are located at an endpoint layer 2700, while the edge gateway nodes 2812 are located at an edge devices layer 2710 (local level) of the edge computing system 2800. Additionally, the edge aggregation nodes 2822 (and/or fog devices 2824, if arranged or operated with or among a fog networking configuration 2826) are located at a network access layer 2720 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provide a decentralized architecture and serves as an extension to cloud computing by collaborating with one or more edge node devices, providing the subsequent amount of localized control, configuration and management, and much more for end devices. Furthermore, Fog computing provides the ability for edge resources to identify similar resources and collaborate in order to create an edge-local cloud which can be used solely or in conjunction with cloud computing in order to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 2832 is located at a core network layer 2730 (a regional or geographically-central level), while the global network cloud 2842 is located at a cloud data center layer 2740 (a national or world-wide layer). The use of "core" is provided as a term for a centralized network location—deeper in the network—which is accessible by multiple edge nodes or components; however, a "core" does not necessarily designate the "center" or the deepest location of the network. Accordingly, the core data center 2832 may be located within, at, or near the edge cloud 2610. Although an illustrative number of client compute nodes 2802, edge gateway nodes 2812, edge aggregation nodes 2822, edge core data centers 2832, global network clouds 2842 are shown in FIG. 28, it should be appreciated that the edge computing system 2800 may include additional devices or systems at each layer. Devices at any layer can be configured as peer nodes to each other and, accordingly, act in a collaborative manner to meet service objectives. Additionally, as shown in FIG. 28, the number of components of respective layers 2700, 2710, 2720, 2730, 2740 generally increases at each lower level (e.g., when moving closer to endpoints). As such, one edge gateway node 2812 may service multiple client compute nodes 2802, and one edge aggregation node 2822 may service multiple edge gateway nodes 2812.

Consistent with the examples provided herein, a client compute node 2802 may be embodied as any type of endpoint component, device, appliance, or other thing capable of communicating as a producer or consumer of data. Further, the label "node" or "device" as used in the edge computing system 2800 does not necessarily mean that such node or device operates in a client or slave role; rather, any of the nodes or devices in the edge computing system 2800 refer to individual entities, nodes, or subsystems which include discrete or connected hardware or software configurations to facilitate or use the edge cloud 2610.

As such, the edge cloud 2610 is formed from network components and functional features operated by and within the edge gateway nodes 2812 and the edge aggregation nodes 2822 of layers 2710, 2720, respectively. The edge cloud 2610 may be embodied as any type of network that provides edge computing and/or storage resources which are proximately located to radio access network (RAN) capable endpoint devices (e.g., mobile computing devices, IoT devices, smart devices, etc.), which are shown in FIG. 28 as the client compute nodes 2802. In other words, the edge cloud 2610 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 2610 may form a portion of or otherwise provide an ingress point into or across a fog networking configuration 2826 (e.g., a network of fog devices 2824, not shown in detail), which may be embodied as a system-level horizontal and distributed architecture that distributes resources and services to perform a specific function. For instance, a coordinated and distributed network of fog devices 2824 may perform computing, storage, control, or networking aspects in the context of an IoT system arrangement. Other networked, aggregated, and distributed functions may exist in the edge cloud 2610 between the core data center 2832 and the client endpoints (e.g., client compute nodes 2802). Some of these are discussed in the following sections in the context of network functions or service virtualization, including the use of virtual edges and virtual services which are orchestrated for multiple stakeholders.

As discussed in more detail below, the edge gateway nodes 2812 and the edge aggregation nodes 2822 cooperate to provide various edge services and security to the client compute nodes 2802. Furthermore, because a client compute node 2802 may be stationary or mobile, a respective edge gateway node 2812 may cooperate with other edge gateway devices to propagate presently provided edge services, relevant service data, and security as the corresponding client compute node 2802 moves about a region. To do so, the edge gateway nodes 2812 and/or edge aggregation nodes 2822 may support multiple tenancy and multiple stakeholder configurations, in which services from (or hosted for) multiple service providers, owners, and multiple consumers may be supported and coordinated across a single or multiple compute devices.

In various embodiments, the automated resource management and workload orchestration functionality described throughout this disclosure may be used to manage resources and orchestrate workloads for services and applications in system 2800 of FIG. 28.

A variety of security approaches may be utilized within the architecture of the edge cloud 2610. In a multi-stakeholder environment, there can be multiple loadable security modules (LSMs) used to provision policies that enforce the stakeholders interests. Enforcement point environments could support multiple LSMs that apply the combination of loaded LSM policies (e.g., where the most constrained effective policy is applied, such as where if any of A, B or C stakeholders restricts access then access is restricted). Within the edge cloud 2610, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (to identify what elements are required by the system to conduct a service, how the system responds to service conditions and changes, and the like).

A "service" is a broad term often applied to various contexts, but in general it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during and end of the service.

Figure 29:
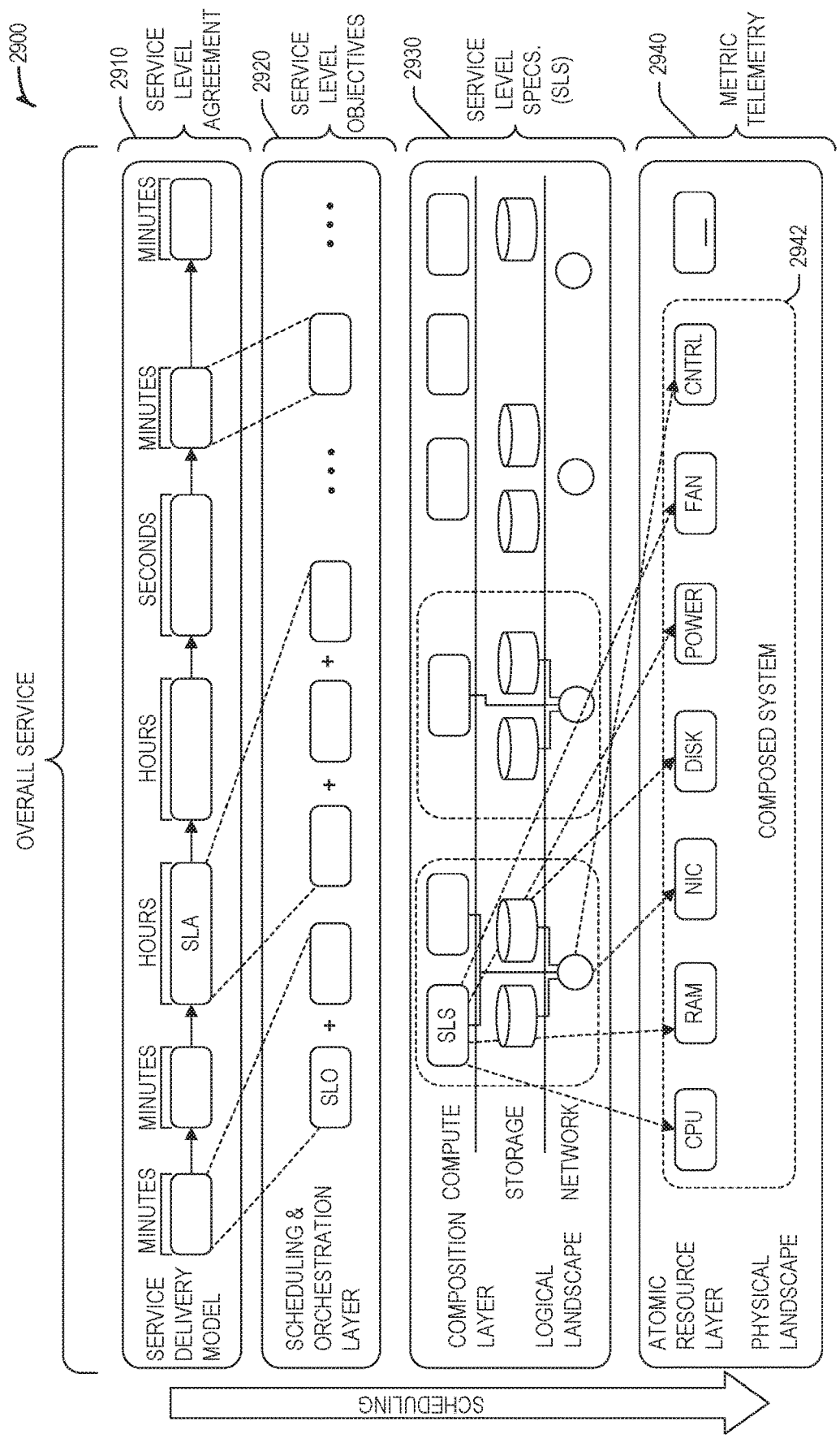
FIG. 29 provides an overview of layers of distributed compute deployed among an edge computing system.

An example relationship among services for use in an edge computing system is depicted in FIG. 29. In scenarios of edge computing, there are several services, and transaction layers in operation and dependent on each other—these services create a "service chain". At the lowest level, ingredients compose systems. These systems (or resources) communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in the hierarchy depicted in FIG. 29 is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement could define "transactional throughput" or "timeliness"—in case of SDSi, the system (or resource) can sign up to guarantee specific service level specifications (SLS 2930) and objectives (SLO 2920) of a service level agreement (SLA 2910). SDSi hardware also provides the ability for the infrastructure and resource owner to empower the silicon component (e.g., components of a composed system 2942 that produce metric telemetry 2940) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

The higher layer in the services hierarchy, Resource Level Services, includes systems which provide (in complete or through composition) the ability to meet workload demands by either acquiring and enabling system level features via SDSi, or through the composition of individually addressable resources (compute, storage and network).

The higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling (we can include lots more in this). Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

The higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

The highest layer of services in the service hierarchy, Business Level Services (BLS), is tied to the capability that is being delivered. At this level, the customer or entity might not care about how the service is composed or what ingredients are used, managed, tracked in order to provide the service(s). The primary objective of business level services is to attain the goals set by the customer according to the overall contract terms and conditions established between the customer and the provider at the agreed to financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead through an agent or middleware capability. Services such as: locate, find, address, trace, track, identify, register may be placed immediately in effect as resources appear on the framework, and the manager or owner of the resource domain can use management rules and policies to ensure orderly resource discovery, registration and certification.

Moreover, any number of the edge computing architectures described herein may be adapted with service management features. These features may enable a system to be constantly aware and record information about the motion, vector and direction of resources as well as fully describe these features as both telemetry and metadata associated with the devices. These service management features can be used for resource management, billing and metering, as well as an element of security. The same functionality also applies to related resources, where a less intelligent device, like a sensor, might attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

In various embodiments, the automated resource management and workload orchestration functionality described throughout this disclosure may be used to manage resources and orchestrate workloads for services and applications in system 2900 of FIG. 29.

Figure 30:
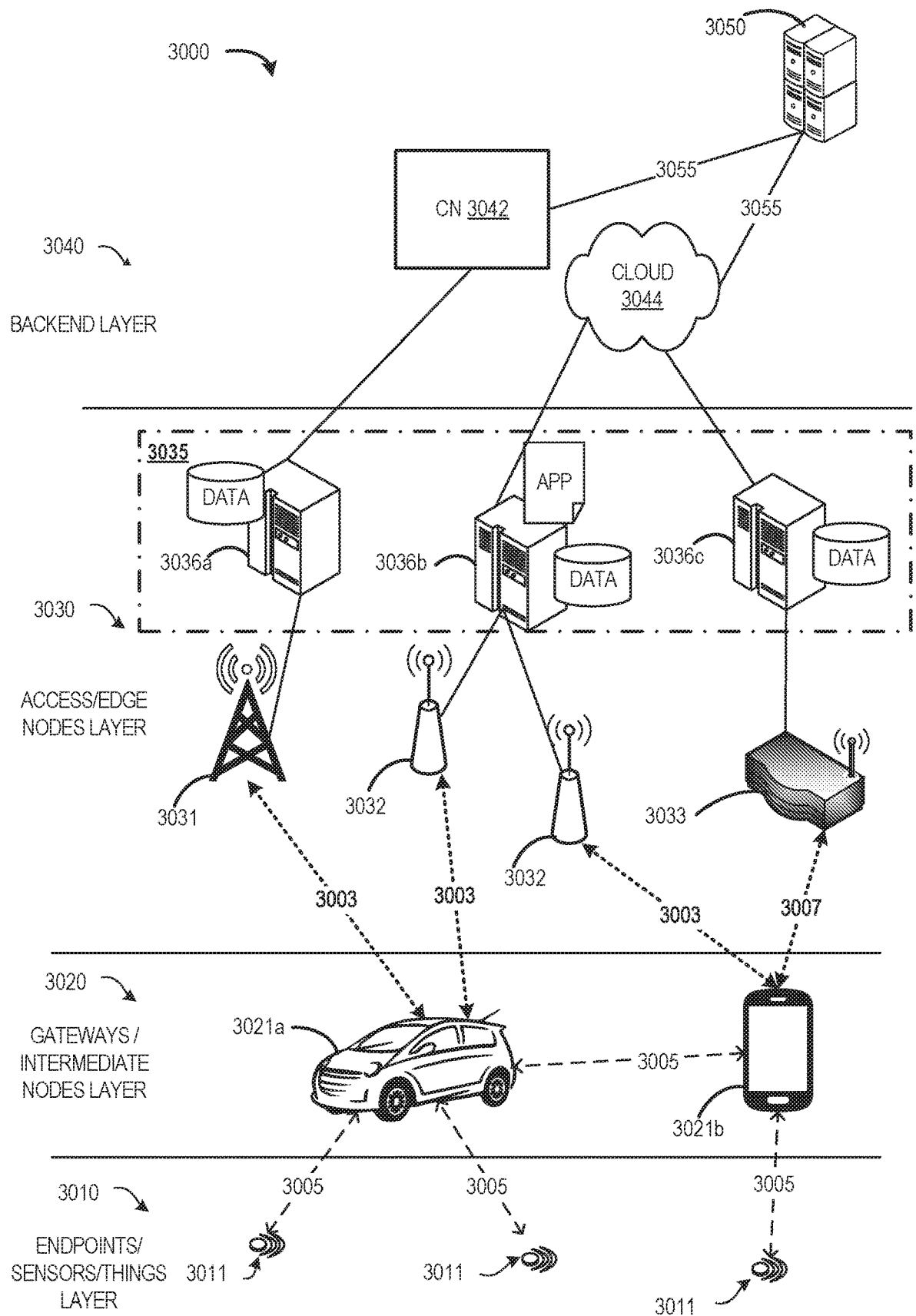
FIG. 30 illustrates an example edge computing environment in accordance with various embodiments.

FIG. 30 illustrates an example edge computing environment 3000 in accordance with various embodiments. FIG. 30 specifically illustrates the different layers of communication occurring within the environment 3000, starting from endpoint sensors or things layer 3010 (e.g., operating in an Internet of Things (IoT) network topology) comprising one or more IoT devices 3011 (also referred to as edge endpoints 3010 or the like); increasing in sophistication to gateways or intermediate node layer 3020 comprising one or more user equipment (UEs) 3021a and 3021b (also referred to as intermediate nodes 3020 or the like), which facilitate the collection and processing of data from endpoints 3010; increasing in processing and connectivity sophistication to access node layer 3030 (or "edge node layer 3030") comprising a plurality of network access nodes (NANs) 3031, 3032, and 3033 (collectively referred to as "NANs 3031-3033" or the like) and a plurality of edge compute nodes 3036a-c (collectively referred to as "edge compute nodes 3036" or the like) within an edge computing system 3035; and increasing in connectivity and processing sophistication to a backend layer 3010 comprising core network (CN) 3042 and cloud 3044. The processing at the backend layer 3010 may be enhanced by network services as performed by a remote application server 3050 and/or other cloud services. Some or all of these elements may be equipped with or otherwise implement some or all aspects of the LPP embodiments discussed infra.

The environment 3000 is shown to include end-user devices, such as intermediate nodes 3020 and endpoints 3010, which are configured to connect to (or communicatively couple with) one or more multiple communication networks (also referred to as "access networks," "radio access networks," or the like) based on different access technologies (or "radio access technologies") for accessing application services. These access networks may include one or more of NANs 3031, 3032, and/or 3033. The NANs 3031-3033 are arranged to provide network connectivity to the end-user devices via respective links 3003, 3007 between the individual NANs and the one or more UEs 3011, 3021.

As examples, the communication networks and/or access technologies may include cellular technology such as LTE, MuLTEfire, and/or NR/5G (e.g., as provided by Radio Access Network (RAN) node 3031 and/or RAN nodes 3032), WiFi or wireless local area network (WLAN) technologies (e.g., as provided by access point (AP) 3033 and/or RAN nodes 3032), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 3020 include UE 3021a and UE 3021b (collectively referred to as "UE 3021" or "UEs 3021"). In this example, the UE 3021a is illustrated as a vehicle UE, and UE 3021b is illustrated as a smartphone (e.g., handheld touchscreen mobile computing device connectable to one or more cellular networks). However, these UEs 3021 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 3010 include UEs 3011, which may be IoT devices (also referred to as "IoT devices 3011"), which are uniquely identifiable embedded computing devices (e.g., within the Internet infrastructure) that comprise a network access layer designed for low-power IoT applications utilizing short-lived UE connections. The IoT devices 3011 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 3011 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 3011 can utilize technologies such as M2M or MTC for exchanging data with an MTC server (e.g., a server 3050), an edge server 3036 and/or edge computing system 3035, or device via a PLMN, ProSe or D2D communication, sensor networks, or IoT networks. The M2M or MTC exchange of data may be a machine-initiated exchange of data.

The IoT devices 3011 may execute background applications (e.g., keep-alive messages, status updates, etc.) to facilitate the connections of the IoT network. Where the IoT devices 3011 are, or are embedded in, sensor devices, the IoT network may be a WSN. An IoT network describes an interconnecting IoT UEs, such as the IoT devices 3011 being connected to one another over respective direct links 3005. The IoT devices may include any number of different types of devices, grouped in various combinations (referred to as an "IoT group") that may include IoT devices that provide one or more services for a particular user, customer, organizations, etc. A service provider (e.g., an owner/operator of server 3050, CN 3042, and/or cloud 3044) may deploy the IoT devices in the IoT group to a particular area (e.g., a geolocation, building, etc.) in order to provide the one or more services. In some implementations, the IoT network may be a mesh network of IoT devices 3011, which may be termed a fog device, fog system, or fog, operating at the edge of the cloud 3044. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 3044 to Things (e.g., IoT devices 3011). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 3030) and/or a central cloud computing service (e.g., cloud 3044) for performing heavy computations or computationally burdensome tasks. On the other hand, edge cloud computing consolidates human-operated, voluntary resources, as a cloud. These voluntary resource may include, inter-alia, intermediate nodes 3020 and/or endpoints 3010, desktop PCs, tablets, smartphones, nano data centers, and the like. In various implementations, resources in the edge cloud may be in one to two-hop proximity to the IoT devices 3011, which may result in reducing overhead related to processing data and may reduce network delay.

In some embodiments, the fog may be a consolidation of IoT devices 3011 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 3044. The fog operating at the edge of the cloud 3044 may overlap or be subsumed into an edge network 3030 of the cloud 3044. The edge network of the cloud 3044 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 3036 or edge devices). The Fog layer resides on top of the edge layer and is a consolidation of networking devices such as the intermediate nodes 3020 and/or endpoints 3010 of FIG. 30.

Data may be captured, stored/recorded, and communicated among the IoT devices 3011 or, for example, among the intermediate nodes 3020 and/or endpoints 3010 that have direct links 3005 with one another as shown by FIG. 30. Analysis of the traffic flow and control schemes may be implemented by aggregators that are in communication with the IoT devices 3011 and each other through a mesh network. The aggregators may be a type of IoT device 3011 and/or network appliance. In the example of FIG. 30, the aggregators may be edge nodes 3030, or one or more designated intermediate nodes 3020 and/or endpoints 3010. Data may be uploaded to the cloud 3044 via the aggregator, and commands can be received from the cloud 3044 through gateway devices that are in communication with the IoT devices 3011 and the aggregators through the mesh network. Unlike the traditional cloud computing model, in some implementations, the cloud 3044 may have little or no computational capabilities and only serves as a repository for archiving data recorded and processed by the fog. In these implementations, the cloud 3044 centralized data storage system and provides reliability and access to data by the computing resources in the fog and/or edge devices. Being at the core of the architecture, the Data Store of the cloud 3044 is accessible by both Edge and Fog layers of the aforementioned edge-fog network.

As mentioned previously, the access networks provide network connectivity to the end-user devices 3020, 3010 via respective NANs 3031-3033. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 3031, 3032. This virtualized framework allows the freed-up processor cores of the NANs 3031, 3032 to perform other virtualized applications, such as virtualized applications for LPP embodiments discussed herein.

The UEs 3021, 3011 may utilize respective connections (or channels) 3003, each of which comprises a physical communications interface or layer. The connections 3003 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. In some embodiments, the UEs 3011, 3021 and the NANs 3031-3033 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 3011, 3021 and NANs 3031-3033 may operate using LAA, enhanced LAA (eLAA), and/or further eLAA (feLAA) mechanisms. The UEs 3021, 3011 may further directly exchange communication data via respective direct links 3005, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

The UEs 3011, 3021 are capable of measuring various signals or determining/identifying various signal/channel characteristics. Signal measurement may be performed for cell selection, handover, network attachment, testing, and/or other purposes. The measurements collected by the UEs 3011, 3021 may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), signal-to-noise ratio (SNR), signal-to-noise and interference ratio (SINR), signal-plusnoise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 3031-3033 reference time and a GNSS-specific reference time for a given GNSS), GNSS code measurements (e.g., The GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215, IEEE 802.11, Part 11: "Wireless LAN Medium Access Control (MAC) and Physical Layer (PHY) specifications, IEEE Std.", and/or the like. The same or similar measurements may be measured or collected by the NANs 3031-3033.

The UE 3021b is shown to be configured to access an access point (AP) 3033 via a connection 3007. In this example, the AP 3033 is shown to be connected to the Internet without connecting to the CN 3042 of the wireless system. The connection 3007 can comprise a local wireless connection, such as a connection consistent with any IEEE 802.11 protocol, wherein the AP 3033 would comprise a wireless fidelity (WiFi®) router. In embodiments, the UEs 3021 and IoT devices 3011 can be configured to communicate using suitable communication signals with each other or with any of the AP 3033 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 3031 and 3032 that enable the connections 3003 may be referred to as "RAN nodes" or the like. The RAN nodes 3031, 3032 may comprise ground stations (e.g., terrestrial access points) or satellite stations providing coverage within a geographic area (e.g., a cell). The RAN nodes 3031, 3032 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 3031 is embodied as a NodeB, evolved NodeB (eNB), or a next generation NodeB (gNB), and the RAN nodes 3032 are embodied as relay nodes, distributed units, or Road Side Unites (RSUs). Any other type of NANs can be used.

Any of the RAN nodes 3031, 3032 can terminate the air interface protocol and can be the first point of contact for the UEs 3021 and IoT devices 3011. In some embodiments, any of the RAN nodes 3031/3032 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. In embodiments, the UEs 3011, 3021 can be configured to communicate using OFDM communication signals with each other or with any of the NANs 3031, 3032 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RAN function(s) operated by the RAN or individual NANs 3031-3032 organize downlink transmissions (e.g., from any of the RAN nodes 3031, 3032 to the UEs 3011, 3021) and uplink transmissions (e.g., from the UEs 3011, 3021 to RAN nodes 3031, 3032) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 3011, 3021 at each transmission time interval (TTI). A TTI is the duration of a transmission on a radio link 3003, 3005, and is related to the size of the data blocks passed to the radio link layer from higher network layers.

The NANs 3031/3032 may be configured to communicate with one another via respective interfaces or links (not shown), such as an X2 interface for LTE implementations (e.g., when CN 3042 is an Evolved Packet Core (EPC)), an Xn interface for 5G or NR implementations (e.g., when CN 3042 is an Fifth Generation Core (5GC)), or the like. The NANs 3031 and 3032 are also communicatively coupled to CN 3042. In embodiments, the CN 3042 may be an evolved packet core (EPC) network, a NextGen Packet Core (NPC) network, a 5G core (5GC), or some other type of CN. The CN 3042 may comprise a plurality of network elements, which are configured to offer various data and telecommunications services to customers/subscribers (e.g., users of UEs 3021 and IoT devices 3011) who are connected to the CN 3042 via a RAN. The components of the CN 3042 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 3042 may be referred to as a network slice, and a logical instantiation of a portion of the CN 3042 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 3042 components/functions.

The CN 3042 is shown to be communicatively coupled to an application server 3050 and a network 3050 via an IP communications interface 3055. the one or more server(s) 3050 comprise one or more physical and/or virtualized systems for providing functionality (or services) to one or more clients (e.g., UEs 3021 and IoT devices 3011) over a network. The server(s) 3050 may include various computer devices with rack computing architecture component(s), tower computing architecture component(s), blade computing architecture component(s), and/or the like. The server(s) 3050 may represent a cluster of servers, a server farm, a cloud computing service, or other grouping or pool of servers, which may be located in one or more datacenters. The server(s) 3050 may also be connected to, or otherwise associated with one or more data storage devices (not shown). Moreover, the server(s) 3050 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 3050 offer applications or services that use IP/network resources. As examples, the server(s) 3050 may provide traffic management services, cloud analytics, content streaming services, immersive gaming experiences, social networking and/or microblogging services, and/or other like services. In addition, the various services provided by the server(s) 3050 may include initiating and controlling software and/or firmware updates for applications or individual components implemented by the UEs 3021 and IoT devices 3011. The server(s) 3050 can also be configured to support one or more communication services (e.g., Voice-over-Internet Protocol (VoIP) sessions, PTT sessions, group communication sessions, social networking services, etc.) for the UEs 3021 and IoT devices 3011 via the CN 3042.

The cloud 3044 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 3044 include application capabilities type, infrastructure capabilities type, and platform capabilities type. A cloud capabilities type is a classification of the functionality provided by a cloud service to a cloud service customer (e.g., a user of cloud 3044), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 3044 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; Function as a Service (FaaS) to the applications running in the edge devices (e.g., smartphones or IoT) to accelerate their workloads and applications; Acceleration FaaS (AFaaS) an FaaS implementation where functions are implemented and executed in a hardware accelerator, which may be used to further improve edge FaaS capability; Conflict Analysis as a Service (CAaaS); crypto-services (e.g., TLS-aaS, DTLS-aaS); Edge-as-a-Service (EaaS) Orchestration as a Service (OaaS); and/or other like cloud services including various anything-as-a-service (X-aaS) offerings.

In some embodiments, the cloud 3044 may represent a network such as the Internet, a local area network (LAN) or a wide area network (WAN) including proprietary and/or enterprise networks for a company or organization, or combinations thereof. The cloud 3044 may be a network that comprises computers, network connections among the computers, and software routines to enable communication between the computers over network connections. In this regard, the cloud 3044 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 3044 may be via a wired or a wireless connection using the various communication protocols discussed infra. More than one network may be involved in a communication session between the illustrated devices. Connection to the cloud 3044 may require that the computers execute software routines which enable, for example, the seven layers of the OSI model of computer networking or equivalent in a wireless (cellular) phone network. Cloud 3044 may be used to enable relatively long-range communication such as, for example, between the one or more server(s) 3050 and one or more UEs 3021 and IoT devices 3011. In some embodiments, the cloud 3044 may represent the Internet, one or more cellular networks, local area networks, or wide area networks including proprietary and/or enterprise networks, TCP/Internet Protocol (IP)-based network, or combinations thereof. In such embodiments, the cloud 3044 may be associated with network operator who owns or controls equipment and other elements necessary to provide network-related services, such as one or more base stations or access points, one or more servers for routing digital data or telephone calls (e.g., a core network or backbone network), etc. The backbone links 3055 may include any number of wired or wireless technologies, and may be part of a LAN, a WAN, or the Internet. In one example, the backbone links 3055 are fiber backbone links that couple lower levels of service providers to the Internet, such as the CN 3012 and cloud 3044.

In embodiments, the edge compute nodes 3036 may include or be part of an edge system 3035 (or edge network 3035). The edge compute nodes 3036 may also be referred to as "edge hosts 3036" or "edge servers 3036." The edge system 3035 includes a collection of edge servers 3036 (e.g., MEC hosts/servers 3036-1 and 3036-2 of FIG. 31) and edge management systems (not shown by FIG. 30) necessary to run edge computing applications (e.g., MEC Apps 3136 of FIG. 31) within an operator network or a subset of an operator network. The edge servers 3036 are physical computer systems that may include an edge platform (e.g., MEC platform 3137 of FIG. 31) and/or virtualization infrastructure (e.g., VI 3138 of FIG. 31), and provide compute, storage, and network resources to edge computing applications. Each of the edge servers 3036 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 3020 and/or endpoints 3010. The VI of the edge servers 3036 provide virtualized environments and virtualized resources for the edge hosts, and the edge computing applications may run as VMs and/or application containers on top of the VI. One example implementation of the edge system 3035 is a MEC system 3035, which is discussed in more detail infra with respect to FIG. 31. It should be understood that the disclosed MEC systems and services deployment examples are only one illustrative example of edge computing systems/networks 3035, and that the example embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

As shown by FIG. 30, each of the NANs 3031, 3032, and 3033 are co-located with edge compute nodes (or "edge servers") 3036a, 3036b, and 3036c, respectively. These implementations may be small-cell clouds (SCCs) where an edge compute node 3036 is co-located with a small cell (e.g., pico-cell, femto-cell, etc.), or may be mobile micro clouds (MCCs) where an edge compute node 3036 is co-located with a macro-cell (e.g., an eNB, gNB, etc.). The edge compute node 3036 may be deployed in a multitude of arrangements other than as shown by FIG. 30. In a first example, multiple NANs 3031-3033 are co-located or otherwise communicatively coupled with one edge compute node 3036. In a second example, the edge servers 3036 may be co-located or operated by RNCs, which may be the case for legacy network deployments, such as 3G networks. In a third example, the edge servers 3036 may be deployed at cell aggregation sites or at multi-RAT aggregation points that can be located either within an enterprise or used in public coverage areas. In a fourth example, the edge servers 3036 may be deployed at the edge of CN 3042. These implementations may be used in follow-me clouds (FMC), where cloud services running at distributed data centers follow the UEs 3021 as they roam throughout the network.

In any of the aforementioned embodiments and/or implementations, the edge servers 3036 provide a distributed computing environment for application and service hosting, and also provide storage and processing resources so that data and/or content can be processed in close proximity to subscribers (e.g., users of UEs 3021, 3011) for faster response times The edge servers 3036 also support multi-tenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 3036 from the UEs 3011/3021, CN 3042, cloud 3044, and/or server(s) 3050, or vice versa. For example, a device application or client application operating in a UE 3021/3011 may offload application tasks or workloads to one or more edge servers 3036. In another example, an edge server 3036 may offload application tasks or workloads to one or more UE 3021/3011 (e.g., for distributed ML computation or the like).

In various embodiments, the automated resource management and workload orchestration functionality described throughout this disclosure may be used to manage resources and orchestrate workloads for services and applications in system 3000 of FIG. 30.

Figure 31:
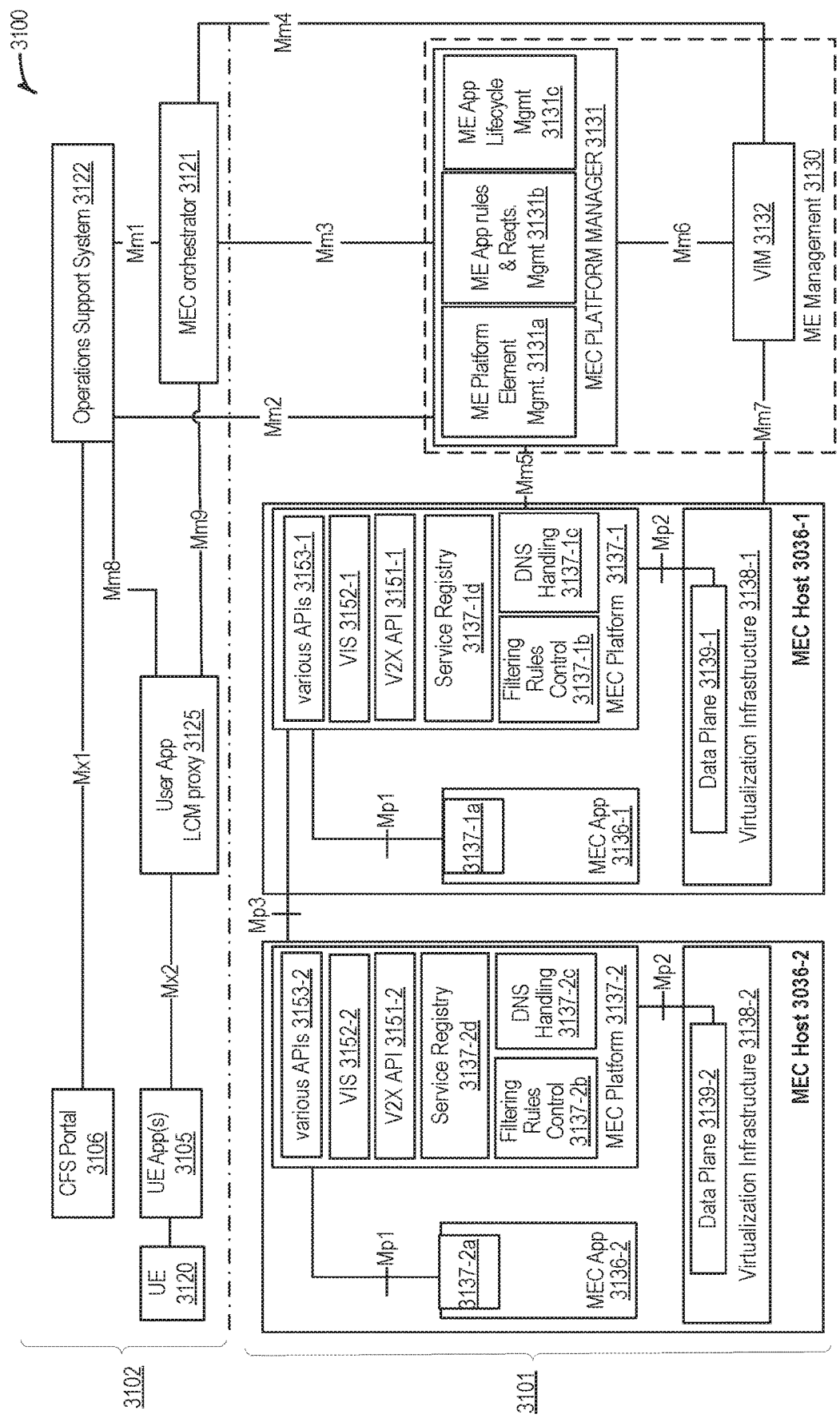
FIG. 31 depicts a block diagram for an example MEC system architecture according to various embodiments.

FIG. 31 depicts a block diagram for an example MEC system architecture 3100 according to various embodiments. The MEC system architecture 3100 may correspond to the edge computing system 3035 of FIG. 30. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP LTE-V2X based protocols) need to exchange data, provide data to aggregation points and access to data in databases which provide an overview of the local situation derived from a multitude of sensors (by various cars, roadside units, etc.).

The illustrated logical connections between various entities of the MEC architecture 3100 may be access-agnostic and not dependent on a particular deployment. MEC enables implementation of MEC applications (MEC Apps) 3136-1 and 3136-2 (collectively referred to as "MEC Apps 3136" or the like) as software-only entities that run on top of a Virtualization Infrastructure (VI) 3138-1 and 3138-2 (collectively referred to as "VI 3138" or the like), which is located in or close to the network edge. A MEC app 3136 is an application that can be instantiated on a MEC host 3036 within the MEC system 3100 and can potentially provide or consume MEC services 3137a. The term "user application" in the context of MEC refers to an MEA 3136 that is instantiated in the MEC system 3100 in response to a request from a user (e.g., UE 3021) via a device application. FIG. 31 shows the general entities involved, and these entities can be grouped into multi-access edge system level 3102, multi-access edge host level 3101, and network level entities (not shown). The multi-access edge host level 3101 includes a MEC host 3036-1 and MEC Host 3036-2 (which may be the same or similar to the MEC servers 3036 discussed previously, and re collectively referred to as "MEC host 3036" or the like) and Multi-access Edge (ME) management 3130, which provide functionality to run MEC Apps 3136 within an operator network or a subset of an operator network. The multi-access edge system level 3102 includes multi-access edge system level management 3102, UE 3120 (which may be the same or similar to the intermediate nodes 3020 and/or endpoints 3010 discussed herein), and third party entities. The network level (not shown) includes various external network level entities, such as a 3GPP network (e.g., CN 3042 of FIG. 30), a local area network (e.g., a LAN, WLAN, PAN, etc.), and an external network (e.g., CN 3042 and/or cloud 3044 of FIG. 30). The multi-access edge host level 3101 includes multi-access edge host level management and one or more MEC hosts 3036. The multi-access edge host level management may include various components that handle the management of the multi-access edge specific functionality of a particular MEC platform 3137, MEC host 3036, and the MEC Apps 3136 to be run. The MEC host 3036 includes the MEC platform 3137, MEC Apps 3136, and VI 3138.

The MEC system 3100 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 3100 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 3036 is an entity that contains an MEC platform 3137 and VI 3138 which provides compute, storage, and network resources for the purpose of running MEC Apps 3136. Each of the VIs 3138 includes a respective data plane (DP) 3139 (including DP 3139-1 and 3139-2) that executes respective traffic rules 3137-1b and 3137-2b (collectively referred to as "traffic rules 3137b") received by the MEC platform 3137, and routes the traffic among applications (e.g., MEC Apps 3136), MEC services 3137-1a and 3137-2a (collectively referred to as "MEC services 3137a"), DNS server/proxy (see e.g., via DNS handling entities 3137-1c and 3137-2c), 3GPP network, local networks, and external networks. The MEC DP 3138a may be connected with the (R)AN nodes 3031 and CN 3042 of FIG. 30, and/or may be connected with the AP 3033 of FIG. 30 via a wider network, such as the internet, an enterprise network, or the like. The other entities depicted and/or discussed herein may be the same or similar as those discussed with regard to FIG. 30.

The MEC platforms 3137-1 and 3137-2 (collectively referred to as "MEC platform 3137" or the like) within a MEC host 3036 may be a collection of essential functionality required to run MEC Apps 3136 on a particular VI 3138 and enable them to provide and consume MEC services 3137a, and that can provide itself a number of MEC services 937a. The MEC platform 3137 can also provide various services and/or functions, such as offering an environment where the MEC Apps 3136 can discover, advertise, consume and offer MEC services 3137a (discussed infra), including MEC services 3137a available via other platforms when supported. The MEC platform 3137 may be able to allow authorized MEC Apps 3136 to communicate with third party servers located in external networks. The MEC platform 3137 may receive traffic rules from the MEC platform manager 3131, applications, or services, and instruct the data plane accordingly (see e.g., Traffic Rules Control 3137b). The MEC platform 3137 may send instructions to the DP 3138 within the VI 3138 via the Mp2 reference point. The Mp2 reference point between the MEC platform 3137 and the DP 3138 of the VI 3138 may be used to instruct the DP 3138 on how to route traffic among applications, networks, services, etc. In some implementations, the MEC platform 3137 may translate tokens representing UEs in the traffic rules into specific IP addresses. The MEC platform 3137 also receives DNS records from the MEC platform manager 3131 and configures a DNS proxy/server accordingly. The MEC platform 3137 hosts MEC services 3137a including the multi-access edge services discussed infra, and provide access to persistent storage and time of day information. Furthermore, the MEC platform 3137 may communicate with other MEC platforms 3137 of other MEC servers 3036 via the Mp3 reference point.

The VI 3138 may represent the totality of all hardware and software components which build up the environment in which MEC Apps 3136 and/or MEC platform 3137 are deployed, managed and executed. The VI 3138 may span across several locations, and the network providing connectivity between these locations is regarded to be part of the VI 3138. The physical hardware resources of the VI 3138 includes computing, storage and network resources that provide processing, storage and connectivity to MEC Apps 3136 and/or MEC platform 3137 through a virtualization layer (e.g., a hypervisor, VM monitor (VMM), or the like). The virtualization layer may abstract and/or logically partition the physical hardware resources of the MEC server 3036 as a hardware abstraction layer. The virtualization layer may also enable the software that implements the MEC Apps 3136 and/or MEC platform 3137 to use the underlying VI 3138, and may provide virtualized resources to the MEC Apps 3136 and/or MEC platform 3137, so that the MEC Apps 3136 and/or MEC platform 3137 can be executed.

The MEC Apps 3136 are applications that can be instantiated on a MEC host/server 3036 within the MEC system 3100 and can potentially provide or consume MEC services 3137a. The term "MEC service" refers to a service provided via a MEC platform 3137 either by the MEC platform 937 itself or by a MEC App 3136. MEC Apps 3136 may run as VM on top of the VI 3138 provided by the MEC server 3036, and can interact with the MEC platform 3137 to consume and provide the MEC services 3137a. The MEC Apps 3136 are instantiated on the VI 3138 of the MEC server 3036 based on configuration or requests validated by the ME management 3130. In some embodiments, the MEC Apps 3136 can also interact with the MEC platform 3137 to perform certain support procedures related to the lifecycle of the MEC Apps 3136, such as indicating availability, preparing relocation of user state, etc. The MEC Apps 3136 may have a certain number of rules and requirements associated to them, such as required resources, maximum latency, required or useful services, etc. These requirements may be validated by the ME management 3130, and can be assigned to default values if missing. MEC services 3137-1a and 3137-2a (collectively referred to as "MEC services "437a" or the like) are services provided and/or consumed either by the MEC platform 3137 and/or MEC Apps 3136. The service consumers (e.g., MEC Apps 3136 and MEC platform 3137) may communicate with particular MEC services 3137a over individual APIs (including MEC V2X API 3151-1, 3151-2 and various APIs 3153-1, 3153-2 in FIG. 31). When provided by an application, a MEC service 3137a can be registered in a list of services in the service registries 3137-1d and 3137-2d (collectively referred to as "service registry 3137d" or the like) to a respective the MEC platform 3137 over the Mp1 reference point. Additionally, the MECApps 3136 can subscribe to one or more services 3137a for which it is authorized over the Mp1 reference point.

The MEC system 3100 may support a feature called UserApps. When the MEC system 3100 supports the feature UserApps, the ME management 3130 may support the instantiation of MEC Apps 3136 (or user applications) on multiple MEC hosts 3036 following a single instantiation request, and when required by the operator in response to a request by the user. The application instance may need to fulfil a number of potential constraints predefined for the application 3105. Once instantiated, connectivity may be established between the UE 3120 and the application instance. Potential constraints may include latency, location, compute resources, storage resources, network capability, security conditions, and the like. As part of the user application (or MEC app 3136) instantiation, the MEC system 3100 will create an associated application context that the MEC system 3100 maintains for the lifetime of the user application (or MEC app 3136). The application context is a set of reference data about an application instance that is used to identify it, enable lifecycle management operations and associate it with its device application. The term "user context" in the context of MEC refers to application-specific runtime data maintained by a MEC app 3136, which is associated with a user of that application. The application context contains information specific to the application instance such as its unique identifier within the MEC system 3100 and the address (e.g., URI or the like) provided for clients (e.g., UE 3120) that are external to the MEC system 3100 to interact with the user application.

When the MEC system 3100 supports the feature UserApps, the system 3100 may, in response to a request by a user, support the establishment of connectivity between the UE 3120 and an instance of a specific MEC App 3136 fulfilling the requirements of the MEC App 3136 regarding the UE 3120. If no instance of the MEC App 3136 fulfilling these requirements is currently running, the multi-access edge system management may create a new instance of the application 3105 on a MEC host 3036 that fulfils the requirements of the application 3105. Once instantiated, connectivity is established between the UE 3120 and the new MEC App 3136 instance. Requirements of the application can include latency, location, compute resources, storage resources, network capability, security conditions, and the like. When the MEC system 3100 supports the UserApps feature, the system 3100 may support the on-boarding of MEC Apps 3136 during the execution of an instantiation request, may allow the establishment of connectivity between the UE 3120 and a specific instance of an MEC App 3136, may support the capability to terminate the MEC App 3136 instance when no UE 3120 is connected to it anymore, and may support the termination of the MEC App 3136 running on multiple MEC servers 3036 following a single termination request.

As shown by FIG. 31, the Mp1 reference point is between the MEC platform 3137 and the MEC Apps 3136. The Mp1 reference point may provide service registration 3137d, service discovery, and communication support for various services, such as the MEC services 3137-1a provided by MEC host 3036-1 and MEC services 3137-2a provided by MEC Host 3036-2 (collectively referred to as "MEC services 3137a" or the like). In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MEC services 3137a include Radio Network Information Service (RNIS), location services, and bandwidth management services. The RNIS, when available, provides authorized MEC Apps 3136 with radio network related information, and expose appropriate up-to-date radio network information to the MEC Apps 3136. The radio network information (RNI) may include, inter alia, radio network conditions, measurement and statistics information related to the user plane, information related to UEs 3120 served by the radio node(s) associated with the MEC host 3036 (e.g., UE context and radio access bearers), changes on information related to UEs 3120 served by the radio node(s) associated with the MEC host 3036, and/or the like. The RNI may be provided at the relevant granularity (e.g., per UE 3120, per cell, per period of time).

The service consumers (e.g., MEC Apps 3136 and MEC platform 3137) may communicate with the RNIS over an RNI API 3153 to obtain contextual information from a corresponding RAN. RNI may be provided to the service consumers via an access node (e.g., (R)AN nodes 3031, 3032, or AP 3033 of FIG. 30). The RNI API 3153 may support both query and subscription (e.g., a pub/sub) based mechanisms that are used over a Representational State Transfer (RESTful) API 3153 or over a message broker of the MEC platform 3137 (not shown by FIG. 31). A MEC App 3136 may query information on a message broker via a transport information query procedure, wherein the transport information may be pre-provisioned to the MEC App 3136 via a suitable configuration mechanism. The various messages communicated via the RNI API 3153 may be in XML, JSON, Protobuf, or some other suitable format.

The RNI may be used by MEC Apps 3136 and MEC platform 3137 to optimize the existing services and to provide new types of services that are based on up to date information on radio conditions. As an example, a MEC App 3136 may use RNI to optimize current services such as video throughput guidance. In throughput guidance, a radio analytics MEC App 3136 may use MEC services to provide a backend video server with a near real-time indication on the throughput estimated to be available at the radio downlink interface in a next time instant. The throughput guidance radio analytics application 3136 computes throughput guidance based on the required radio network information it obtains from a multi-access edge service running on the MEC server 3036. RNI may be also used by the MEC platform 3137 to optimize the mobility procedures required to support service continuity, such as when a certain MEC App 3136 requests a single piece of information using a simple request-response model (e.g., using RESTful mechanisms) while other MEC Apps 3136 subscribe to multiple different notifications regarding information changes (e.g., using a pub/sub mechanism and/or message broker mechanisms).

The location services (LS), when available, may provide authorized MEC Apps 3136 with location-related information, and expose such information to the MEC Apps 3136. With location related information, the MEC platform 3137 or one or more MEC Apps 3136 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 3120 currently served by the radio node(s) associated with the MEC server 3036, information about the location of all UEs 3120 currently served by the radio node(s) associated with the MEC server 3036, information about the location of a certain category of UEs 3120 currently served by the radio node(s) associated with the MEC server 3036, a list of UEs 3120 in a particular location, information about the location of all radio nodes currently associated with the MEC server 3036, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 3036, or a subset thereof, according to a desired deployment. In this regard, the OMA Zonal Presence API 3153 provides means for MEC Apps 3136 to retrieve information about a zone, the access points associated to the zones and the users that are connected to the access points. In addition, the OMA Zonal Presence API 3153, allows authorized application to subscribe to a notification mechanism, reporting about user activities within a zone. In various embodiments, a MEC server 3036 may access location information or zonal presence information of individual UEs 3120 using the OMA Zonal Presence API 3153 to identify the relative location or positions of the UEs 3120.

The bandwidth management services (BWMS) provides for the allocation of bandwidth to certain traffic routed to and from MEC Apps 3136, and specify static/dynamic up/down bandwidth resources, including bandwidth size and bandwidth priority. MEC Apps 3136 may use the BWMS to update/receive bandwidth information to/from the MEC platform 3137. In some embodiments, different MEC Apps 3136 running in parallel on the same MEC server 3036 may be allocated specific static, dynamic up/down bandwidth resources, including bandwidth size and bandwidth priority. The BWMS includes a bandwidth management (BWM) API 3153 to allowed registered applications to statically and/or dynamically register for specific bandwidth allocations per session/application. The BWM API 3153 includes HTTP protocol bindings for BWM functionality using RESTful services or some other suitable API mechanism.

Referring back to FIG. 31, multi-access edge management comprises multi-access edge system level management and the multi-access edge host level management 3130. The ME management 3130 comprises the MEC platform manager 3131 and the VI manager (VIM) 3132, and handles the management of MEC-specific functionality of a particular MEC server 3036 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure.

The MEC platform manager 3131 is responsible for managing the life cycle of applications including informing the multi-access edge orchestrator (MEC-O) 3121 of relevant application related events. The MEC platform manager 3131 may also provide MEP element management functions 3131a to the MEC platform 3137, manage MEC App rules and requirements 3131b including service authorizations, traffic rules, DNS configuration and resolving conflicts, and manage MEC App 3136 lifecycles (MEALC mgmt 3131c). The MEC platform manager 3131 may also receive virtualized resources fault reports and performance measurements from the VIM 3132 for further processing. The Mm5 reference point between the MEC platform manager 3131 and the MEC platform 3137 is used to perform platform configuration, configuration of the MEPE mgmt 3131a, the MERR mgmt 3131b, the MEALC mgmt 3131c, management of application relocation, etc.

The VIM 3132 may be an entity that allocates, manages and releases virtualized (compute, storage and networking) resources of the VI 3138, and prepares the VI 3138 to run a software image. To do so, the VIM 3132 may communicate with the VI 3138 over the Mm7 reference point between the VIM 3132 and the VI 3138. Preparing the VI 3138 may include configuring the VI 3138, and receiving/storing the software image. When supported, the VIM 3132 may provide rapid provisioning of applications, such as described in "Openstack++ for Cloudlet Deployments", available at http://reports-archive.adm.cs.cmu.edu/anon/2015/CMU- CS-15-123.pdf. The VIM 3132 may also collect and report performance and fault information about the virtualized resources, and perform application relocation when supported. For application relocation from/to external cloud environments, the VIM 3132 may interact with an external cloud manager to perform the application relocation, for example using the mechanism described in "Adaptive VM Handoff Across Cloudlets", and/or possibly through a proxy. Furthermore, the VIM 3132 may communicate with the MEC platform manager 3131 via the Mm6 reference point, which may be used to manage virtualized resources, for example, to realize the application lifecycle management. Moreover, the VIM 3132 may communicate with the MEC-O 3121 via the Mm4 reference point, which may be used to manage virtualized resources of the MEC server 3036, and to manage application images. Managing the virtualized resources may include tracking available resource capacity, etc.

The multi-access edge system level management includes the MEC-O 3121 as a core component, which has an overview of the complete MEC system 3100. The MEC-O 3121 may maintain an overall view of the MEC system 3100 based on deployed multi-access edge hosts 901, available resources, available MEC services 3137*a*, and topology. The Mm3 reference point between the MEC-O 3121 and the MEC platform manager 3131 may be used for the management of the application lifecycle, application rules and requirements and keeping track of available MEC services 3137*a*. The MEC-O 3121 may communicate with the user application lifecycle management proxy (UALMP) 3125 via the Mm9 reference point in order to manage MEC Apps 3136 requested by UE application 3105.

The MEC-O 3121 may also be responsible for on-boarding of application packages, including checking the integrity and authenticity of the packages, validating application rules and requirements and if necessary adjusting them to comply with operator policies, keeping a record of on-boarded packages, and preparing the VIM(s) 3102 to handle the applications. The MEC-O 3121 may select appropriate MEC host(s) 901 for application instantiation based on constraints, such as latency, available resources, and available services. The MEC-O 3121 may also trigger application instantiation and termination, as well as trigger application relocation as needed and when supported.

The Operations Support System (OSS) 3122 refers to the OSS of an operator that receives requests via the Customer Facing Service (CFS) portal 3106 (and over the Mx1 reference point) and from UE applications 3105 for instantiation or termination of MEC Apps 3136, and decides on the granting of these requests. The CFS portal 3106 (and the Mx1 interface) may be used by third-parties to request the MEC system 3100 to run applications 3106 in the MEC system 3100. Granted requests may be forwarded to the MEC-O 3121 for further processing. When supported, the OSS 3122 also receives requests from UE applications 3105 for relocating applications between external clouds and the MEC system 3100. The Mm2 reference point between the OSS 3122 and the MEC platform manager 3131 is used for the MEC platform manager 3131 configuration, fault and performance management. The Mm1 reference point between the MEC-O 3121 and the OSS 3122 is used for triggering the instantiation and the termination of multi-access edge applications 3136 in the MEC system 3100.

The UE app(s) 3105 (also referred to as "device applications" or the like) is one or more applications running in a device, computing system, etc. (e.g., UE 3120), that has the capability to interact with the MEC system 900 via the user application lifecycle management proxy 3125. The UE app(s) 3105 may be, include, or interact with one or more client applications, which in the context of MEC, is application software running on a device, computing system, etc. that utilizes functionality provided by one or more specific MEC application(s) 3136. The user application lifecycle management proxy ("user app LCM proxy") 3125 may authorize requests from UE applications 3105 in the UE and interacts with the OSS 3122 and the MEC-O 3121 for further processing of these requests. The term "lifecycle management," in the context of MEC, refers to a set of functions required to manage the instantiation, maintenance and termination of a MEC application 3136 instance. The user app LCM proxy 3125 may interact with the OSS 3122 via the Mm8 reference point, and is used to handle UE applications 3105 requests for running applications in the MEC system 3100. A user application 3105 may be an MEC App 3136 that is instantiated in the MEC system 3100 in response to a request of a user via an application running in the UE 3120 (e.g., UE application 3105). The user app LCM proxy 3125 allows UE applications 3105 to request on-boarding, instantiation, termination of user applications and when supported, relocation of user applications in and out of the MEC system 3100. It also allows informing the UE applications 3105 about the state of the user applications 3105. The user app LCM proxy 3125 is only accessible from within the mobile network, and may only be available when supported by the MEC system 3100. A UE application 3105 may use the Mx2 reference point between the user app LCM proxy 3125 and the UE application 3105 to request the MEC system 3100 to run an application in the MEC system 3100, or to move an application in or out of the MEC system 3100. The Mx2 reference point may only be accessible within the mobile network and may only be available when supported by the multi-access edge system.

In order to run an MEC App 3136 in the MEC system 3100, the MEC-O 3121 receives requests triggered by the OSS 3122, a third-party, or a UE application 3105. In response to receipt of such requests, the MEC-O 3121 selects a MEC server 3036 to host the MEC App 3136 for computational offloading. These requests may include information about the application to be run, and possibly other information, such as the location where the application needs to be active, other application rules and requirements, as well as the location of the application image if it is not yet on-boarded in the MEC system 3100.

In various embodiments, the MEC-O 3121 selects one or more MEC servers 3036 for computational intensive tasks. The selected one or more MEC servers 3036 may offload computational tasks of a UE application 3105 based on various operational parameters, such as network capabilities and conditions, computational capabilities and conditions, application requirements, and/or other like operational parameters. The application requirements may be rules and requirements associated to/with one or more MEC Apps 3136, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 3136 to be able to run; multi-access edge services that the MEC Apps 3136 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's MEC system deployment or mobile network deployment (e.g., topology, cost); requirements on access to user traffic; requirements on persistent storage; traffic rules 3137*b*; DNS rules 3137*c*; etc.

The MEC-O 3121 considers the requirements and information listed above and information on the resources currently available in the MEC system 3100 to select one or several MEC servers 3036 within the MEC system 901 to host MEC Apps 3136 and/or for computational offloading. After one or more MEC servers 3036 are selected, the MEC-O 3121 requests the selected MEC host(s) 3036 to instantiate the application(s) or application tasks. The actual algorithm used to select the MEC servers 3036 depends on the implementation, configuration, and/or operator deployment. In various embodiments, the selection algorithm may be based on the task offloading embodiments discussed herein, for example, by taking into account network, computational, and energy consumption requirements for performing tasks of application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 3121 may decide to select one or more new MEC servers 3036 to act as a master node, and initiates the transfer of an application instance or application-related state information from the one or more source MEC servers 3036 to the one or more target MEC servers 3036.

In addition, the MEC system architecture 3100 also provides support for applications. In the context of FIG. 31, the UE app 3105 is an application instance running on a vehicle or vUE 3120, and requesting V2X service to the system. MEC hosts 3036 are co-located with edge infrastructure (e.g., nodes 3031-133 of FIG. 30) and communicate with each other through the Mp3 interface. The example of FIG. 31 also uses V2X Information Services (VIS) 3152-1 and 3152-1 (collectively referred to as "MEC VIS 3152"). FIG. 31 is an example of application instances in a V2X service with MEC V2X API 3151*a* and 3151*b* (collectively referred to as "MEC V2X API 3151"). In the framework of V2X services, a vehicle UE 3120 is hosting a client application, and is connected to a certain MEC host 3036 (and a related MEC App 3136). In presence of multiple MEC host/server 3036, the VIS 3152 permits to expose information between MEC Apps 3136 running on different MEC hosts 3036. In addition, other remote application server instances can be located somewhere else (e.g., private clouds owned by the operator or by the OEM such as cloud 3044). The VIS 3152 may be produced by the MEC platform 3137 or by the MEC Apps 3136.

In particular, the VIS 3152 permits information exposure, pertinent to the support of automotive use cases, to MEC application instances. VIS 3152 also permits a single V2X/ITS operator to offer a V2X service(s) over a region that may span different countries and involve multiple network operators, MEC systems 3100 and MEC apps 3136 providers. For that purpose, the MEC VIS 3152 includes the following functionalities.

In some aspects, the MEC platform 3137 can include a MEC V2X API 3151 and provide MEC VIS 3152, which can include the following functionalities: (a) gathering of PC5 V2X relevant information from the 3GPP network for purposes of performing UE authorization for V2X communications (e.g., obtaining a list of V2X authorized UEs 3120, obtaining relevant information about the authorization based on the UE subscription, and obtaining V2X configuration parameters such as a common set of V2X configuration parameters which can include PC5 configuration parameters); (b) exposure of the information obtained in (a) to MEC apps 3136 in the same host or MEC apps in other MEC hosts; (c) enablement of MEC apps 3136 to communicate securely with the V2X-related 3GPP core network logical functions (e.g., enabling communication between the MEC host and a V2X control function in the core network); (d) enablement of MEC apps 3136 in different MEC systems 3100 to communicate securely with each other; and (e) gathering and processing information available in other MEC APIs 3153 (e.g., gathering and processing information obtained from a RNI API, Location API, WLAN API, and other APIs that may be implemented within the MEC platform 3137) in order to predict radio network congestion, and provide suitable notifications to the UE 3120.

From that perspective, the VIS 3152 is relevant to Mp1 and Mp3 reference points in the MEC architecture 3100. In particular, the relevant information is exposed to MEC apps 3136 via the Mp1 reference point, and the Mp3 reference point may enable the possibility to transfer this information between different MEC platforms 3137. The MEC V2X API 3151 provides information to MEC apps 3136 in a standardized way, which provides interoperability in multi-vendor scenarios. Nevertheless, MEC apps 3136 may communicate in a direct way (e.g., without the use of MEC platform 3137). Inter-system communication may be realized between MEC Orchestrators 3121. As an alternative, or, in addition to that, possible Mp3 enhancements (or new reference points between MEC systems 3100) may be defined.

In some aspects, the MEC Host 3036-2 in FIG. 31 can also implement a MEC V2X API 3151-2, which can provide an interface to one or more of the apps instantiated within MEC Host 3036-2, such as MEC App 3136-2*b*. In this regard, MEC host 3036-1 and MEC Host 3036-2 can communicate with each other via the Mp3 interface as well as the MEC V2X APIs 3151-1, 3151-2. Additionally, one or more of the MEC apps 3136-1 instantiated within MEC host 3036-1 can communicate with one or more of the MEC apps 3136-2 instantiated within MEC Host 3036-2 via the MEC V2X APIs 3151-1, 3151-2 as well as the Mp3 interface between the MEC host 3036-1 and MEC Host 3036-2.

In some aspects, each of the MEC hosts 3036 can be owned/managed by a different mobile services operator (while it can be operated directly by a MEC vendor or a third party). In some aspects, MEC apps 3136 instantiated on MEC host 3036-1 and MEC Host 3036-2 can be used to provide V2X-related services, and can be operated by the mobile services operator, by a MEC vendor, or by a third party (e.g., OEM, or OEM supplier, or system integrator).

In some aspects, the MEC V2X APIs 3151 can be provided as a general middleware service, providing information gathered from vehicles and other V2X elements, and exposed as a service within the hosts (e.g., as a RESTful API) for the higher layers (e.g., the MEC apps instantiated within the hosts). In some aspects, the MEC V2X APIs 3151 can be configured to gather information and data from sensors. In this regard, the deployment of the MEC V2X APIs 3151 is ensuring continuity of the service across different mobile networks, for the same OEM (e.g., automobile manufacturer). If a standard implementation of a V2X API 3151 is introduced (e.g., by ETSI MEC), this functionality can ensure the same basic V2X service characteristics for all OEMs in a 5G communication system with MEC functionalities.

In some aspects, MEC app 3136a and MEC app 3136b can use the corresponding MEC V2X APIs 3151 to retrieve information from the 3GPP network. In some aspects, MEC apps 3136 can be configured to host V2X configuration parameters such as PC5 configuration parameters (or a common set of V2X configuration parameters that can be available within a multi—PLMN communication environment). The availability of these V2X configuration parameters also in absence of network coverage is ensured by the usage of an Mp3 interface (or another type of interface) between the hosts. In some aspects, MEC app 3136-1 can be configured to connect to MEC Host 3036-2 (through V2X MEC API 3151-2 in MEC Host 3036-2), and MEC app 3136-2 can be configured to connect to MEC host 3036-1 (through V2X MEC API 3151-1 in MEC host 3036-1). In case of a multi-operator architecture, multiple MEC hosts can be configured to communicate with each other via the MEC V2X APIs 3151 and synchronize in order to transfer the relevant V2X configuration parameters, so that they can be available across the multi-operator architecture in absence of cellular coverage (e.g., outside of the 3GPP domain). In this way, a UE 3120 can have access to V2X configuration parameters even when the UE is not under coverage of its 3GPP network.

In some aspects, one or more ME apps within a MEC host 3036 can be instantiated to perform functionalities of a V2X application function, which may include providing VIS 3152. Additionally, MEC hosts can use MEC V2X APIs 3151 to perform various V2X or VIS 3152 functions. In particular, one or more ME apps can be instantiated within a MEC host to perform functionalities associated with a V2X application function. In some aspects, these ME apps can be configured to perform the following V2X application functions: obtaining V2X subscription information for a vUE 3120, determining whether the vUE 3120 is authorized to perform V2X communications in response to a request for V2X services, communicating V2X configuration parameters such as a common set of V2X configuration parameters, and so forth.

In various embodiments, the automated resource management and workload orchestration functionality described throughout this disclosure may be used to manage resources and orchestrate workloads for services and applications in system 3100 of FIG. 31.

Figure 32:
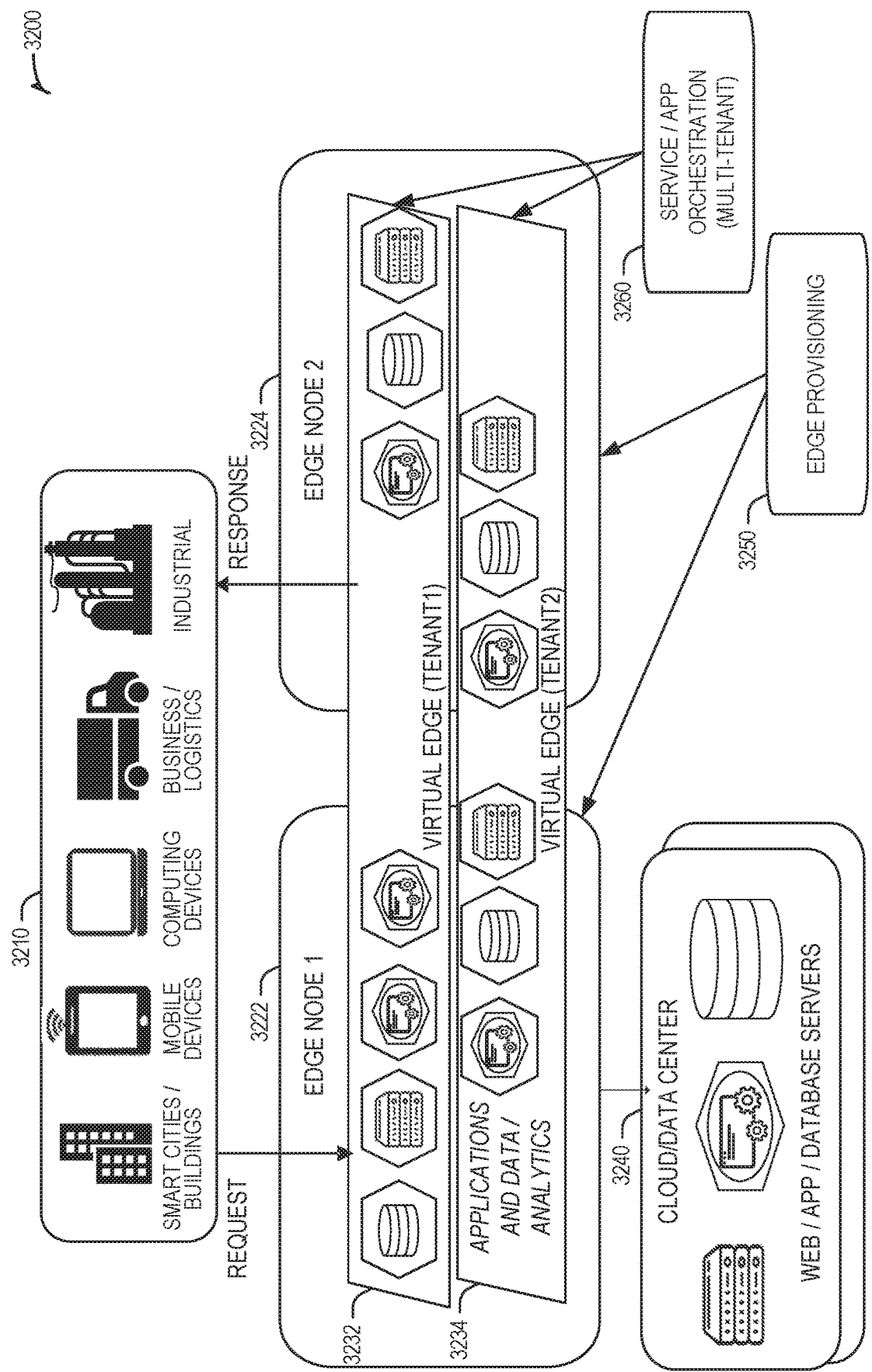
FIGS. 32 and 33 illustrate deployment and orchestration for virtual edge configurations across an edge computing system operated among multiple edge nodes and multiple tenants.
Figure 33:
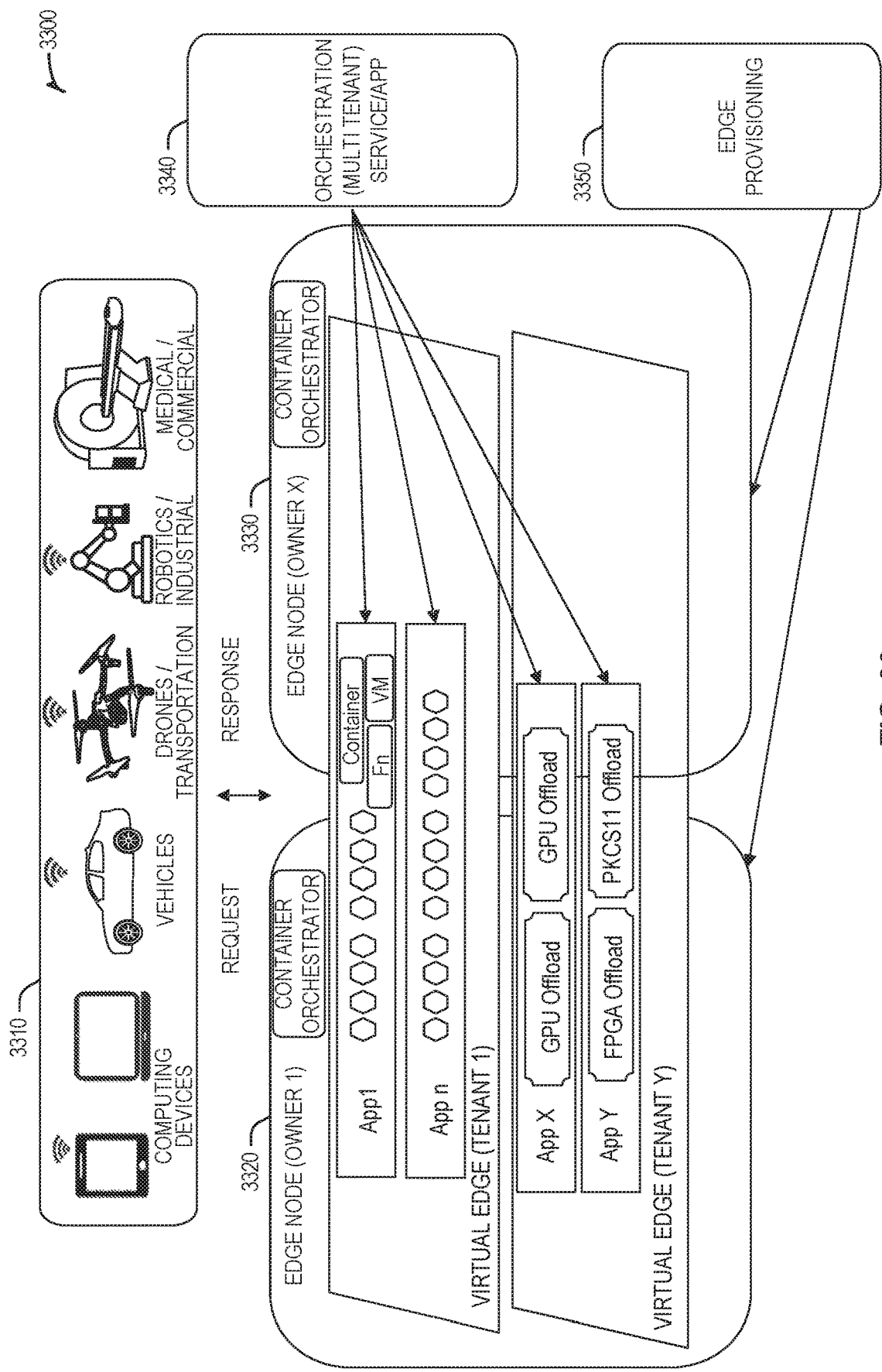

The deployment of an edge computing system may be arranged and orchestrated to enable the deployment of multiple services and virtual edge instances, among multiple edge nodes and subsystems, for use by multiple tenants and service providers. In a system example applicable to a cloud service provider (CSP), the deployment of an edge computing system may be provided via an "over-the-top" approach, to introduce edge computing nodes as a supplemental tool to cloud computing. In a contrasting system example applicable to a telecommunications service provider (TSP), the deployment of an edge computing system may be provided via a "network-aggregation" approach, to introduce edge computing nodes at locations in which network accesses (from different types of data access networks) are aggregated. As an extension of either CSP or TSP configurations, FIGS. 32 and 33 illustrate deployment and orchestration for virtual edge configurations across an edge computing system operated among multiple edge nodes and multiple tenants. Specifically, FIG. 32 depicts coordination of a first edge node 3222 and a second edge node 3224 in an edge computing system 3200, to fulfill requests and responses for various client endpoints 3210 (e.g., smart cities/building systems, mobile devices, computing devices, business/logistics systems, industrial systems, etc.) which access various virtual edge instances. The virtual edge instances provide edge compute capabilities and processing in an edge cloud, with access to a cloud/data center 3240 for higher-latency requests for websites, applications, database servers, etc. However, the edge cloud enables coordination of processing among multiple edge nodes for multiple tenants or entities.

In the example of FIG. 32, these virtual edge instances include: a first virtual edge 3232, offered to a first tenant (Tenant 1), which offers a first combination of edge storage, computing, and services; and a second virtual edge 3234, offering a second combination of edge storage, computing, and services. The virtual edge instances 3232, 3234 are distributed among the edge nodes 3222, 3224, and may include scenarios in which a request and response are fulfilled from the same or different edge nodes. The configuration of the edge nodes 3222, 3224 to operate in a distributed yet coordinated fashion occurs based on edge provisioning functions 3250. The functionality of the edge nodes 3222, 3224 to provide coordinated operation for applications and services, among multiple tenants, occurs based on orchestration functions 3260.

It should be understood that some of the devices in 3210 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes may operate as LSM or security feature enforcement points for local resources allocated to multiple tenants per node. Additionally, tenant runtime and application execution may serve as an enforcement point for an LSM or other security feature that creates a virtual edge abstraction of resources spanning potentially multiple physical hosting platforms. Finally, the orchestration entity may operate as an LSM or security feature enforcement point for marshalling resources along tenant boundaries.

Edge computing nodes may partition resources (memory, CPU, GPU, interrupt controller, I/O controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 3210, 3222, and 3240 may coordinate the establishment of a distributed trusted computing base (DTCB) such that a tenant-specific virtual trusted secure channel linking all elements end to end can be established.

In the example of FIG. 33, an edge computing system 3300 is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 32. An orchestrator may use a DICE layering and fan-out construction to create a root of trust context that is tenant specific. Thus, orchestration functions 3340, provided by an orchestrator discussed below, may participate as a tenant-specific orchestration provider.

Similar to the scenario of FIG. 32, the edge computing system 3300 is configured to fulfill requests and responses for various client endpoints 3310 from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

Within the edge cloud, a first edge node 3320 (operated by a first owner) and a second edge node 3330 (operated by a second owner) respectively operate an orchestrator to coordinate the execution of various applications within the virtual edge instances offered for respective tenants. The edge nodes 3320, 3330 are coordinated based on edge provisioning functions 3350, while the operation of the various applications are coordinated with orchestration functions 3340. Furthermore, the orchestrator may identify specific hardware features that are offered to one owner but hidden from a second owner, however offered across the ownership boundaries in order to ensure that services complete according to their SLA(s). Accordingly, the virtual edge, container orchestrator, and service/app orchestrator may provide an LSM or other security enforcement point, for node-specific resources tied to specific tenants.

Figure 34:
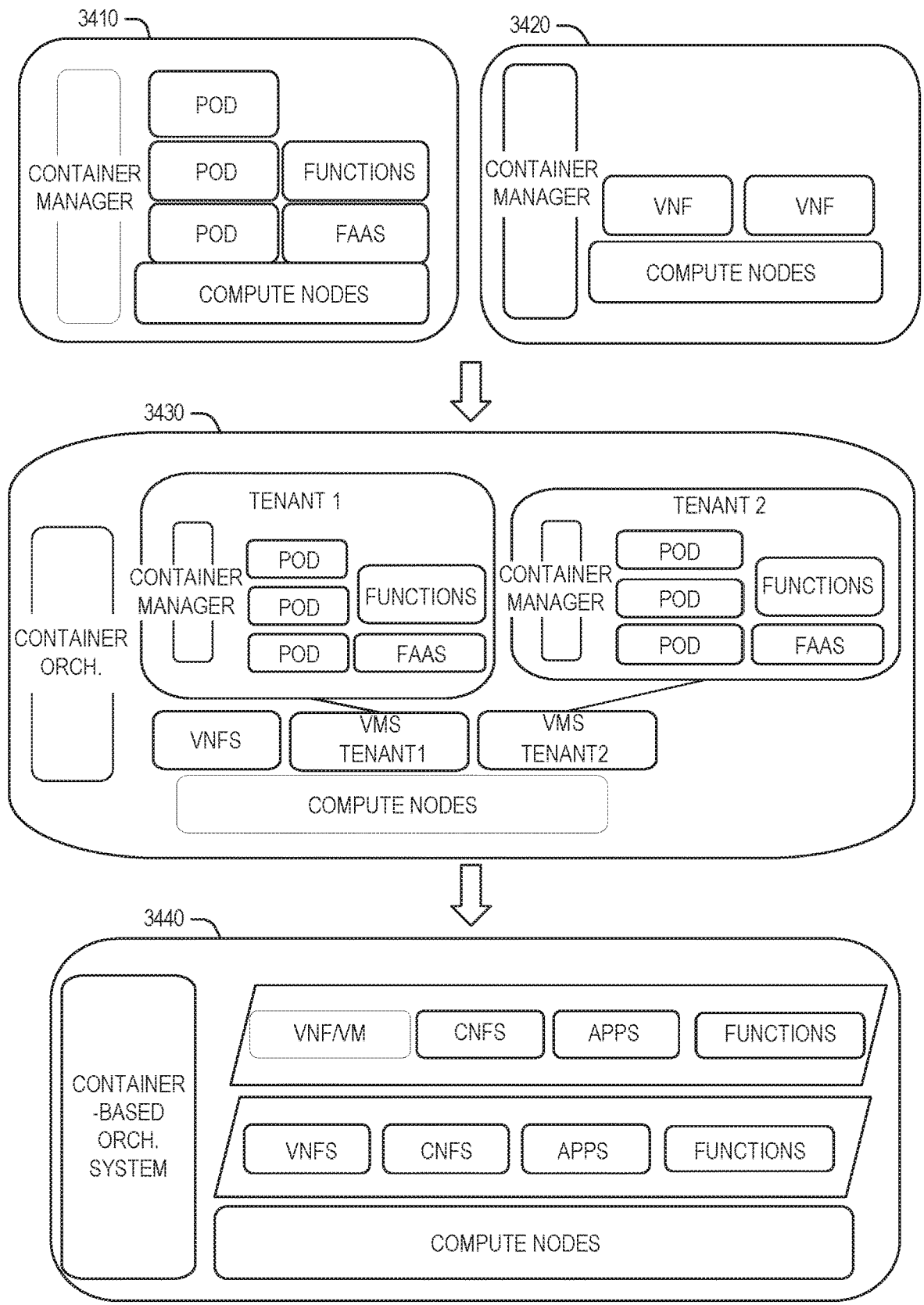
FIG. 34 illustrates various compute arrangements deploying containers in an edge computing system.

FIG. 34 illustrates various compute arrangements deploying containers in an edge computing system. As a simplified example, system arrangements 3410, 3420 depict settings in which a container manager is adapted to launch containerized pods, functions, and functions-as-a-service instances through execution via compute nodes (in arrangement 3410), or to separately execute containerized virtualized network functions through execution via compute nodes (in arrangement 3420). This arrangement is adapted for use by multiple tenants in system arrangement 3430, where containerized pods, functions, and functions-as-a-service instances are launched within virtual machines specific to respective tenants (aside the execution of virtualized network functions). This arrangement is further adapted for use in system arrangement 3440.

The system arrangements of depicted in FIGS. 33 and 34 provide an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 34, the container manager, container orchestrator, and individual nodes may provide an LSM or other security enforcement point. However in either of the configurations of FIGS. 33 and 34, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by Edge owners to enforce tenancy. Other isolation environments may include: bare metal (dedicated) equipment, virtual machines, containers, virtual machines on containers, or combinations thereof. Functions, such as those provided in a FaaS environment, discussed further below, may run in any of these isolation environments to enforce tenant boundaries.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

In further configurations, aspects of orchestration may be implemented in the edge computing system through service aspects of a "Orchestration as a Service (OaaS)" deployment, enabling stakeholder decentralization among many aspects of edge orchestration and multi-tenancy. In an example, an edge computing system tenant discovers OaaS providers as part of an SLA creation process (enabled as part of a bootstrap capability, a configuration wizard, a storefront, etc.). The technical capabilities needed to support the discovery and use of may be baked into respective devices by a manufacturer, and an "onboarding"-type procedure may occur with each OaaS that the tenant selects and utilizes within the edge computing system. Furthermore, during an SLA creation process, the OaaS provider may separate what resources, requirements or features are requested versus available from the pool and create a separate service request for the enablement/activation or subscription to certain features/functions in order to utilize the resource.

Various types of hardware improvements and configurations may be implemented within edge computing devices to support OaaS. For example, hardware capabilities may pre-provision OaaS trust anchors, or provide information to enable a hardware manufacturer to act as a trusted clearing house for brokering OaaS introductions. Other types of software and service improvements and configurations suggested herein may also be implemented within the edge computing system to support features of OaaS.

Figure 35:
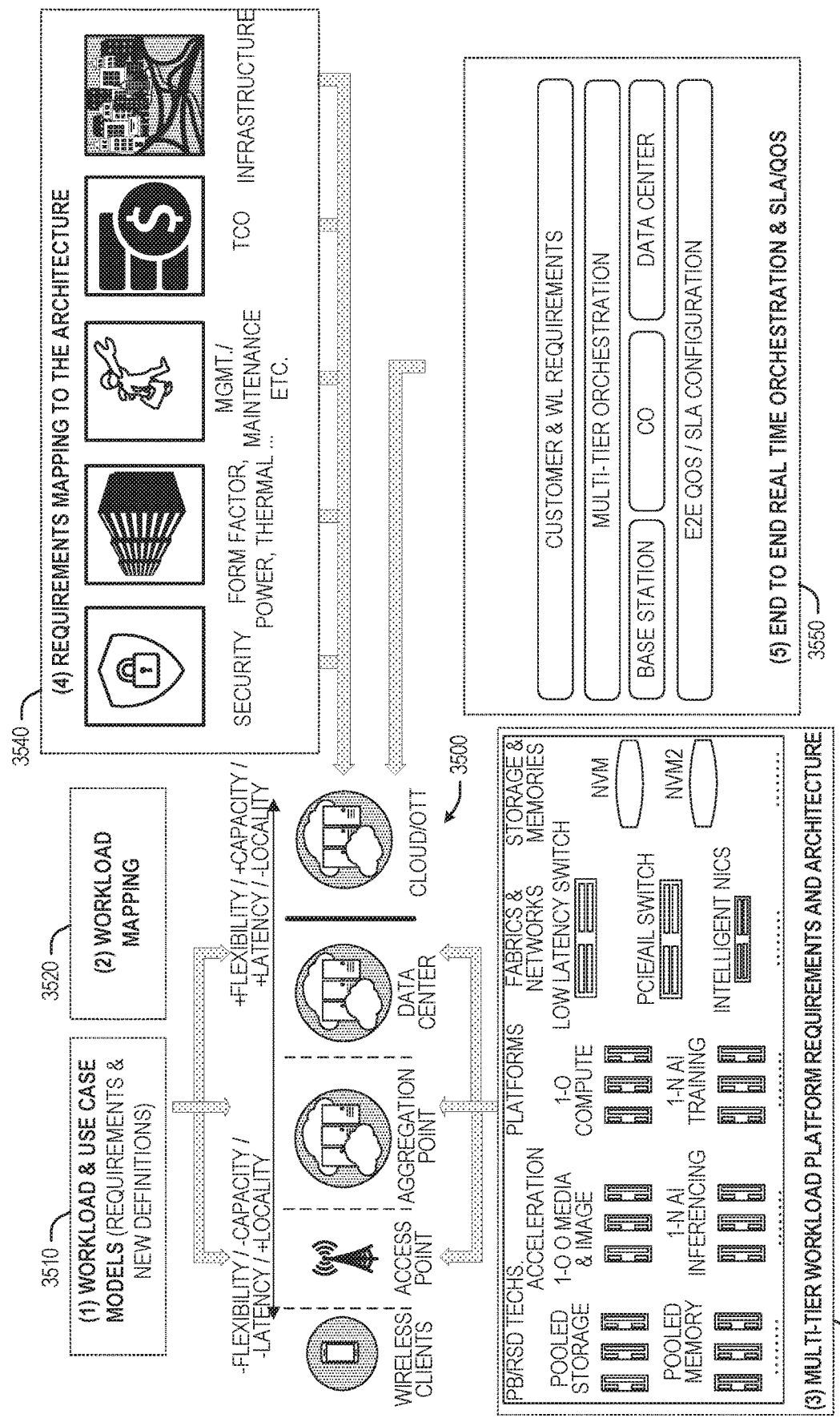
FIG. 35 illustrates workload deployments and mapping to operational layers of an edge computing system.

FIG. 35 illustrates workload deployments and mapping to operational layers of an edge computing system 3500. Within this arrangement, multiple considerations and capabilities are evaluated for the location and type of workload execution among devices of the edge computing system 3500, as various coordination is performed to bring the compute resources to the workload data, and bring the workload data to the compute resources. These considerations may include:

(1) Choosing the right platform architecture, rack design, or other hardware features or configurations, for short-term and long term usage (in addition to conducting an appropriate mapping of the services and workloads) depending on the restrictions of each of the locations (e.g., power, space, and platform security). Different options may be mapped to different architecture configurations.

(2) Determining what requirements originate from network or service operators will shape the architecture. This may indicate a platform architecture that satisfies operator requirements (e.g., capital expense vs. operating expense, form factors, security, and QoS).

(3) Determining the correct software architecture to manage, monitor and orchestrate the edge computing architecture. Without the right interfaces to orchestrate, complex distributed scenarios cloud architectures will not work. Furthermore, exposing appropriate abstractions and interfaces to the services to access to the hardware resources underneath is at the same level of criticality.

Based on these and other determinations, various workloads and use case models 3510 may be first mapped among locations of the edge computing system 3500 according to workload mapping definitions 3520. Such workload mapping definitions 3520 may identify platform requirements and architecture elements 3530 that can be deployed among the edge computing system 3500. Further, the workload mapping definitions 3520 may be based on requirements mapping 3540 addressing aspects such as security, physical constraints, management, cost, infrastructure restrictions and capabilities, and the like.

Further, the end-to-end considerations of the edge computing system 3500 may include evaluation of real time orchestration, service-level agreement (SLA), and QoS characteristics, as provided in definitions 3550. These definitions 3550 may be used to select the platform requirements and architecture elements 3530, rank or prioritize requirements mapping 3540, and ultimately change the workload mapping 3520. These considerations, recorded in the definitions 3550 or elsewhere, may reflect the following features:

1) Latency, used to provide a first key performance indicator (KPI) with a significant role in edge service location. Since the speed of light is approximately 300,000 km/s and transmission on the wire is ~⅔ of that a required response latency will determine how far from a device may be from the edge. For example, if some services require response latency of less than 4 ms they cannot be further than ~150 kms from the device. Thus, for some of the workloads (e.g., IoT device data processing) the unique edge definition may be only consumed by a base station, whereas others may be consumed by a central office.

2) Data Privacy, sovereignty and sensitivity, used to determine compliance and verify operability. These considerations may dictate that some of the services can only reside on certain locations of the edge. For example, in the healthcare segment, some hospitals may want to host and share some services on the edge cloud but without having the data crossing certain boundaries of the infrastructure (e.g., equipment on premise, central office etc.).

3) Reduction in backhaul traffic. Backhaul traffic data savings may be achieved by filtering traffic at the different edges of the network in order to reduce OPEX/TCO (as well as CAPEX as smaller bandwidth may be required on the backhaul network). In this case, filtering may happen at any of the different potential edges of the infrastructure. For example, video surveillance can be processed in the base station to identify what images are to be sent to the cloud or to the central office while the content delivery network may be placed in to the central office.

4) Enabling of new edge processing use cases: For example, a service on the edge that allows biometry authentication. Or, a service which enables payment to be done real-time via voice analysis as long as the reliability requirements are met.

5) Definition and use of resource level trust, which allows for the authorization for access to capabilities across platforms and resources.

Defining where the actual edge resides for a particular use case or workload is directly related to the KPI or value proposition that a particular location provides to it. For example, defining edge compute for execution of an IoT or AR/VR workload in the core of an operator infrastructure might be impossible to satisfy KPI requirements in terms of latency. Thus, the edge compute for this workload is located closer to the device (in the base station or a more local central office). On the other hand, edge compute for a content distribution network (CDN) (also known as a "content delivery network" or a "content defined network") workload may be located at a base station, central office or any other intermediate point of aggregation (POA or POP) of the operator infrastructure. In this case, to define what is the most suitable edge location, the associated OPEX/TCO may derive what is the best location for placing the CDN workload.

Figure 36:
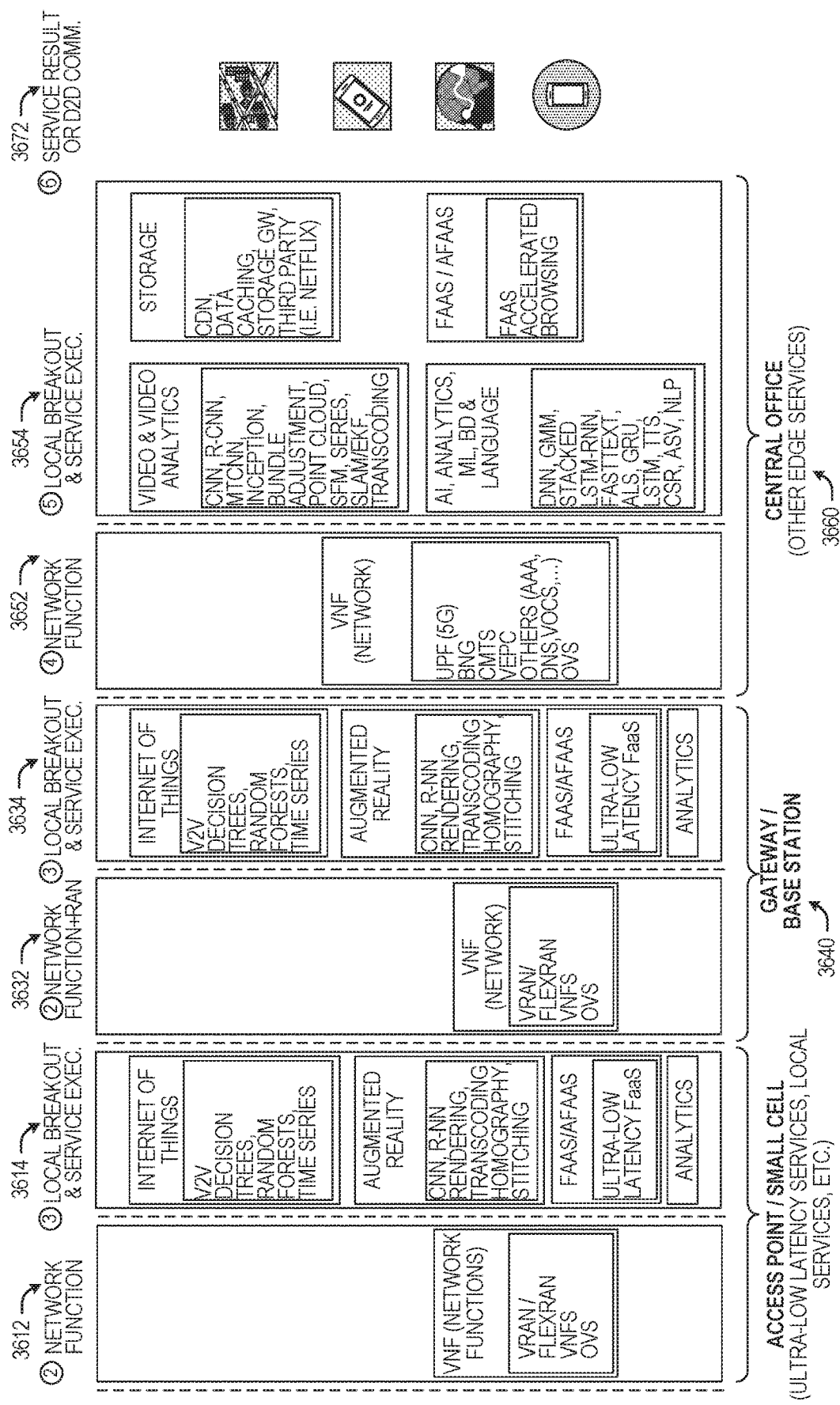
FIG. 36 illustrates workload type mapping to service features of an edge computing system.

In further examples, advanced forms of workload mapping may be used in an edge computing system to map specific forms of compute activities to specific locations and systems (or types of systems and location capabilities, to more efficiently bring the workload data to available compute resources). FIG. 36 illustrates workload type mapping to service features of an edge computing system, having a access point or small cell 3620, gateway or base station 3640, and central office 3660, each with respective capabilities.

With the use of compute at a small cell 3620, a combination of network functions 3612 and services 3614 may be offered, with an emphasis of execution of local or ultra-low latency services (e.g., augmented reality, IoT, FaaS). With the use of compute at a base station 3640, a similar combination of network functions 3632 and services 3634 may be offered; the amount of available hardware processing resources at the base station 3640 increases even as the amount and complexity of the of network functions increase. With the use of compute at a central office 3660 (or other aggregation location), deeper layer network functions 3652 may be offered, complimentary to services 3654 (e.g., video analytics, storage, analytics, FaaS) requiring additional compute resources not available at the access point/small cell 3620 or gateway/base station 3640.

Some of the considerations of the location and type of hardware which is distributed throughout the edge locations 3620, 3640, 3660 and like subsystems may include:

(1) Where the workloads and use cases are mapped. This decision can be performed using different criteria or value propositions discussed herein. Once the mapping is done, the different use cases or workloads need to be broken in foundational blocks or basic blocks. A basic block can be defined by an algorithmic logic unit (for example a Deep Neural Network or a Fast Fourier Transform). Once the mapping and division of basic blocks is done at different tiers of the edge, the specific blocks for improvement may be identified at a given location. Hence, their resource requirements can be used to estimate how much resources are needed in that particular location.

(2) The characteristics of each location. As discussed earlier the location (e.g., base station) respectively has a list of physical requirements (e.g.: form factor, power, temperature etc.) as well as a number of expected subscribers (e.g.: in a base station the range can be from 1 to 4 K of subscribers). Physical requirements translate to how much resources can be placed at a given location and the subscribers translate on how much compute is need for a particular workload mapping and mount of subscribers. Accordingly, these and other factors may be important when deploying edge computing processing resources at infrastructure locations (e.g., small cells, base station, COs).

A relevant design point for these and other edge computing scenarios is that, especially in multi-tenancy and multi-stakeholder use cases, networking infrastructure services cannot "starve" or fail, and need to stay remain unimpacted by ongoing applications and services. Network traffic and network function workloads may need to remain deterministic, and as such, the design of the edge cloud architecture may be focused on high priority use cases such as VNF and network services.

Figure 37:
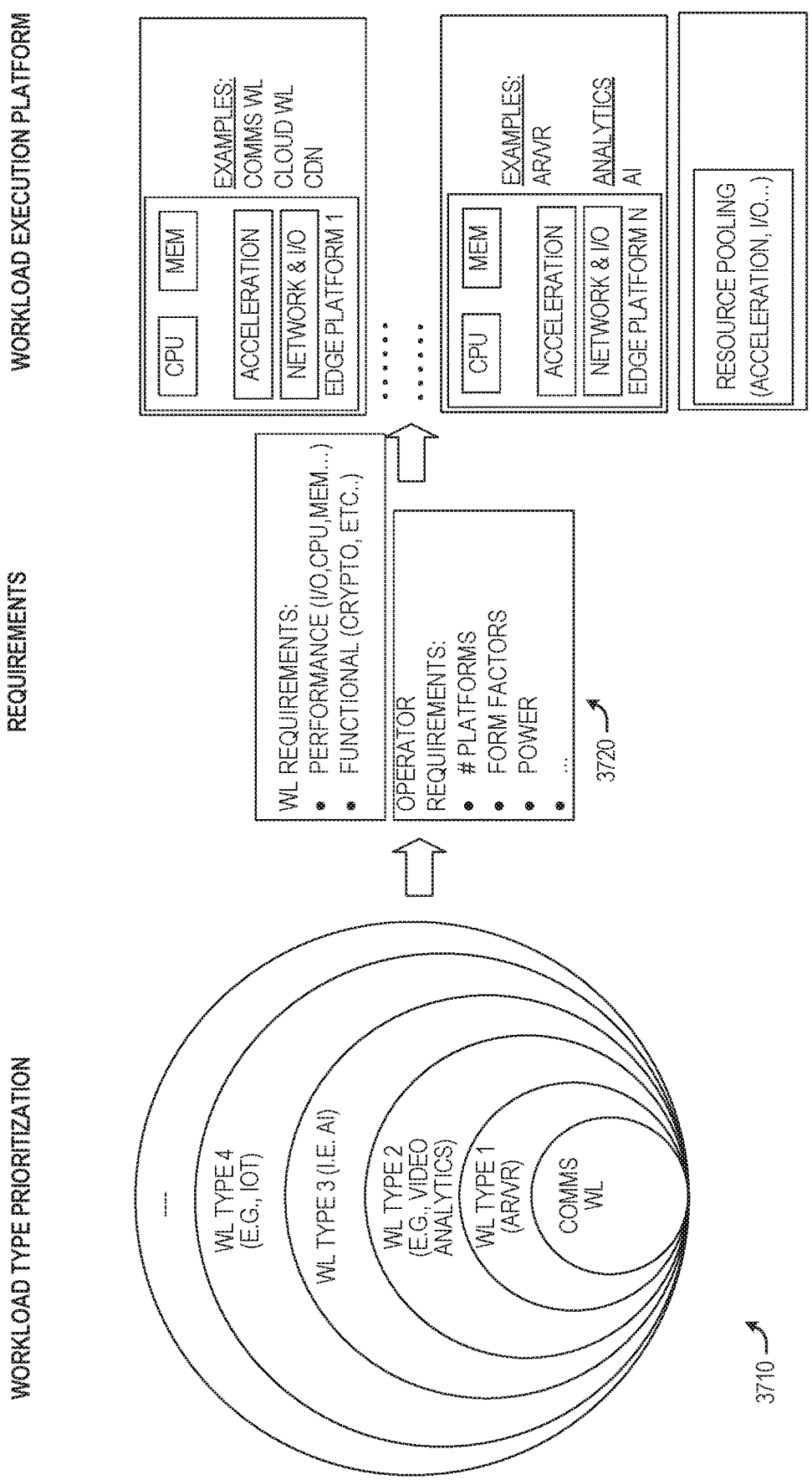
FIG. 37 illustrates workload type mapping to execution platforms in an edge computing system.

FIG. 37 illustrates workload type mapping to execution platforms in an edge computing system. As shown, a set of workload types 3710 progressively advance from a type classification indicating lowest priority and latency requirements of the workload (e.g., for IoT data processing) to a type classification indicating highest priority and latency requirements of the workload (e.g., for network communication functions) with intermediate type classifications (e.g., for AI workloads, video analytics workloads, AR/VR workloads). These workload types 3710 may be orchestrated in a multi-stakeholder, multi-tenant edge system according to the type classification.

The respective type classifications may be associated with sets of requirements 3720, which may specify workload requirements for the particular classification (e.g., performance requirements, functional requirements), as compared with operator requirements or constraints (available number of platforms, form factors, power, etc.). As result of the requirements 3720 for the invoked workload(s), a selection may be made for a particular configuration of a workload execution platform 3730. The configuration for the workload execution platform 3730 may be selected by identifying an execution platform from among multiple edge nodes (e.g., platforms 1 to N); by reconfiguring an execution platform within a configurable rack scale design system; or by reconfiguring an execution platform through pooling or combining resources from one or multiple platforms.

In addition to requirements and constraints provided from the mapping of workload types, other measurements or indicators may be used to select or configure an edge execution platform. For instance, mapping of services on a particular execution platform may consider: KPI performance benefits or user experience benefits (e.g., what latency is required to provide a good user experience for 360-degree video); OPEX/TCO (e.g., derived from placing a service into a particular location versus the expected monetization); SLA and service level objective (SLO) definitions; and the like. These considerations are balanced with operator concerns to manage the potential high cost of management among a distributed ecosystem and disparate hardware locations.

Figure 38:
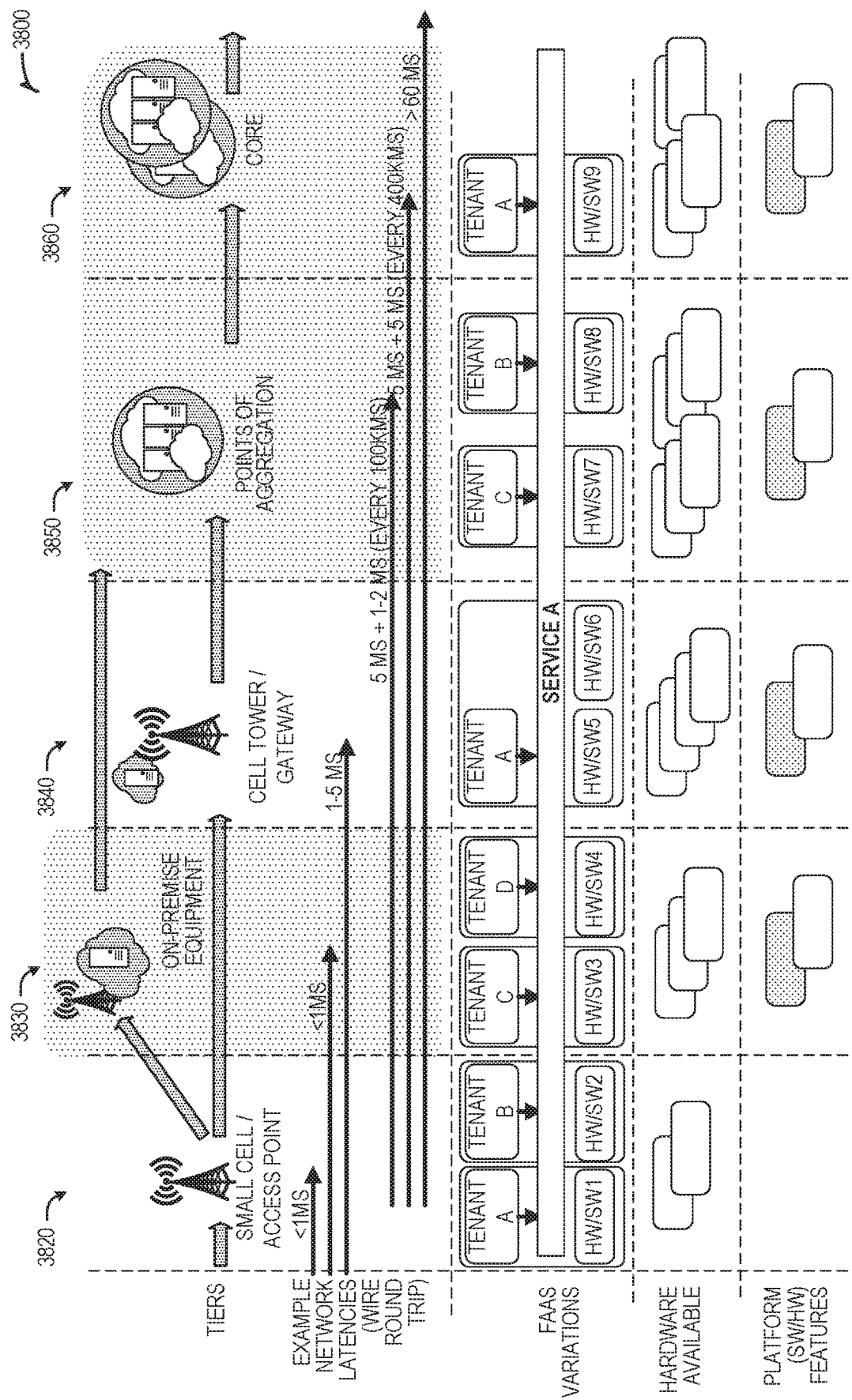
FIG. 38 illustrates operation of a service for multiple tenants among multiple layers of edge computing hardware configurations in an edge computing system.

FIG. 38 illustrates operation of a service for multiple tenants among multiple layers (e.g., layers 3820, 3830, 3840, 3850, and 3860) of edge computing hardware configurations in an edge computing system 3800. At the various operational layers 3820-3860 of the edge computing system 3800, different combinations of hardware availability and platform features are exposed. For instance, a small cell operating at a local layer may have limited hardware (e.g., low-power CPUs) with limited or no specialized platform features (software or hardware features). An on-premise cloudlet/edgelet/or other applet machine operating at the on-premise layer may host additional or more powerful hardware and offer software or hardware features (e.g., AI accelerators, FPGAs, GPUs, cryptography services, etc.). The base station layer may have even more hardware capabilities (e.g., high-powered CPUs or specialized compute architecture processing units) or more advanced platform features (advanced storage memory); more advanced combinations of hardware and platform features (including smart networking components) may be provided at the aggregation layer and the core network layer.

The different types of hardware capabilities and features shown in system 3800 may enable multiple edge FaaS variations. Specifically, although a particular service or service platform ("Service A") may be virtually offered for use or execution at any of the layers, the different combinations of hardware and software among the layers enable different processing results or actions. Further, different combinations of hardware and software (or, capabilities of such hardware and software) may be offered for service use or execution based on the particular tenant or user. In this context, the service execution/runtime can be an LSM or other security policy enforcement point. (Likewise, in this context, hardware abstraction layers underneath the service layer and platform capabilities that allow physical partitioning or virtualization can provide LSM and other security policy enforcement points as well).

From an application point of view, there may be applications specifically designed for edge networking (such as where components of the application would be running in the cloud, with individual processing components at the edges in the edge cloud, such as along hierarchical edges).

Thus, the approach depicted in system 3800 may support multiple variations of FaaS, such as ultra-low latency FaaS vs. FaaS, as part of the same or different application.

Figure 39:
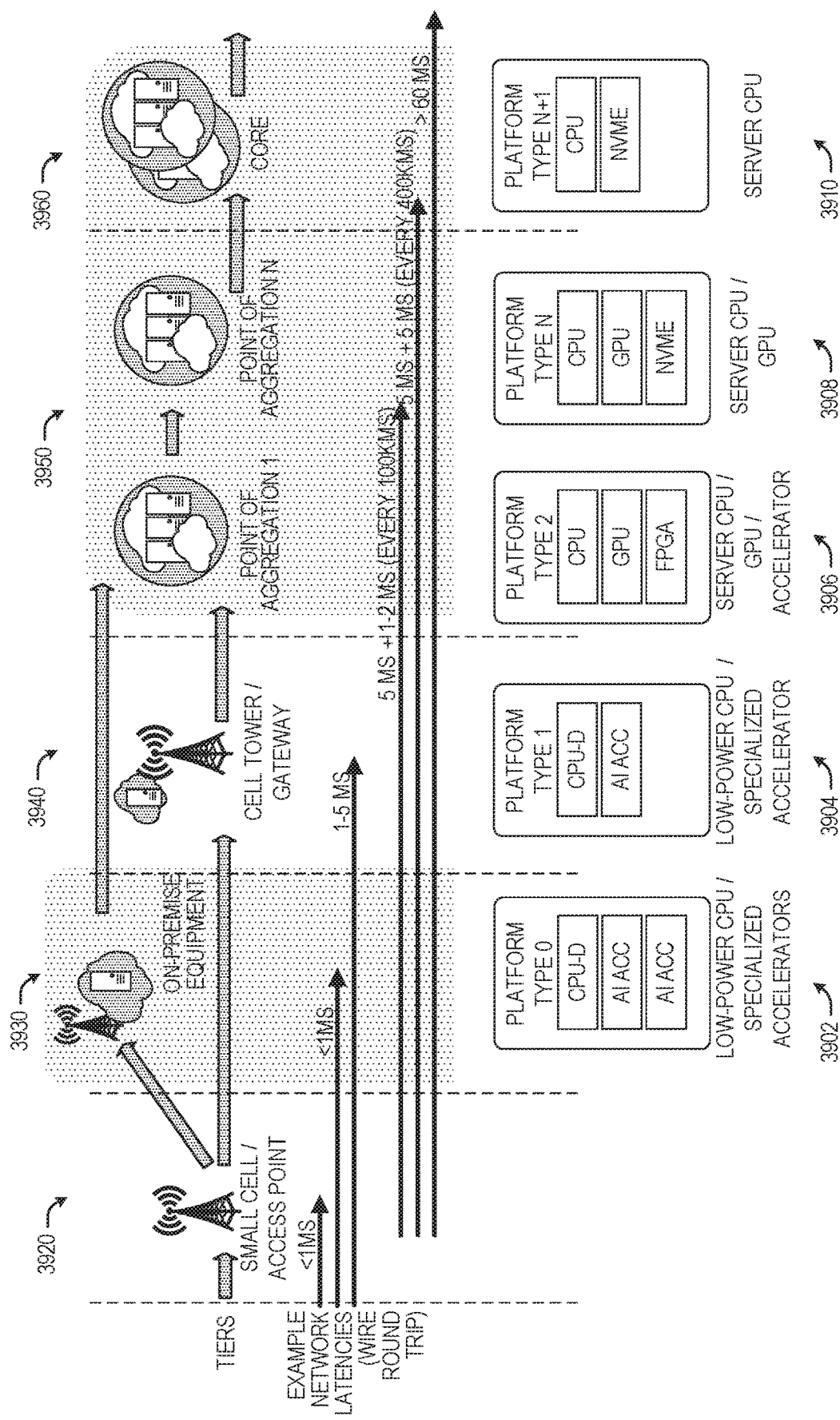
FIG. 39 illustrates further mapping of edge computing hardware configurations to operational deployments and latencies in network layers.

FIG. 39 illustrates a further mapping of edge computing hardware configurations to operational deployments and latencies in network layers (e.g., layers 3920, 3930, 3940, 3950, and 3960), based on a mapping of hardware platforms 3902-3908 to various layers 3920-3960 of the edge cloud and beyond. For instance, at the on-premise layer, a combination of low-powered CPUs with multiple specialized accelerators (hardware 3902) may provide a first platform type suitable for execution of on-premise services (e.g., cloudlets/edgelets/or other applets requiring extremely low latency, under a millisecond). At the base station layer, a similar combination of low-powered CPUs with a specialized accelerator (hardware 3904) may provide a second platform type suitable for low-power execution of services for multiple types of devices (e.g., requiring low latency under 5 ms). Deeper into the network, a combination of server-class CPUs with specialized GPUs and accelerators (hardware 3906) or storage (hardware 3908) may be provided at the aggregation layer. Finally, beyond the edge cloud, multi-core server CPUs and storage (hardware 3910) may be provided at the core network layer to enable the availability of server-class (cloud) processing but with the tradeoff of higher latencies.

Figure 40:
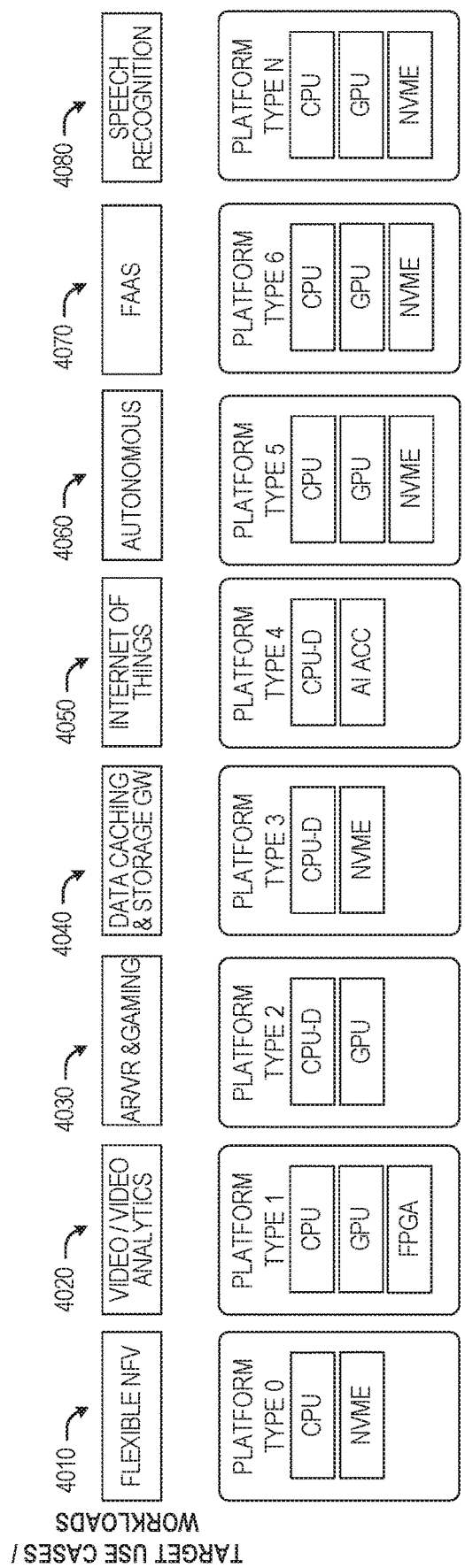
FIG. 40 illustrates further mapping of use cases and workloads to operational deployments of edge computing hardware configurations.

FIG. 40 illustrates further mapping of use cases and workloads to operational deployments of edge computing hardware configurations. Specifically, FIG. 40 shows how different workloads relevant to the edge cloud, each with varying requirements, applications and value propositions, may be deployed by service providers.

The various types of use cases and workloads may be mapped to different platform types, based on the selection or reconfiguration of hardware configurations. For example a flexible NFV workload 4010 may be mapped to a first platform type providing CPU and storage resources; a video processing or video analytics workload 4020 may be mapped to a second platform type providing low-power CPU and specialized GPU and FPGA processing; AR/VR and gaming workloads 4030 may be mapped to a third platform type providing CPU and storage resources; data caching and storage gateway workloads 4040 may be mapped to a fourth platform type providing low-power CPU and storage resources; internet of things processing 4050 may be mapped to a fifth platform type providing low-power CPU and AI acceleration resources; autonomous vehicle workloads 4060 and function-as-a-service workloads 4070 may be mapped to sixth and seventh platform types providing CPU, storage, and specialized GPU processing resources; speech recognition workloads 4080 may be mapped to an Nth platform type having CPU and storage resources, and specialized GPU processing; etc.

Different locations therefore may be usable across the edge cloud 2610 to perform services management, as both compute resources are mapped to the workload data, and workload data instances are mapped to the compute resources. In a highly distributed architecture, the features are based on mapping services on the base station. In this case, the platform physical requirements in terms of power and space will mostly limit the amount of hardware that can be placed in this particular edge node. Furthermore, in order to get more service density, acceleration schemes such as hardware inference acceleration may be utilized. In a central office architecture, the architecture is less distributed but less power and space constrained according to the capabilities and servicing location of the central office. In this case, with fewer space and power constraints, the architectural solution can be more homogenous at the cost of sacrificing some degree of performance or service density.

It should be understood that initial workload mapping may not be effective for runtime activities during the lifecycle of the workload or in the construct of a workflow. Additional services that should be enabled are the workload assessment as a service, which can provide the assessment and reallocation of a workload based on over time characterization of the workload. Based on this, as suggested by the examples below, a workload may be migrated to another location or another hardware or system configuration in order to support the workload needs.

In further examples, various types of distribution, upgrade, and change architectures may be implemented to support software (and firmware and hardware feature) updates to implement workloads and edge computing services generally. Normally, a vendor of a computing platform is responsible for producing feature changes or security patches that apply to deployed platforms. A vendor typically does not enable other supply chain entities to develop firmware updates and/or allow another entity to apply them. This scenario may also apply in edge computing environments, although a distributed computing environment may enable new software distribution and upgrade dynamics. When a workload is dissected and distributed across a 'slice' or 'flavor' of resources spanning multiple platforms and therefore multiple administrators and vendors, considerations may be made on whether the user and orchestrator have enough control over which versions of what software/firmware.

In an example, a workload may be validated or simulated on a particular configuration and deployment 'flavor' where the simulation outcome may exhaustively depend on the firmware, software and other configuration parameters. In some cases, the security vulnerabilities in hardware, firmware, and software also predict how the workload execution behaves. However, if the environment used to validate and/or simulate the workload execution differs from the actual environment that executes it, then that differential represents added risk.

An edge computing ecosystem may be optimized for minimizing risk differential as a way to manage software, firmware, and hardware feature updates. A three phased approach to workload deployment can be utilized: (1) Setup a workload validation environment that identifies the execution environment dependencies. This considers which software models are required to process the workload application. This dependency graph is identified as part of a validation environment setup. Additionally, excess functionality presents an increased attack surface that adds runtime execution risk. These non-dependencies can be removed from the validation environment. (2) The simulation creates the actual environment needed to process the workload. It could involve use of simulated hardware, virtualization or simulated performance scenarios. The workload executes with an expectation of interacting with other workloads, orchestration, users, collaborations etc. The simulation ensures the operational corner cases are exposed. The simulation may also specify which versions of hardware, software, and firmware are used. These may be actual hardware, software, and firmware resources to better understand expected actual behavior. (3) The simulation environment is reproduced in a real-world deployment. The version of hardware, software, and firmware are adjusted appropriately. Possibly, this implies moving to a backward revision or passing over backward revisions to find and allocate resources according to the simulation defined environment. This may also involve removal of hardware, software, and firmware that isn't used by the workload.

Example Computing Systems, Platforms, and Devices

Figure 41:
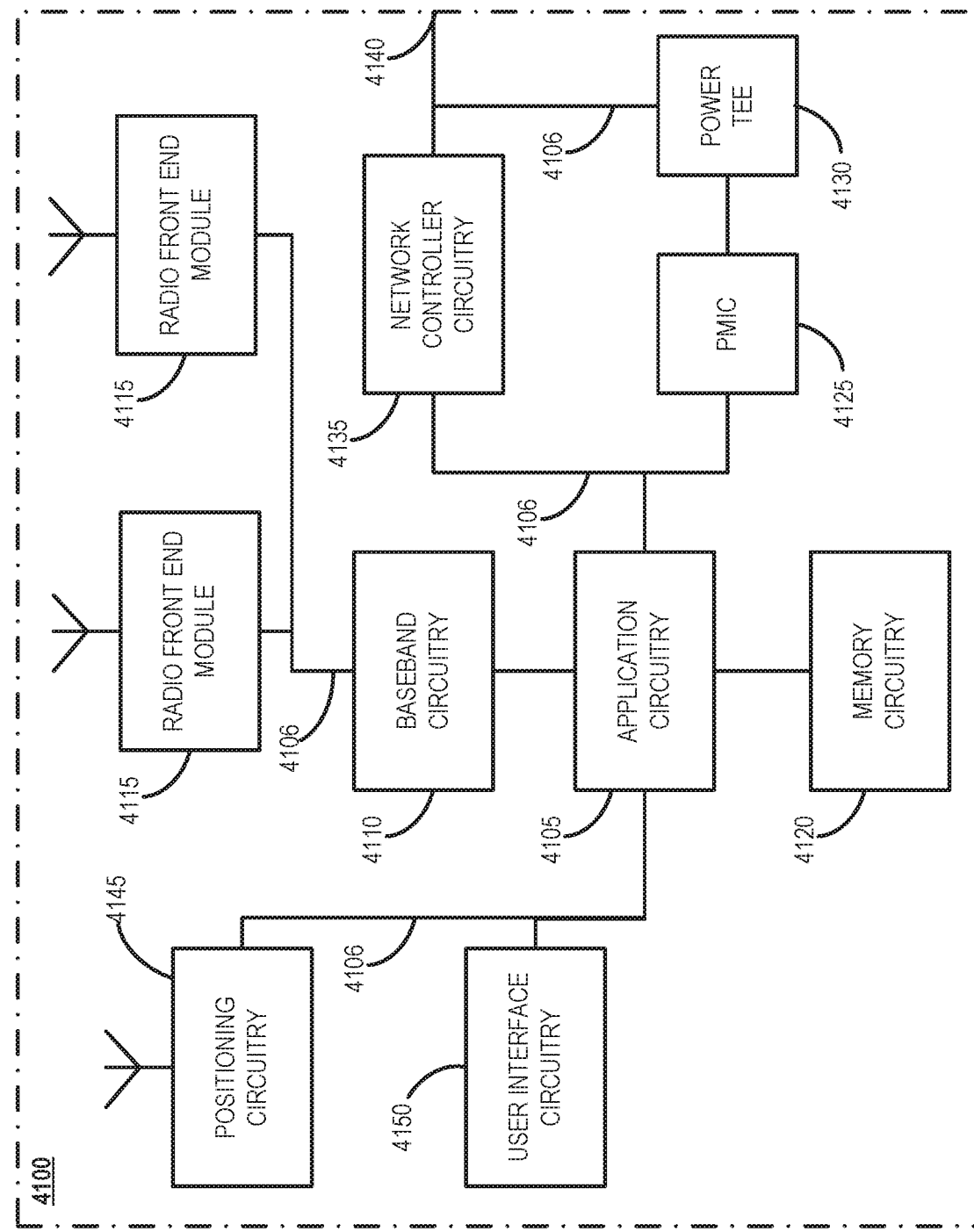
FIG. 41 illustrates an example of infrastructure equipment in accordance with various embodiments.

FIG. 41 illustrates an example of infrastructure equipment 4100 in accordance with various embodiments. The infrastructure equipment 4100 (or "system 4100") may be implemented as a base station, radio head, access network node (e.g., the edge nodes 3030 shown and described previously), MEC servers 3036, server(s) 3050, and/or any other element/device discussed herein. In other examples, the system 4100 could be implemented in or by an intermediate node 3020 or endpoint 3010.

The system 4100 includes application circuitry 4105, baseband circuitry 4110, one or more RFEMs 4115, memory circuitry 4120, PMIC 4125, power tee circuitry 4130, network controller circuitry 4135, network interface connector 4140, positioning circuitry 4145, and user interface 4150. In some embodiments, the device 4100 may include additional elements such as, for example, memory/storage, display, camera, sensor, or I/O interface. In other embodiments, the components described below may be included in more than one device. For example, said circuitries may be separately included in more than one device for CRAN, vBBU, or other like implementations.

Application circuitry 4105 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose I/O, memory card controllers such as Secure Digital (SD) MultiMediaCard (MMC) or similar, USB interfaces, Mobile Industry Processor Interface (MIPI) interfaces and Joint Test Access Group (JTAG) test access ports. The processors (or cores) of the application circuitry 4105 may be coupled with or may include memory/storage elements and may be configured to execute instructions stored in the memory/storage to enable various applications or operating systems to run on the system 4100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 4105 may include, for example, one or more processor cores, CPUs, application processors, GPUs, RISC processors, one or more Acorn RISC Machine (ARM) processors, CISC processors, one or more DSPs, one or more FPGAs, one or more PLDs, one or more ASICs, one or more microprocessors or controllers, or any suitable combination thereof. In some embodiments, the application circuitry 4105 may comprise, or may be, a special-purpose processor/controller to operate according to the various embodiments herein. As examples, the processor(s) of application circuitry 4105 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 4100 may not utilize application circuitry 4105, and instead may include a special-purpose processor/controller to process IP data received from an EPC or 5GC, for example.

In some implementations, the application circuitry 4105 may include one or more hardware accelerators, which may be microprocessors, programmable processing devices, or the like. The one or more hardware accelerators may include, for example, computer vision and/or deep learning accelerators. As examples, the programmable processing devices may be one or more FPGAs; programmable logic devices PLDs such as CPLDs, HCPLDs, and the like; ASICs such as structured ASICs and the like; programmable SoCs; and/or the like. In such implementations, the circuitry of application circuitry 4105 may comprise logic blocks or logic fabric, and other interconnected resources that may be programmed to perform various functions, such as the procedures, methods, functions, etc. of the various embodiments discussed herein. In such embodiments, the circuitry of application circuitry 4105 may include memory cells (e.g., EPROM, EEPROM, flash memory, static memory (e.g., SRAM, anti-fuses, etc.)) used to store logic blocks, logic fabric, data, etc. in look-up-tables (LUTs) and the like.

In some implementations, such as implementations where subsystems of the edge nodes 3030, intermediate nodes 3020, and/or endpoints 3010 of FIG. 30 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 4105 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 4110 may be implemented, for example, as a solder-down substrate including one or more integrated circuits, a single packaged integrated circuit soldered to a main circuit board or a multi-chip module containing two or more integrated circuits. The baseband circuitry 4110 includes one or more processing devices (e.g., baseband processors) to carry out various protocol and radio control functions. Baseband circuitry 4110 may interface with application circuitry of system 4100 for generation and processing of baseband signals and for controlling operations of the RFEMs 4115. The baseband circuitry 4110 may handle various radio control functions that enable communication with one or more radio networks via the RFEMs 4115. The baseband circuitry 4110 may include circuitry such as, but not limited to, one or more single-core or multi-core processors (e.g., one or more baseband processors) or control logic to process baseband signals received from a receive signal path of the RFEMs 4115, and to generate baseband signals to be provided to the RFEMs 4115 via a transmit signal path. In various embodiments, the baseband circuitry 4110 may implement a RTOS to manage resources of the baseband circuitry 4110, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 41, in one embodiment, the baseband circuitry 4110 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 4115 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 4115 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 4110 and/or RFEMs 4115. The baseband circuitry 4110 may also support radio communications for more than one wireless protocol.

Continuing with the aforementioned embodiment, the baseband circuitry 4110 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include FFT, precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 4150 may include one or more user interfaces designed to enable user interaction with the system 4100 or peripheral component interfaces designed to enable peripheral component interaction with the system 4100. User interfaces may include, but are not limited to, one or more physical or virtual buttons (e.g., a reset button), one or more indicators (e.g., LEDs), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a USB port, an audio jack, a power supply interface, etc.

The RFEMs 4115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 4115, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 4110 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 4120 may include one or more of volatile memory including DRAM and/or SDRAM, and nonvolatile memory including high-speed electrically erasable memory (commonly referred to as Flash memory), PRAM, MRAM, etc., and may incorporate the 3D crosspoint (XPOINT) memories from Intel® and Micron®. Memory circuitry 4120 may be implemented as one or more of solder down packaged integrated circuits, socketed memory modules and plug-in memory cards. The memory circuitry 4120 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 4100, an operating system of infrastructure equipment 4100, one or more applications, and/or for carrying out the embodiments discussed herein. The computational logic may be stored or loaded into memory circuitry 4120 as instructions for execution by the processors of the application circuitry 4105 to provide or perform the functions described herein. The various elements may be implemented by assembler instructions supported by processors of the application circuitry 4105 or high-level languages that may be compiled into such instructions. The permanent copy of the programming instructions may be placed into persistent storage devices of memory circuitry 4120 in the factory during manufacture, or in the field through, for example, a distribution medium (not shown), through a communication interface (e.g., from a distribution server), and/or OTA.

The PMIC 4125 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 4130 may provide for electrical power drawn from a network cable to provide both power supply and data connectivity to the infrastructure equipment 4100 using a single cable.

The network controller circuitry 4135 provides connectivity to a network using a standard network interface protocol such as Ethernet, Ethernet over GRE Tunnels, Ethernet over MPLS, or some other suitable protocol, such as those discussed herein. Network connectivity may be provided to/from the infrastructure equipment 4100 via network interface connector 4140 using a physical connection, which may be electrical (commonly referred to as a "copper interconnect"), optical, or wireless. The network controller circuitry 4135 may include one or more dedicated processors and/or FPGAs to communicate using one or more of the aforementioned protocols. In some implementations, the network controller circuitry 4135 may include multiple controllers to provide connectivity to other networks using the same or different protocols. In various embodiments, the network controller circuitry 4135 enables communication with associated equipment and/or with a backend system (e.g., server(s) 3030 of FIG. 30), which may take place via a suitable gateway device.

The positioning circuitry 4145 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 4145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 4145 may include a Micro-Technology for Positioning, Navigation, and Timing (Micro-PNT) IC that uses a master timing clock to perform position tracking/estimation without GNSS assistance. The positioning circuitry 4145 may also be part of, or interact with, the baseband circuitry 4110 and/or RFEMs 4115 to communicate with the nodes and components of the positioning network. The positioning circuitry 4145 may also provide position data and/or time data to the application circuitry 4105, which may use the data to synchronize operations with various other infrastructure equipment, or the like. Additionally, when a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In ITSC implementations, the facilities layer of the road side ITS-S includes an ITS-S positioning service facility that provides and updates the geographical positioning of the ITS-S and/or other ITS-Ss in real time. Any of the aforementioned positioning technologies can be used to determine in real time the geographic position, with variable accuracy level for road safety ITS applications. In these implementations, the ITS-S positioning service facility may operate the positioning augmentation technology The components shown by FIG. 41 may communicate with one another using interface circuitry 4106 or IX 4106, which may include any number of bus and/or IX technologies such as ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 42:
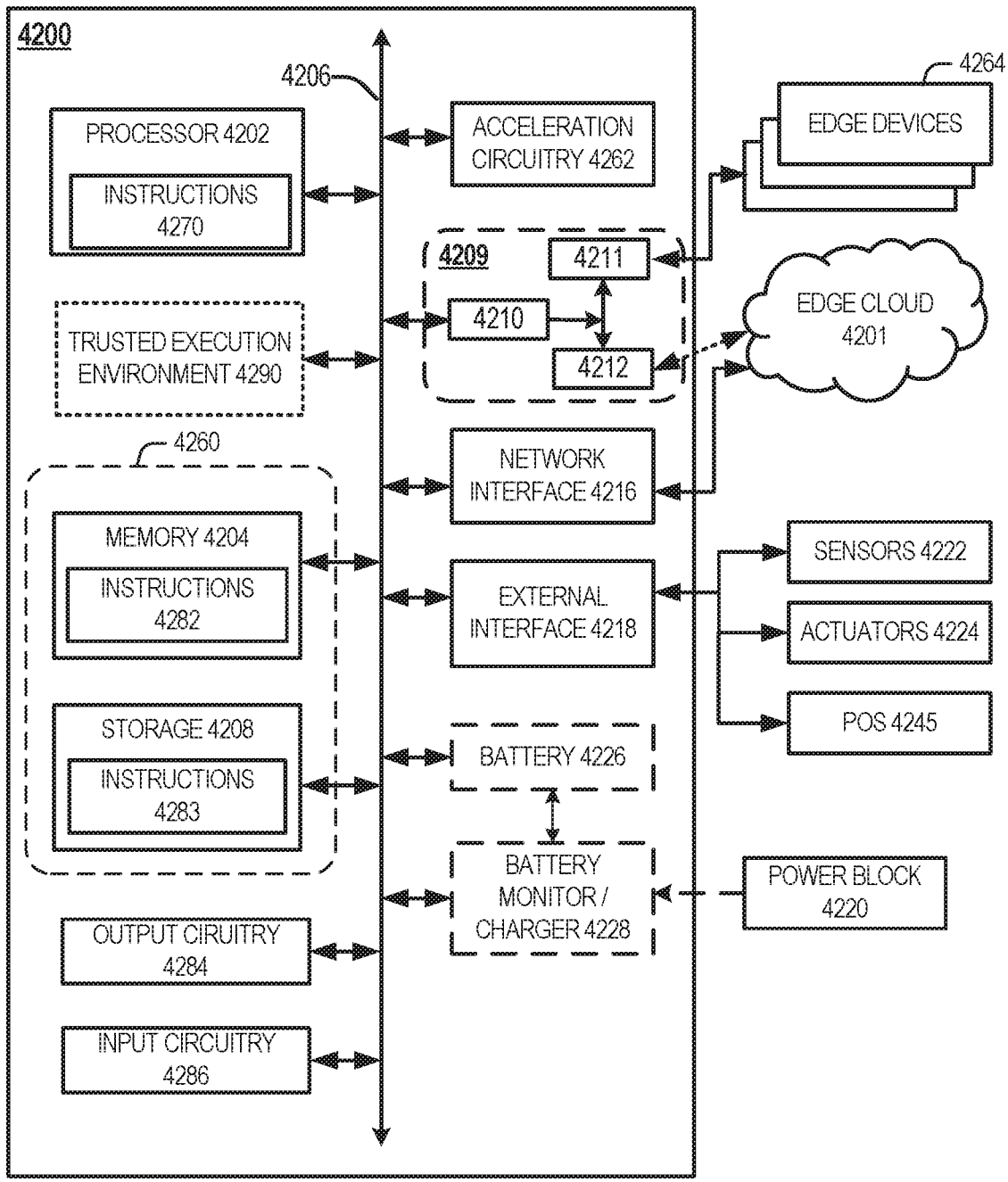
FIG. 42 illustrates an example of a computing platform in accordance with various embodiments.

FIG. 42 illustrates an example of a computing platform 4200 (also referred to as "system 4200," "device 4200," "appliance 4200," or the like) in accordance with various embodiments. In embodiments, the platform 4200 may be suitable for use as intermediate nodes 3020 and/or endpoints 3010 of FIG. 30, IoT devices, and/or any other element/device discussed herein with regard any other figure shown and described herein. Platform 4200 may also be implemented in or as a server computer system or some other element, device, or system discussed herein. The platform 4200 may include any combinations of the components shown in the example. The components of platform 4200 may be implemented as integrated circuits (ICs), portions thereof, discrete electronic devices, or other modules, logic, hardware, software, firmware, or a combination thereof adapted in the computer platform 4200, or as components otherwise incorporated within a chassis of a larger system. The example of FIG. 42 is intended to show a high level view of components of the computer platform 4200. However, some of the components shown may be omitted, additional components may be present, and different arrangement of the components shown may occur in other implementations.

The platform 4200 includes processor circuitry 4202. The processor circuitry 4202 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 4202 may include one or more hardware accelerators, which may be microprocessors, programmable processing devices (e.g., FPGA, ASIC, etc.), or the like. The one or more hardware accelerators may include, for example, computer vision and/or deep learning accelerators. In some implementations, the processor circuitry 4202 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 4202 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 4202 may be coupled with or may include memory/storage and may be configured to execute instructions stored in the memory/storage to enable various applications or operating systems to run on the platform 4200. In these embodiments, the processors (or cores) of the processor circuitry 4202 is configured to operate application software to provide a specific service to a user of the platform 4200. In some embodiments, the processor circuitry 4202 may be a special-purpose processor/controller to operate according to the various embodiments herein.

As examples, the processor circuitry 4202 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, Calif. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 4202 may be a part of a system on a chip (SoC), System-in-Package (SiP), a multi-chip package (MCP), and/or the like, in which the processor circuitry 4202 and other components are formed into a single integrated circuit, or a single package, such as the Edison™ or Galileo™ SoC boards from Intel® Corporation. Other examples of the processor circuitry 4202 are mentioned elsewhere in the present disclosure.

Additionally or alternatively, processor circuitry 4202 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 4202 may comprise logic blocks or logic fabric including and other interconnected resources that may be programmed to perform various functions, such as the procedures, methods, functions, etc. of the various embodiments discussed herein. In such embodiments, the circuitry of processor circuitry 4202 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 4202 may communicate with system memory circuitry 4204 over an interconnect 4206 (e.g., a bus). Any number of memory devices may be used to provide for a given amount of system memory. As examples, the memory circuitry 4204 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 4204 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 4204 may also comprise persistent storage devices, which may be temporal and/or persistent storage of any type, including, but not limited to, non-volatile memory, optical, magnetic, and/or solid state mass storage, and so forth.

The individual memory devices of memory circuitry 4204 may be implemented as one or more of solder down packaged integrated circuits, socketed memory modules, and plug-in memory cards. The memory circuitry 4204 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. In embodiments, the memory circuitry 4204 may be disposed in or on a same die or package as the processor circuitry 4202 (e.g., a same SoC, a same SiP, or soldered on a same MCP as the processor circuitry 4202).

To provide for persistent storage of information such as data, applications, operating systems (OS), and so forth, a storage circuitry 4208 may also couple to the processor circuitry 4202 via the interconnect 4206. In an example, the storage circuitry 4208 may be implemented via a solid-state disk drive (SSDD). Other devices that may be used for the storage circuitry 4208 include flash memory cards, such as SD cards, microSD cards, xD picture cards, and the like, and USB flash drives. In low power implementations, the storage circuitry 4208 may be on-die memory or registers associated with the processor circuitry 4202. However, in some examples, the storage circuitry 4208 may be implemented using a micro hard disk drive (HDD). Further, any number of new technologies may be used for the storage circuitry 4208 in addition to, or instead of, the technologies described, such resistance change memories, phase change memories, holographic memories, or chemical memories, among others.

The storage circuitry 4208 store computational logic 4283 (or "modules 4283") in the form of software, firmware, or hardware commands to implement the techniques described herein. The computational logic 4283 may be employed to store working copies and/or permanent copies of computer programs, or data to create the computer programs, for the operation of various components of platform 4200 (e.g., drivers, etc.), an OS of platform 4200 and/or one or more applications for carrying out the embodiments discussed herein. The computational logic 4283 may be stored or loaded into memory circuitry 4204 as instructions 4282, or data to create the instructions 4282, for execution by the processor circuitry 4202 to provide the functions described herein. The various elements may be implemented by assembler instructions supported by processor circuitry 4202 or high-level languages that may be compiled into such instructions (e.g., instructions 4270, or data to create the instructions 4270). The permanent copy of the programming instructions may be placed into persistent storage devices of storage circuitry 4208 in the factory or in the field through, for example, a distribution medium (not shown), through a communication interface (e.g., from a distribution server (not shown)), or over-the-air (OTA).

In an example, the instructions 4282 provided via the memory circuitry 4204 and/or the storage circuitry 4208 of FIG. 42 are embodied as one or more non-transitory computer readable storage media (see e.g., NTCRSM 4260) including program code, a computer program product or data to create the computer program, with the computer program or data, to direct the processor circuitry 4202 of platform 4200 to perform electronic operations in the platform 4200, and/or to perform a specific sequence or flow of actions, for example, as described with respect to the flowchart(s) and block diagram(s) of operations and functionality depicted previously. The processor circuitry 4202 accesses the one or more non-transitory computer readable storage media over the interconnect 4206.

In alternate embodiments, programming instructions (or data to create the instructions) may be disposed on multiple NTCRSM 4260. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 4260 may be embodied by devices described for the storage circuitry 4208 and/or memory circuitry 4204. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 4283, instructions 4282, 4270 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP-.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 4200, partly on the system 4200, as a stand-alone software package, partly on the system 4200 and partly on a remote computer or entirely on the remote computer or server. In the latter scenario, the remote computer may be connected to the system 4200 through any type of network, including a LAN or WAN, or the connection may be made to an external computer (e.g., through the Internet using an Internet Service Provider).

In an example, the instructions 4270 on the processor circuitry 4202 (separately, or in combination with the instructions 4282 and/or logic/modules 4283 stored in computer-readable storage media) may configure execution or operation of a trusted execution environment (TEE) 4290. The TEE 4290 operates as a protected area accessible to the processor circuitry 4202 to enable secure access to data and secure execution of instructions. In some embodiments, the TEE 4290 may be a physical hardware device that is separate from other components of the system 4200 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 4290 may be implemented as secure enclaves, which are isolated regions of code and/or data within the processor and/or memory/storage circuitry of the system 4200. Only code executed within a secure enclave may access data within the same secure enclave, and the secure enclave may only be accessible using the secure application (which may be implemented by an application processor or a tamper-resistant microcontroller). Various implementations of the TEE 4290, and an accompanying secure area in the processor circuitry 4202 or the memory circuitry 4204 and/or storage circuitry 4208 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 4200 through the TEE 4290 and the processor circuitry 4202.

In some embodiments, the memory circuitry 4204 and/or storage circuitry 4208 may be divided into isolated userspace instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 4204 and/or storage circuitry 4208 may be divided into one or more trusted memory regions for storing applications or software modules of the TEE 4290.

Although the instructions 4282 are shown as code blocks included in the memory circuitry 4204 and the computational logic 4283 is shown as code blocks in the storage circuitry 4208, it should be understood that any of the code blocks may be replaced with hardwired circuits, for example, built into an FPGA, ASIC, or some other suitable circuitry. For example, where processor circuitry 4202 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 4204 and/or storage circuitry 4208 may store program code of an operating system (OS), which may be a general purpose OS or an OS specifically written for and tailored to the computing platform 4200. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 4200, attached to the platform 4200, or otherwise communicatively coupled with the platform 4200. The drivers may include individual drivers allowing other components of the platform 4200 to interact or control various I/O devices that may be present within, or connected to, the platform 4200. For example, the drivers may include a display driver to control and allow access to a display device, a touchscreen driver to control and allow access to a touchscreen interface of the platform 4200, sensor drivers to obtain sensor readings of sensor circuitry 4221 and control and allow access to sensor circuitry 4221, actuator drivers to obtain actuator positions of the actuators 4222 and/or control and allow access to the actuators 4222, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the platform 4200 (not shown).

The components may communicate over the IX 4206. The IX 4206 may include any number of technologies, including ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 4206 may be a proprietary bus, for example, used in a SoC based system.

The interconnect 4206 couples the processor circuitry 4202 to the communication circuitry 4209 for communications with other devices. The communication circuitry 4209 is a hardware element, or collection of hardware elements, used to communicate over one or more networks (e.g., cloud 4201) and/or with other devices (e.g., mesh devices/fog 4264). The communication circuitry 4209 includes baseband circuitry 4210 (or "modem 4210") and RF circuitry 4211 and 4212.

The baseband circuitry 4210 includes one or more processing devices (e.g., baseband processors) to carry out various protocol and radio control functions. Baseband circuitry 4210 may interface with application circuitry of platform 4200 (e.g., a combination of processor circuitry 4202, memory circuitry 4204, and/or storage circuitry 4208) for generation and processing of baseband signals and for controlling operations of the RF circuitry 4211 or 4212. The baseband circuitry 4210 may handle various radio control functions that enable communication with one or more radio networks via the RF circuitry 4211 or 4212. The baseband circuitry 4210 may include circuitry such as, but not limited to, one or more single-core or multi-core processors (e.g., one or more baseband processors) or control logic to process baseband signals received from a receive signal path of the RF circuitry 4211 and/or 4212, and to generate baseband signals to be provided to the RF circuitry 4211 or 4212 via a transmit signal path. In various embodiments, the baseband circuitry 4210 may implement an RTOS to manage resources of the baseband circuitry 4210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 42, in one embodiment, the baseband circuitry 4210 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G)/NR protocol entities when the communication circuitry 4209 is a cellular radiofrequency communication system, such as millimeter wave (mmWave) communication circuitry or some other suitable cellular communication circuitry. In the first example, the protocol processing circuitry 4202 would operate MAC, RLC, PDCP, SDAP, RRC, and NAS functions. In a second example, the protocol processing circuitry may operate one or more IEEE-based protocols when the communication circuitry 4209 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 4210 and/or RF circuitry 4211 and 4212. The baseband circuitry 4210 may also support radio communications for more than one wireless protocol.

Continuing with the aforementioned embodiment, the baseband circuitry 4210 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 4209 also includes RF circuitry 4211 and 4212 to enable communication with wireless networks using modulated electromagnetic radiation through a non-solid medium. Each of the RF circuitry 4211 and 4212 include a receive signal path, which may include circuitry to convert analog RF signals (e.g., an existing or received modulated waveform) into digital baseband signals to be provided to the baseband circuitry 4210. Each of the RF circuitry 4211 and 4212 also include a transmit signal path, which may include circuitry configured to convert digital baseband signals provided by the baseband circuitry 4210 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 4211 or 4212 using metal transmission lines or the like.

The RF circuitry 4211 (also referred to as a "mesh transceiver") is used for communications with other mesh or fog devices 4264. The mesh transceiver 4211 may use any number of frequencies and protocols, such as 2.4 GHz transmissions under the IEEE 802.15.4 standard, using the Bluetooth® low energy (BLE) standard, as defined by the Bluetooth® Special Interest Group, or the ZigBee® standard, among others. Any number of RF circuitry 4211, configured for a particular wireless communication protocol, may be used for the connections to the mesh devices 4264. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 4211 may communicate using multiple standards or radios for communications at different ranges. For example, the platform 4200 may communicate with close/proximate devices, e.g., within about 10 meters, using a local transceiver based on BLE, or another low power radio, to save power. More distant mesh devices 4264, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 4212 (also referred to as a "wireless network transceiver," a "cloud transceiver," or the like) may be included to communicate with devices or services in the cloud 4201 via local or wide area network protocols. The wireless network transceiver 4212 includes one or more radios to communicate with devices in the cloud 4201. The cloud 4201 may be the same or similar to cloud 144 discussed previously. The wireless network transceiver 4212 may be a LPWA transceiver that follows the IEEE 802.15.4, or IEEE 802.15.4g standards, among others, such as those discussed herein. The platform 4200 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 1002.15.4e specification may be used.

Any number of other radio communications and protocols may be used in addition to the systems mentioned for the mesh transceiver 4211 and wireless network transceiver 4212, as described herein. For example, the radio transceivers 4211 and 4212 may include an LTE or other cellular transceiver that uses spread spectrum (SPA/SAS) communications for implementing high-speed communications. Further, any number of other protocols may be used, such as WiFi® networks for medium speed communications and provision of network communications.

The transceivers 4211 and 4212 may include radios that are compatible with, and/or may operate according to any one or more of the following radio communication technologies and/or standards including but not limited to those discussed herein.

Network interface circuitry/controller (NIC) 4216 may be included to provide wired communication to the cloud 4201 or to other devices, such as the mesh devices 4264 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 4200 via NIC 4216 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 4216 may include one or more dedicated processors and/or FPGAs to communicate using one or more of the aforementioned network interface protocols. In some implementations, the NIC 4216 may include multiple controllers to provide connectivity to other networks using the same or different protocols. For example, the platform 4200 may include a first NIC 4216 providing communications to the cloud over Ethernet and a second NIC 4216 providing communications to other devices over another type of network.

The interconnect 4206 may couple the processor circuitry 4202 to an external interface 4218 (also referred to as "I/O interface circuitry" or the like) that is used to connect external devices or subsystems. The external devices include, inter alia, sensor circuitry 4221, actuators 4222, and positioning circuitry 4245.

The sensor circuitry 4221 may include devices, modules, or subsystems whose purpose is to detect events or changes in its environment and send the information (sensor data) about the detected events to some other a device, module, subsystem, etc. Examples of such sensors 4221 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 4218 connects the platform 4200 to actuators 4222, allow platform 4200 to change its state, position, and/or orientation, or move or control a mechanism or system. The actuators 4222 comprise electrical and/or mechanical devices for moving or controlling a mechanism or system, and converts energy (e.g., electric current or moving air and/or liquid) into some kind of motion. The actuators 4222 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 4222 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 4200 may be configured to operate one or more actuators 4222 based on one or more captured events and/or instructions or control signals received from a service provider and/or various client systems.

The positioning circuitry 4245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 4245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 4245 may include a Micro-Technology for Positioning, Navigation, and Timing (Micro-PNT) IC that uses a master timing clock to perform position tracking/estimation without GNSS assistance. The positioning circuitry 4245 may also be part of, or interact with, the communication circuitry 4209 to communicate with the nodes and components of the positioning network. The positioning circuitry 4245 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS).

In some implementations, the positioning circuitry 4245 is, or includes an INS, which is a system or device that uses sensor circuitry 4221 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 4200 without the need for external references.

In some examples, various I/O devices may be present within, or connected to, the platform 4200, which are referred to as input device circuitry 4286 and output device circuitry 4284 in FIG. 42. The input device circuitry 4286 and output device circuitry 4284 include one or more user interfaces designed to enable user interaction with the platform 4200 and/or peripheral component interfaces designed to enable peripheral component interaction with the platform 4200. Input device circuitry 4286 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 4284 may be included to show information or otherwise convey information, such as sensor readings, actuator position(s), or other like information. Data and/or graphics may be displayed on one or more user interface components of the output device circuitry 4284. Output device circuitry 4284 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 4200. The output device circuitry 4284 may also include speakers or other audio emitting devices, printer(s), and/or the like. In some embodiments, the sensor circuitry 4221 may be used as the input device circuitry 4286 (e.g., an image capture device, motion capture device, or the like) and one or more actuators 4222 may be used as the output device circuitry 4284 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

A battery 4224 may be coupled to the platform 4200 to power the platform 4200, which may be used in embodiments where the platform 4200 is not in a fixed location. The battery 4224 may be a lithium ion battery, a lead-acid automotive battery, or a metal-air battery, such as a zinc-air battery, an aluminum-air battery, a lithium-air battery, a lithium polymer battery, and/or the like. In embodiments where the platform 4200 is mounted in a fixed location, the platform 4200 may have a power supply coupled to an electrical grid. In these embodiments, the platform 4200 may include power tee circuitry to provide for electrical power drawn from a network cable to provide both power supply and data connectivity to the platform 4200 using a single cable.

PMIC 4226 may be included in the platform 4200 to track the state of charge (SoCh) of the battery 4224, and to control charging of the platform 4200. The PMIC 4226 may be used to monitor other parameters of the battery 4224 to provide failure predictions, such as the state of health (SoH) and the state of function (SoF) of the battery 4224. The PMIC 4226 may include voltage regulators, surge protectors, power alarm detection circuitry. The power alarm detection circuitry may detect one or more of brown out (under-voltage) and surge (over-voltage) conditions. The PMIC 4226 may communicate the information on the battery 4224 to the processor circuitry 4202 over the interconnect 4206. The PMIC 4226 may also include an analog-to-digital (ADC) convertor that allows the processor circuitry 4202 to directly monitor the voltage of the battery 4224 or the current flow from the battery 4224. The battery parameters may be used to determine actions that the platform 4200 may perform, such as transmission frequency, mesh network operation, sensing frequency, and the like. As an example, the PMIC 4226 may be a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

A power block 4228, or other power supply coupled to a grid, may be coupled with the PMIC 4226 to charge the battery 4224. In some examples, the power block 4228 may be replaced with a wireless power receiver to obtain the power wirelessly, for example, through a loop antenna in the platform 4200. A wireless battery charging circuit, such as an LTC4020 chip from Linear Technologies of Milpitas, Calif., among others, may be included in the PMIC 4226. The specific charging circuits chosen depend on the size of the battery 4224, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

Various embodiments may include a processing device to perform automated resource capacity planning for a computing infrastructure, comprising: interface circuitry to communicate over a network; and processing circuitry to: receive, via the interface circuitry, infrastructure data and service data for the computing infrastructure, wherein the infrastructure data indicates a plurality of resources in the computing infrastructure, and wherein the service data indicates a plurality of services to be orchestrated across the computing infrastructure; generate an infrastructure capacity model indicating a capacity of the computing infrastructure over a particular time window, wherein the infrastructure capacity model is generated based on the infrastructure data and the service data; identify service-to-resource placement options indicating possible placements of the plurality of services across the plurality of resources over the particular time window, wherein the service-to-resource placement options are identified based on the infrastructure capacity model and the service data; obtain resource inventory data indicating an inventory of resources that are available to add to the computing infrastructure during the particular time window; generate an infrastructure capacity plan indicating resource capacity allocation options over a plurality of time slots of the particular time window, wherein the infrastructure capacity plan is generated based on based on the infrastructure capacity model, the service-to-resource placement options, and the resource inventory data; and allocate resource capacities in the computing infrastructure for the plurality of services, wherein the resource capacities are allocated based on the infrastructure capacity plan.

In some embodiments of the processing device, the infrastructure data further indicates: a landscape of the computing infrastructure, wherein the landscape indicates a topology of the plurality of resources in the computing infrastructure; and telemetry data indicating resource capacity usage and availability for the plurality of resources in the computing infrastructure.

In some embodiments of the processing device, the plurality of resources comprises one or more compute resources, one or more memory resources, one or more network resources, and one or more storage resources.

In some embodiments of the processing device, the infrastructure capacity model further indicates a current capacity of the computing infrastructure and a predicted future capacity of the computing infrastructure over the particular time window.

In some embodiments of the processing device, the processing circuitry to generate the infrastructure capacity plan indicating the resource capacity allocation options over the plurality of time slots of the particular time window is further to: generate an infrastructure state graph indicating possible states of the computing infrastructure over the plurality of time slots based on possible resource capacity allocation actions; calculate utility scores for the possible states of the computing infrastructure based on a set of stakeholder objectives, wherein the set of stakeholder objectives comprises one or more infrastructure provider objectives and one or more service provider objectives; identify an optimal path through the infrastructure state graph based on the utility scores; and identify the resource capacity allocation options corresponding to the optimal path through the infrastructure state graph.

In some embodiments of the processing device, the infrastructure capacity plan further indicates: a first portion of the resource capacities is to be allocated in a first set of resources, wherein the first set of resources is from the plurality of resources in the computing infrastructure; and a second portion of the resource capacities is to be allocated in a second set of resources, wherein the second set of resources is to be added to the computing infrastructure from the inventory of resources.

In some embodiments of the processing device: the first portion of the resource capacities is to be allocated at a first time slot of the particular time window; and the second portion of the resource capacities is to be allocated at a second time slot of the particular time window.

In some embodiments of the processing device, the second set of resources comprises: one or more physical resources to be purchased from the inventory of resources; or one or more logical resources to be rented from the inventory of resources.

In some embodiments of the processing device, the processing circuitry is further to: orchestrate the plurality of services across the computing infrastructure during the particular time window based on the infrastructure capacity plan.

Various embodiments may include at least one non-transitory machine-readable storage medium having instructions stored thereon, wherein the instructions, when executed on processing circuitry, cause the processing circuitry to: receive, via interface circuitry, infrastructure data and service data for a computing infrastructure, wherein the infrastructure data indicates a plurality of resources in the computing infrastructure, and wherein the service data indicates a plurality of services to be orchestrated across the computing infrastructure; generate an infrastructure capacity model indicating a capacity of the computing infrastructure over a particular time window, wherein the infrastructure capacity model is generated based on the infrastructure data and the service data; identify service-to-resource placement options indicating possible placements of the plurality of services across the plurality of resources over the particular time window, wherein the service-to-resource placement options are identified based on the infrastructure capacity model and the service data; obtain resource inventory data indicating an inventory of resources that are available to add to the computing infrastructure during the particular time window; generate an infrastructure capacity plan indicating resource capacity allocation options over a plurality of time slots of the particular time window, wherein the infrastructure capacity plan is generated based on based on the infrastructure capacity model, the service-to-resource placement options, and the resource inventory data; and allocate resource capacities in the computing infrastructure for the plurality of services, wherein the resource capacities are allocated based on the infrastructure capacity plan.

Various embodiments may include a method to perform automated resource capacity planning for a computing infrastructure, comprising: receiving, via interface circuitry, infrastructure data and service data for the computing infrastructure, wherein the infrastructure data indicates a plurality of resources in the computing infrastructure, and wherein the service data indicates a plurality of services to be orchestrated across the computing infrastructure; generating an infrastructure capacity model indicating a capacity of the computing infrastructure over a particular time window, wherein the infrastructure capacity model is generated based on the infrastructure data and the service data; identifying service-to-resource placement options indicating possible placements of the plurality of services across the plurality of resources over the particular time window, wherein the service-to-resource placement options are identified based on the infrastructure capacity model and the service data; obtaining resource inventory data indicating an inventory of resources that are available to add to the computing infrastructure during the particular time window; generating an infrastructure capacity plan indicating resource capacity allocation options over a plurality of time slots of the particular time window, wherein the infrastructure capacity plan is generated based on based on the infrastructure capacity model, the service-to-resource placement options, and the resource inventory data; and allocating resource capacities in the computing infrastructure for the plurality of services, wherein the resource capacities are allocated based on the infrastructure capacity plan.

Various embodiments may include a processing device to perform optimal workload placement for a computing infrastructure, comprising: interface circuitry to communicate over a network; and processing circuitry to: receive, via the interface circuitry, a request to place a workload across the computing infrastructure; obtain infrastructure data and workload data based on the request, wherein the infrastructure data indicates a landscape of the computing infrastructure and the workload data indicates workload requirements for the workload; determine, based on the infrastructure data and the workload data, a set of workload placement options over a set of time points, wherein the set of time points comprises a current time point and a plurality of future time points; compute utility scores for the set of workload placement options based on a set of stakeholder objectives; select an optimal workload placement from the set of workload placement options based on the utility scores, wherein the optimal workload placement is associated with a corresponding time point from the set of time points; and place or defer the workload based on the corresponding time point associated with the optimal workload placement, wherein the workload is to be placed across the computing infrastructure if the corresponding time point is the current time point, and wherein the workload is to be deferred for future placement across the computing infrastructure if the corresponding time point is one of the plurality of future time points.

In some embodiments of the processing device, the set of workload placement options indicates possible placements of the workload across the landscape of the computing infrastructure over the set of time points.

In some embodiments of the processing device, the landscape of the computing infrastructure indicates: a topology of a set of resources in the computing infrastructure; capabilities of the set of resources; and telemetry data for the set of resources.

In some embodiments of the processing device: the infrastructure data further indicates a resource inventory for the computing infrastructure, wherein the resource inventory indicates an inventory of resources that are available to add to the computing infrastructure; and the workload data further indicates workload performance data for the workload.

In some embodiments of the processing device, the processing circuitry to determine, based on the infrastructure data and the workload data, the set of workload placement options over the set of time points is further to: determine, based on the infrastructure data and the workload data, a first set of workload placement options for the current time point based on a current state of the computing infrastructure; determine, based on the infrastructure data and the workload data, a second set of workload placement options for the plurality of future time points based on predicted future states of the computing infrastructure; and determine the set of workload placement options based on the first set of workload placement options and the second set of workload placement options.

In some embodiments of the processing device, the processing circuitry to determine, based on the infrastructure data and the workload data, the set of workload placement options over the set of time points is further to: identify, based on the infrastructure data and the workload data, the set of time points to be considered for determining the set of workload placement options; identify, based on the infrastructure data and the workload data, a set of optimal resources to be considered for determining the set of workload placement options; and determine, based on the infrastructure data and the workload data, the set of workload placement options over the set of time points and the set of optimal resources.

In some embodiments of the processing device, the processing circuitry to determine, based on the infrastructure data and the workload data, the set of workload placement options over the set of time points is further to: determine, based on the workload performance data, a runtime performance of the workload for a set of possible resources; identify, based on the runtime performance of the workload, the set of time points to be considered for determining the set of workload placement options; identify, based on the runtime performance of the workload, a set of optimal resources to be considered for determining the set of workload placement options; and determine, based on the infrastructure data and the workload data, the set of workload placement options over the set of time points and the set of optimal resources.

In some embodiments of the processing device, the set of stakeholder objectives comprises one or more infrastructure provider objectives and one or more service provider objectives.

In some embodiments of the processing device: the one or more infrastructure provider objectives comprises minimizing a total cost of ownership of the computing infrastructure; and the one or more service provider objectives comprises maximizing runtime performance of the workload.

Various embodiments may include at least one non-transitory machine-readable storage medium having instructions stored thereon, wherein the instructions, when executed on processing circuitry, cause the processing circuitry to: receive, via interface circuitry, a request to place a workload across a computing infrastructure; obtain infrastructure data and workload data based on the request, wherein the infrastructure data indicates a landscape of the computing infrastructure and the workload data indicates workload requirements for the workload; determine, based on the infrastructure data and the workload data, a set of workload placement options over a set of time points, wherein the set of time points comprises a current time point and a plurality of future time points; compute utility scores for the set of workload placement options based on a set of stakeholder objectives; select an optimal workload placement from the set of workload placement options based on the utility scores, wherein the optimal workload placement is associated with a corresponding time point from the set of time points; and place or defer the workload based on the corresponding time point associated with the optimal workload placement, wherein the workload is to be placed across the computing infrastructure if the corresponding time point is the current time point, and wherein the workload is to be deferred for future placement across the computing infrastructure if the corresponding time point is one of the plurality of future time points.

Various embodiments may include a method to perform optimal workload placement for a computing infrastructure, comprising: receiving, via interface circuitry, a request to place a workload across the computing infrastructure; obtaining infrastructure data and workload data based on the request, wherein the infrastructure data indicates a landscape of the computing infrastructure and the workload data indicates workload requirements for the workload; determining, based on the infrastructure data and the workload data, a set of workload placement options over a set of time points, wherein the set of time points comprises a current time point and a plurality of future time points; computing utility scores for the set of workload placement options based on a set of stakeholder objectives; selecting an optimal workload placement from the set of workload placement options based on the utility scores, wherein the optimal workload placement is associated with a corresponding time point from the set of time points; and placing or deferring the workload based on the corresponding time point associated with the optimal workload placement, wherein the workload is to be placed across the computing infrastructure if the corresponding time point is the current time point, and wherein the workload is to be deferred for future placement across the computing infrastructure if the corresponding time point is one of the plurality of future time points.

What is claimed is:

1. A processing device to perform automated resource capacity planning for a computing infrastructure, comprising:
    interface circuitry to communicate over a network; and
    processing circuitry to:
        receive, via the interface circuitry, infrastructure data and service data for the computing infrastructure, wherein the infrastructure data indicates a plurality of resources in the computing infrastructure, and wherein the service data indicates a plurality of services to be orchestrated across the computing infrastructure;
        generate an infrastructure capacity model indicating a capacity of the computing infrastructure over a particular time window, wherein the infrastructure capacity model is generated based on the infrastructure data and the service data;
        identify service-to-resource placement options indicating possible placements of the plurality of services across the plurality of resources over the particular time window, wherein the service-to-resource placement options are identified based on the infrastructure capacity model and the service data;
        obtain resource inventory data indicating an inventory of resources that are available to add to the computing infrastructure during the particular time window;
        generate an infrastructure capacity plan indicating resource capacity allocation options over a plurality of time slots of the particular time window, wherein the infrastructure capacity plan is generated based on the infrastructure capacity model, the service-to-resource placement options, and the resource inventory data; and
        allocate resource capacities in the computing infrastructure for the plurality of services, wherein the resource capacities are allocated based on the infrastructure capacity plan.

2. The processing device of claim 1, wherein the infrastructure data further indicates:
    a landscape of the computing infrastructure, wherein the landscape indicates a topology of the plurality of resources in the computing infrastructure; and
    telemetry data indicating resource capacity usage and availability for the plurality of resources in the computing infrastructure.

3. The processing device of claim 1, wherein the plurality of resources comprises one or more compute resources, one or more memory resources, one or more network resources, and one or more storage resources.

4. The processing device of claim 1, wherein the infrastructure capacity model further indicates a current capacity of the computing infrastructure and a predicted future capacity of the computing infrastructure over the particular time window.

5. The processing device of claim 1, wherein the processing circuitry to generate the infrastructure capacity plan indicating the resource capacity allocation options over the plurality of time slots of the particular time window is further to:
    generate an infrastructure state graph indicating possible states of the computing infrastructure over the plurality of time slots based on possible resource capacity allocation actions;
    calculate utility scores for the possible states of the computing infrastructure based on a set of stakeholder objectives, wherein the set of stakeholder objectives comprises one or more infrastructure provider objectives and one or more service provider objectives;
    identify an optimal path through the infrastructure state graph based on the utility scores; and
    identify the resource capacity allocation options corresponding to the optimal path through the infrastructure state graph.

6. The processing device of claim 1, wherein the infrastructure capacity plan further indicates:
    a first portion of the resource capacities is to be allocated in a first set of resources, wherein the first set of resources is from the plurality of resources in the computing infrastructure; and
    a second portion of the resource capacities is to be allocated in a second set of resources, wherein the second set of resources is to be added to the computing infrastructure from the inventory of resources.

7. The processing device of claim 6, wherein:
    the first portion of the resource capacities is to be allocated at a first time slot of the particular time window; and
    the second portion of the resource capacities is to be allocated at a second time slot of the particular time window.

8. The processing device of claim 6, wherein the second set of resources comprises:
    one or more physical resources to be purchased from the inventory of resources; or
    one or more logical resources to be rented from the inventory of resources.

9. The processing device of claim 1, wherein the processing circuitry is further to:
orchestrate the plurality of services across the computing infrastructure during the particular time window based on the infrastructure capacity plan.

10. At least one non-transitory machine-readable storage medium having instructions stored thereon, wherein the instructions, when executed on processing circuitry, cause the processing circuitry to:
receive, via interface circuitry, infrastructure data and service data for a computing infrastructure, wherein the infrastructure data indicates a plurality of resources in the computing infrastructure, and wherein the service data indicates a plurality of services to be orchestrated across the computing infrastructure;
generate an infrastructure capacity model indicating a capacity of the computing infrastructure over a particular time window, wherein the infrastructure capacity model is generated based on the infrastructure data and the service data;
identify service-to-resource placement options indicating possible placements of the plurality of services across the plurality of resources over the particular time window, wherein the service-to-resource placement options are identified based on the infrastructure capacity model and the service data;
obtain resource inventory data indicating an inventory of resources that are available to add to the computing infrastructure during the particular time window;
generate an infrastructure capacity plan indicating resource capacity allocation options over a plurality of time slots of the particular time window, wherein the infrastructure capacity plan is generated based on based on the infrastructure capacity model, the service-to-resource placement options, and the resource inventory data; and
allocate resource capacities in the computing infrastructure for the plurality of services, wherein the resource capacities are allocated based on the infrastructure capacity plan.

11. The storage medium of claim 10, wherein:
the infrastructure capacity model further indicates a current capacity of the computing infrastructure and a predicted future capacity of the computing infrastructure over the particular time window; and
the infrastructure data further indicates:
a landscape of the computing infrastructure, wherein the landscape indicates a topology of the plurality of resources in the computing infrastructure; and
telemetry data indicating resource capacity usage and availability for the plurality of resources in the computing infrastructure.

12. The storage medium of claim 10, wherein the plurality of resources comprises one or more compute resources, one or more memory resources, one or more network resources, and one or more storage resources.

13. The storage medium of claim 10, wherein the instructions that cause the processing circuitry to generate the infrastructure capacity plan indicating the resource capacity allocation options over the plurality of time slots of the particular time window further cause the processing circuitry to:
generate an infrastructure state graph indicating possible states of the computing infrastructure over the plurality of time slots based on possible resource capacity allocation actions;
calculate utility scores for the possible states of the computing infrastructure based on a set of stakeholder objectives, wherein the set of stakeholder objectives comprises one or more infrastructure provider objectives and one or more service provider objectives;
identify an optimal path through the infrastructure state graph based on the utility scores; and
identify the resource capacity allocation options corresponding to the optimal path through the infrastructure state graph.

14. The storage medium of claim 10, wherein the infrastructure capacity plan further indicates:
a first portion of the resource capacities is to be allocated in a first set of resources, wherein the first set of resources is from the plurality of resources in the computing infrastructure; and
a second portion of the resource capacities is to be allocated in a second set of resources, wherein the second set of resources is to be added to the computing infrastructure from the inventory of resources.

15. The storage medium of claim 14, wherein:
the first portion of the resource capacities is to be allocated at a first time slot of the particular time window; and
the second portion of the resource capacities is to be allocated at a second time slot of the particular time window.

16. The storage medium of claim 14, wherein the second set of resources comprises:
one or more physical resources to be purchased from the inventory of resources; or
one or more logical resources to be rented from the inventory of resources.

17. The storage medium of claim 10, wherein the instructions further cause the processing circuitry to:
orchestrate the plurality of services across the computing infrastructure during the particular time window based on the infrastructure capacity plan.

18. A method to perform automated resource capacity planning for a computing infrastructure, comprising:
receiving, via interface circuitry, infrastructure data and service data for the computing infrastructure, wherein the infrastructure data indicates a plurality of resources in the computing infrastructure, and wherein the service data indicates a plurality of services to be orchestrated across the computing infrastructure;
generating an infrastructure capacity model indicating a capacity of the computing infrastructure over a particular time window, wherein the infrastructure capacity model is generated based on the infrastructure data and the service data;
identifying service-to-resource placement options indicating possible placements of the plurality of services across the plurality of resources over the particular time window, wherein the service-to-resource placement options are identified based on the infrastructure capacity model and the service data;
obtaining resource inventory data indicating an inventory of resources that are available to add to the computing infrastructure during the particular time window;
generating an infrastructure capacity plan indicating resource capacity allocation options over a plurality of time slots of the particular time window, wherein the infrastructure capacity plan is generated based on based on the infrastructure capacity model, the service-to-resource placement options, and the resource inventory data; and allocating resource capacities in the computing infrastructure for the plurality of services, wherein the resource capacities are allocated based on the infrastructure capacity plan.

19. The method of claim 18, wherein:

the infrastructure capacity model further indicates a current capacity of the computing infrastructure and a predicted future capacity of the computing infrastructure over the particular time window; and the infrastructure data further indicates:

a landscape of the computing infrastructure, wherein the landscape indicates a topology of the plurality of resources in the computing infrastructure; and telemetry data indicating resource capacity usage and availability for the plurality of resources in the computing infrastructure.

20. The method of claim 18, wherein the plurality of resources comprises one or more compute resources, one or more memory resources, one or more network resources, and one or more storage resources.

21. The method of claim 18, wherein generating the infrastructure capacity plan indicating the resource capacity allocation options over the plurality of time slots of the particular time window comprises:

generating an infrastructure state graph indicating possible states of the computing infrastructure over the plurality of time slots based on possible resource capacity allocation actions;

calculating utility scores for the possible states of the computing infrastructure based on a set of stakeholder objectives, wherein the set of stakeholder objectives comprises one or more infrastructure provider objectives and one or more service provider objectives;

identifying an optimal path through the infrastructure state graph based on the utility scores; and identifying the resource capacity allocation options corresponding to the optimal path through the infrastructure state graph.

22. The method of claim 18, wherein the infrastructure capacity plan further indicates:

a first portion of the resource capacities is to be allocated in a first set of resources, wherein the first set of resources is from the plurality of resources in the computing infrastructure; and a second portion of the resource capacities is to be allocated in a second set of resources, wherein the second set of resources is to be added to the computing infrastructure from the inventory of resources.

23. The method of claim 22, wherein:

the first portion of the resource capacities is to be allocated at a first time slot of the particular time window; and the second portion of the resource capacities is to be allocated at a second time slot of the particular time window.

24. The method of claim 22, wherein the second set of resources comprises:

one or more physical resources to be purchased from the inventory of resources; or one or more logical resources to be rented from the inventory of resources.

25. The method of claim 18, further comprising:

orchestrating the plurality of services across the computing infrastructure during the particular time window based on the infrastructure capacity plan.

\* \* \* \* \*